(12) United States Patent
Metzger et al.

(10) Patent No.: US 7,839,926 B1
(45) Date of Patent: Nov. 23, 2010

(54) BANDWIDTH MANAGEMENT AND CONTROL

(76) Inventors: Raymond R. Metzger, 6501 Adair Dr., Leon Valley, TX (US) 78238; John M. Baird, 421 Skyforest, San Antonio, TX (US) 78232; David A. Monroe, 740 Lincoln Center, 7800 IH 10 West, San Antonio, TX (US) 78230

( * ) Notice: Subject to any disclaimer, the term of this patent is extended or adjusted under 35 U.S.C. 154(b) by 1553 days.

(21) Appl. No.: 11/111,575

(22) Filed: Apr. 21, 2005

Related U.S. Application Data

(63) Continuation-in-part of application No. 09/715,783, filed on Nov. 17, 2000, now abandoned, and a continuation-in-part of application No. 09/725,368, filed on Nov. 29, 2000, now abandoned, and a continuation-in-part of application No. 10/266,813, filed on Oct. 8, 2002, now abandoned, and a continuation-in-part of application No. 10/776,129, filed on Feb. 11, 2004, now Pat. No. 7,576,770, and a continuation-in-part of application No. 10/971,857, filed on Oct. 22, 2004, now abandoned.

(51) Int. Cl.
*H04N 7/18* (2006.01)
(52) U.S. Cl. .................. 375/240.01; 375/240.26; 375/240.21
(58) Field of Classification Search ......... 348/143–160; 375/240.01–240.29
See application file for complete search history.

(56) References Cited

U.S. PATENT DOCUMENTS

| | | | |
|---|---|---|---|
| 4,163,283 A | 7/1979 | Darby | |
| 4,179,695 A | 12/1979 | Levine et al. | |
| 4,197,536 A | 4/1980 | Levine | |
| 4,516,125 A | 5/1985 | Schwab et al. | |
| 4,831,438 A | 5/1989 | Bellman, Jr. et al. | |
| 4,845,629 A | 7/1989 | Murge | |
| 4,857,912 A | 8/1989 | Everett, Jr. et al. | |
| 4,891,650 A | 1/1990 | Sheffer | |
| 4,910,692 A | 3/1990 | Outram | |
| 5,027,104 A | 6/1991 | Reid | |
| 5,027,114 A | 6/1991 | Kawashime et al. | |
| 5,091,780 A | 2/1992 | Pomerleau | |
| 5,111,291 A | 5/1992 | Erickson | |
| 5,166,746 A | 11/1992 | Sato et al. | |
| 5,218,367 A | 6/1993 | Sheffer et al. | |
| 5,243,340 A | 9/1993 | Norman et al. | |
| 5,243,530 A | 9/1993 | Stanifer et al. | |

(Continued)

FOREIGN PATENT DOCUMENTS

EP          220752          5/1987

(Continued)

OTHER PUBLICATIONS

Apr., 1966, Apollo Unified S-Band System, NASA-Goddard Space Flight Center, Greenbelt, Maryland.

(Continued)

*Primary Examiner*—Andy S Rao

(57) ABSTRACT

A camera system comprises a camera that produces a video signal, a video compressor that compresses the video signal, a system control processor that passes the compressed video signal, and a network interface that receives the compressed video signal, wherein the video compressor comprises configurable parameters that affect a bandwidth of the compressed video signal.

22 Claims, 28 Drawing Sheets

U.S. PATENT DOCUMENTS

| | | | |
|---|---|---|---|
| 5,268,698 A | 12/1993 | Smith, Sr. et al. |
| 5,283,643 A | 2/1994 | Fujimoto |
| 5,321,615 A | 6/1994 | Frisbie et al. |
| 5,334,982 A | 8/1994 | Owen |
| 5,350,890 A | 9/1994 | Rose et al. |
| 5,400,031 A | 3/1995 | Fitts |
| 5,408,330 A | 4/1995 | Squicciarini et al. |
| 5,432,838 A | 7/1995 | Purchase |
| 5,440,337 A | 8/1995 | Henderson et al. |
| 5,440,343 A | 8/1995 | Parulski |
| 5,448,243 A | 9/1995 | Bethke et al. |
| 5,463,595 A | 10/1995 | Rochall et al. |
| 5,469,371 A | 11/1995 | Bass |
| 5,497,149 A | 3/1996 | Fast |
| 5,508,736 A | 4/1996 | Cooper |
| 5,530,440 A | 6/1996 | Denzer et al. |
| 5,553,609 A | 9/1996 | Chen et al. |
| 5,557,254 A | 9/1996 | Johnson et al. |
| 5,557,278 A | 9/1996 | Piccirillo et al. |
| 5,598,167 A | 1/1997 | Zijderhand |
| 5,612,668 A | 3/1997 | Scott |
| 5,627,753 A | 5/1997 | Brankin et al. |
| 5,629,691 A | 5/1997 | Jain |
| 5,636,122 A | 6/1997 | Shah et al. |
| 5,642,285 A | 6/1997 | Woo |
| 5,666,157 A | 9/1997 | Avid |
| 5,670,961 A | 9/1997 | Tomita et al. |
| 5,677,979 A | 10/1997 | Squicciarini |
| 5,689,442 A | 11/1997 | Swanson |
| 5,712,679 A | 1/1998 | Coles |
| 5,712,899 A | 1/1998 | Pace, II |
| 5,714,948 A | 2/1998 | Farmakis et al. |
| 5,742,336 A | 4/1998 | Lee |
| 5,751,346 A | 5/1998 | Dozler |
| 5,777,551 A | 7/1998 | Hess |
| 5,777,580 A | 7/1998 | Janky et al. |
| 5,793,416 A | 8/1998 | Rostoker et al. |
| 5,835,059 A | 11/1998 | Nadel et al. |
| 5,850,180 A | 12/1998 | Hess |
| 5,867,804 A | 2/1999 | Pilley et al. |
| 5,917,405 A | 6/1999 | Joso |
| 5,926,210 A | 7/1999 | Hackett et al. |
| 5,933,098 A | 8/1999 | Haxton |
| 5,938,706 A | 8/1999 | Feldman |
| 5,974,158 A | 10/1999 | Auty et al. |
| 5,983,161 A | 11/1999 | Lemelson et al. |
| 5,999,116 A | 12/1999 | Evers |
| 6,002,427 A | 12/1999 | Kipust |
| 6,009,356 A | 12/1999 | Monroe |
| 6,067,571 A | 5/2000 | Igarashi et al. |
| 6,069,655 A | 5/2000 | Seeley |
| 6,078,850 A | 6/2000 | Kane et al. |
| 6,084,510 A | 7/2000 | Lemelson et al. |
| 6,092,008 A | 7/2000 | Bateman |
| 6,100,964 A | 8/2000 | De Cremiers |
| 6,133,941 A | 10/2000 | Ono |
| 6,154,658 A | 11/2000 | Caci |
| 6,157,317 A | 12/2000 | Walker |
| 6,181,373 B1 | 1/2001 | Coles |
| 6,195,609 B1 | 2/2001 | Pilley et al. |
| 6,226,031 B1 | 5/2001 | Barraciough et al. |
| 6,246,320 B1 | 6/2001 | Monroe |
| 6,259,475 B1 | 7/2001 | Ramachandran et al. |
| 6,275,231 B1 | 8/2001 | Obradovich |
| 6,278,965 B1 | 8/2001 | Glass et al. |
| 6,282,488 B1 | 8/2001 | Castor et al. |
| 6,292,098 B1 | 9/2001 | Ebata |
| 6,356,625 B1 | 3/2002 | Casteiani |
| 6,385,772 B1 | 5/2002 | Courtney |
| 6,424,370 B1 | 7/2002 | Courtney |
| 6,462,697 B1 | 10/2002 | Klamer et al. |
| 6,476,858 B1 | 11/2002 | Ramirez Diaz et al. |
| 6,504,479 B1 | 1/2003 | Lemons |
| 6,522,532 B2 | 2/2003 | Liao et al. |
| 6,525,761 B2 | 2/2003 | Sato et al. |
| 6,549,130 B1 | 4/2003 | Joso |
| 6,556,241 B1 | 4/2003 | Yoshimura et al. |
| 6,570,610 B1 | 5/2003 | Kipust |
| 6,628,835 B1 | 9/2003 | Brill |
| 6,646,676 B1 | 11/2003 | DaGraca et al. |
| 6,662,649 B1 | 12/2003 | Knight et al. |
| 6,675,386 B1 | 1/2004 | Hendricks et al. |
| 6,698,021 B1 | 2/2004 | Amini |
| 6,720,990 B1 | 4/2004 | Walker et al. |
| 7,113,971 B1 | 9/2006 | Ohi et al. |
| 2003/0071899 A1 | 4/2003 | Joso |
| 2005/0055727 A1 | 3/2005 | Creamer et al. |
| 2005/0130803 A1 | 6/2005 | Rastegar |

FOREIGN PATENT DOCUMENTS

| | | |
|---|---|---|
| EP | 232031 | 8/1987 |
| EP | 532110 | 3/1993 |
| EP | 209397 | 7/1993 |
| EP | 613109 | 8/1994 |
| EP | 613110 | 8/1994 |
| EP | 744630 | 11/1996 |
| EP | 785536 | 7/1997 |
| EP | 613111 | 8/1998 |
| JP | 6-301898 | 10/1994 |
| JP | 9-282600 | 10/1997 |
| JP | HEI-10-66058 | 3/1998 |
| JP | A-10-155040 | 6/1998 |
| JP | 9-251599 | 4/1999 |
| JP | 11-160424 | 6/1999 |
| WO | WO90/04242 | 4/1990 |
| WO | WO95/27910 | 10/1995 |
| WO | WO96/12265 | 4/1996 |
| WO | WO97/37336 | 10/1997 |
| WO | WO98/52174 | 11/1998 |

OTHER PUBLICATIONS

Nov. 24, 1976, TELEXIS ViaNet General Information Booklet Version 1.3.

2000, ViaNet 3000 Administrator's Manual Version 1.1—NetXpress Video by TELEXIS, Kanata, Ontario, Canada.

1999 Vianet 3000 Operator Manual Version 1.0—NetXpress Video by TELEXIS, Kanata, Ontario, Canada.

1999 ViaNet 3000 Administrator Manual Version 1.0—NetXpress Video by TELEXIS, Kanata, Ontario, Canada.

1999 ViaNet 3000 Instruction Manual Operator's Revision 1—NetXpress Video by TELEXIS, Kanata, Ontario, Canada.

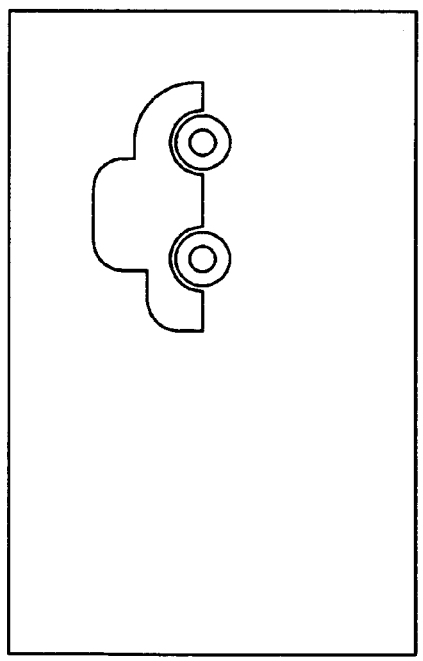
FIG. 3D1
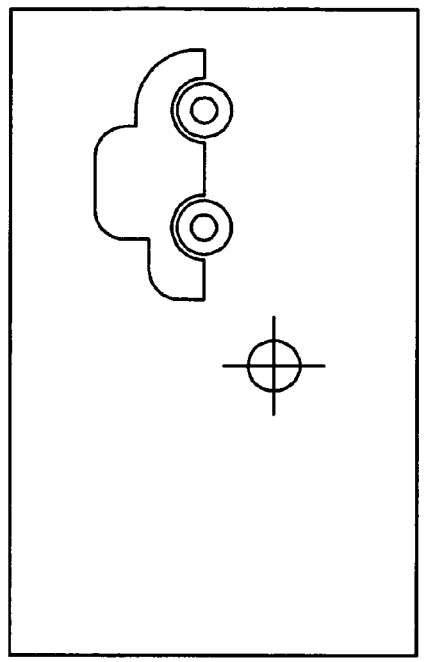
FIG. 3D2
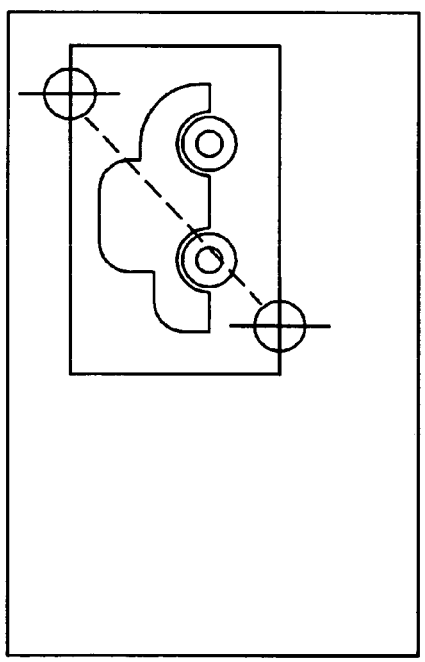
FIG. 3D3
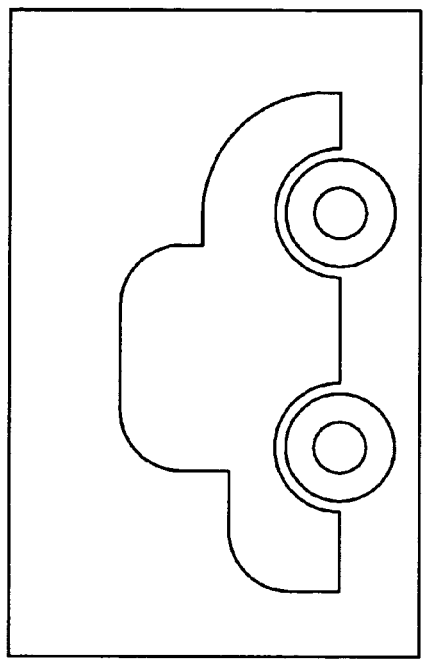
FIG. 3D4

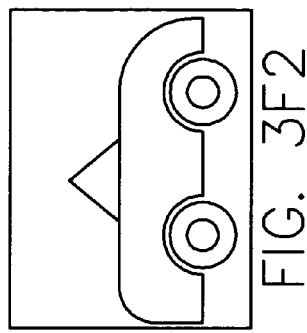
FIG. 3F2
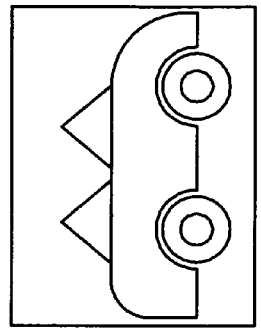
FIG. 3F4
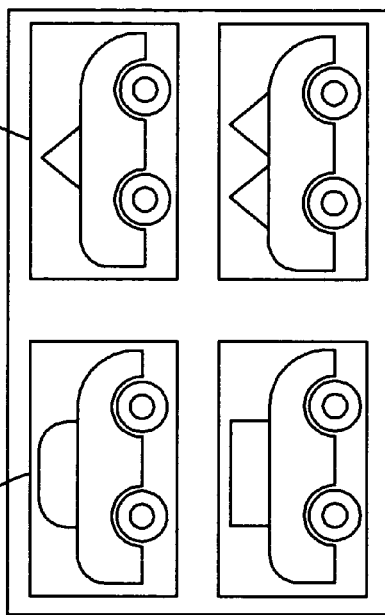
FIG. 3F
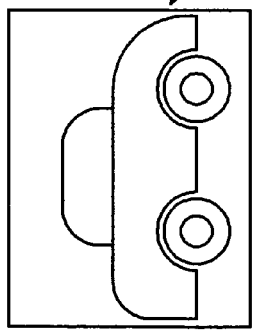
FIG. 3F1
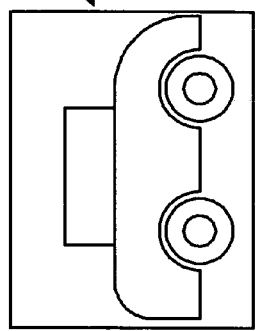
FIG. 3F3

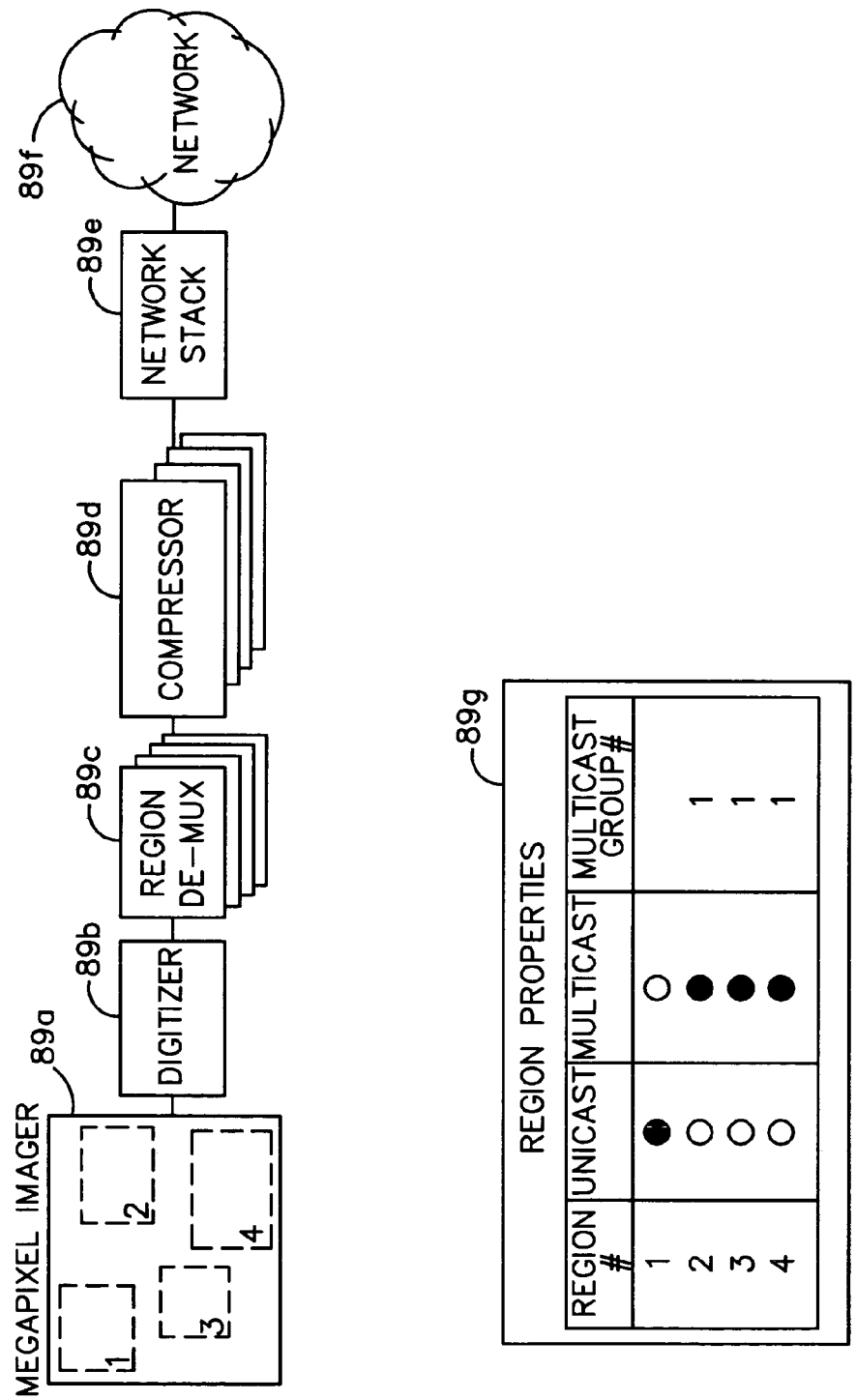

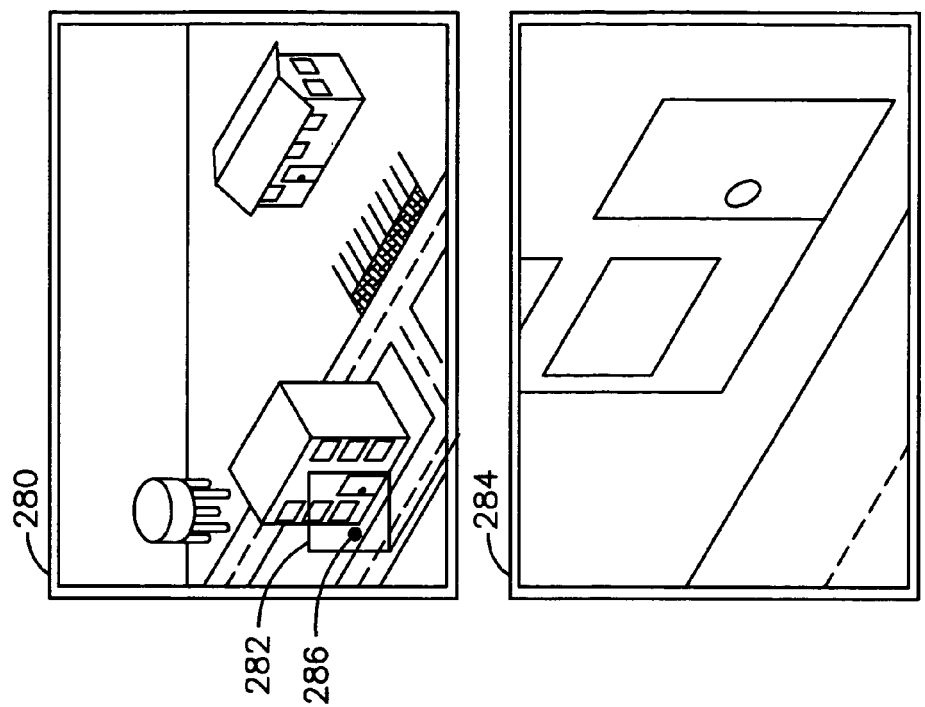
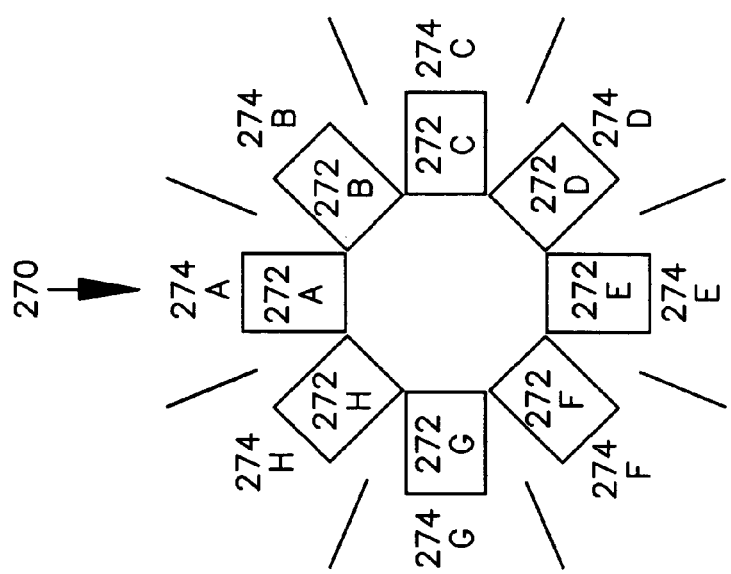
FIG. 13

BANDWIDTH MANAGEMENT AND CONTROL

CROSS-REFERENCE TO RELATED APPLICATIONS

The present invention is a Continuation-In-Part of and claims priority from patent application Ser. No. 09/715,783 now abandoned, filed on Nov. 17, 2000, titled MULTIPLE VIDEO DISPLAY CONFIGURATIONS AND BANDWIDTH CONSERVATION SCHEME FOR TRANSMITTING VIDEO OVER A NETWORK, from patent application Ser. No. 09/725,368 now abandoned, filed on Nov. 29, 2000, titled MULTIPLE VIDEO DISPLAY CONFIGURATIONS AND BANDWIDTH CONSERVATION SCHEME FOR TRANSMITTING VIDEO OVER A NETWORK, from patent application Ser. No. 10/266,813 filed on Oct. 8, 2002 now abandoned, titled ENHANCED APPARATUS AND METHOD FOR COLLECTING, DISTRIBUTING, AND ARCHIVING HIGH RESOLUTION IMAGES, from pending patent application Ser. No. 10/776,129 filed on Feb. 11, 2004 U.S. Pat. No. 7,576,770, titled SYSTEM FOR A PLURALITY OF VIDEO CAMERAS DISPOSED ON A COMMON NETWORK and from patent application Ser. No. 10/971,857, filed on Oct. 22, 2004 now abandoned, titled MULTIPLE VIDEO DISPLAY CONFIGURATIONS AND REMOTE CONTROL OF MULTIPLE VIDEO SIGNALS TRANSMITTED TO A MONITORING STATION OVER A NETWORK, the contents of each of which are enclosed by reference herein.

The present invention is further related to patent application Ser. No. 09/594,041, filed on Jun. 14, 2000, titled MULTIMEDIA SURVEILLANCE AND MONITORING SYSTEM INCLUDING NETWORK CONFIGURATION, patent application Ser. No. 09/593,901, filed on Jun. 14, 2000, titled DUAL MODE CAMERA, patent application Ser. No. 09/593,361, filed on Jun. 14, 2000, titled DIGITAL SECURITY MULTIMEDIA SENSOR, patent application Ser. No. 09/716,141, filed on Nov. 17, 2000, titled METHOD AND APPARATUS FOR DISTRIBTING DIGITIZED STREAMING VIDEO OVER A NETWORK, patent application Ser. No. 09/854,033, filed on May 11, 2001, titled PORTABLE, WIRELESS MONITORING AND CONTROL STATION FOR USE IN CONNECTION WITH A MULTI-MEDIA SURVEILLANCE SYSTEM HAVING ENHANCED NOTIFICATION FUNCTIONS, patent application Ser. No. 09/853,274 filed on May 11, 2001, titled METHOD AND APPARATUS FOR COLLECTING, SENDING, ARCHIVING AND RETRIEVING MOTION VIDEO AND STILL IMAGES AND NOTIFICATION OF DETECTED EVENTS, patent application Ser. No. 09/960,126 filed on Sep. 21, 2001, titled METHOD AND APPARATUS FOR INTERCONNECTIVITY BETWEEN LEGACY SECURITY SYSTEMS AND NETWORKED MULTIMEDIA SECURITY SURVEILLANCE SYSTEM, patent application Ser. No. 09/966,130 filed on Sep. 21, 2001, titled MULTIMEDIA NETWORK APPLIANCES FOR SECURITY AND SURVEILLANCE APPLICATIONS, patent application Ser. No. 09/974,337 filed on Oct. 10, 2001, titled NETWORKED PERSONAL SECURITY SYSTEM, patent application Ser. No. 10/134,413 filed on Apr. 29, 2002, titled METHOD FOR ACCESSING AND CONTROLLING A REMOTE CAMERA IN A NETWORKED SYSTEM WITH A MULTIPLE USER SUPPORT CAPABILITY AND INTEGRATION TO OTHER SENSOR SYSTEMS, patent application Ser. No. 10/163,679 filed on Jun. 5, 2002, titled EMERGENCY TELEPHONE WITH INTEGRATED SURVEILLANCE SYSTEM CONNECTIVITY, patent application Ser. No. 10/719,792 filed on Nov. 21, 2003, titled METHOD FOR INCORPORATING FACIAL RECOGNITION TECHNOLOGY IN A MULTIMEDIA SURVEILLANCE SYSTEM RECOGNITION APPLICATION, patent application Ser. No. 10/753,658 filed on Jan. 8, 2004, titled MULTIMEDIA COLLECTION DEVICE FOR A HOST WITH SINGLE AVAILABLE INPUT PORT, patent application No. 60/624,598 filed on Nov. 3, 2004, titled COVERT NETWORKED SECURITY CAMERA, patent application Ser. No. 09/143,232 filed on Aug. 28, 1998, titled MULTIFUNCTIONAL REMOTE CONTROL SYSTEM FOR AUDIO AND VIDEO RECORDING, CAPTURE, TRANSMISSION, AND PLAYBACK OF FULL MOTION AND STILL IMAGES, patent application Ser. No. 09/687,713 filed on Oct. 13, 2000, titled APPARATUS AND METHOD OF COLLECTING AND DISTRIBUTING EVENT DATA TO STRATEGIC SECURITY PERSONNEL AND RESPONSE VEHICLES, patent application Ser. No. 10/295,494 filed on Nov. 15, 2002, titled APPARATUS AND METHOD OF COLLECTING AND DISTRIBUTING EVENT DATA TO STRATEGIC SECURITY PERSONNEL AND RESPONSE VEHICLES, patent application Ser. No. 10/192,870 filed on Jul. 10, 2002, titled COMPREHENSIVE MULTI-MEDIA SURVEILLANCE AND RESPONSE SYSTEM FOR AIRCRAFT, OPERATIONS CENTERS, AIRPORTS AND OTHER COMMERCIAL TRANSPORTS, CENTERS, AND TERMINALS, patent application Ser. No. 10/719,796 filed on Nov. 21, 2003, titled RECORD AND PLAYBACK SYSTEM FOR AIRCRAFT, patent application Ser. No. 10/336,470 filed on Jan. 3, 2003, titled APPARATUS FOR CAPTURING, CONVERTING AND TRANSMITTING A VISUAL IMAGE SIGNAL VIA A DIGITAL TRANSMISSION SYSTEM, patent application Ser. No. 10/326,503 filed on Dec. 20, 2002, titled METHOD AND APPARATUS FOR IMAGE CAPTURE, COMPRESSION AND TRANSMISSION OF A VISUAL IMAGE OVER TELEPHONIC OR RADIO TRANSMISSION SYSTEM, and patent application Ser. Nos. 10/336,470, 11/057, 645, 11/057,814, and 11/057,264 the contents of each of which are enclosed by reference herein.

FIELD OF THE INVENTION

The present invention relates generally to bandwidth techniques, and, more particularly, to a system, method, and computer readable medium for providing bandwidth management and control.

BACKGROUND OF THE INVENTION

Certain networks exist for the sole or partial purpose of providing video surveillance. In such networks, one or more cameras may be geographically separated on the surveillance network, and may in fact be mobile. Further, these cameras may be connected to the surveillance network via a low-bandwidth communications link. An operator's console(s) that controls the cameras and other functionality may also be connected to the surveillance network via a low-bandwidth communications link or links, which may be wired (including fiber optic) or wireless (including industry standards such as 802.11 and 802.16), or a combination of both, and may be geographically remote or mobile.

Certain problems arise when utilizing or configuring such networks including difficulties encountered when attempting to pass visual data over these low-bandwidth communications links or pathways. Therefore, what is needed is a system, method, and computer readable medium for providing bandwidth management and control that overcomes the problems and limitations described above. Such bandwidth management and control can be utilized with a plurality of devices including video cameras (such as Internet Protocol (IP) video cameras), video encoders (such as IP video encoders), digital video recorders (such as IP digital video recorders), and camera devices (such as camera phones).

SUMMARY OF THE INVENTION

The present invention discloses bandwidth management and control techniques by utilizing a number of factors including compression parameters, automatic stream selection, conditional transmission, sub-sampling, a number of viewed panes, discarding frames ad-hoc, and delaying frames. In one embodiment, a camera system comprises a camera that produces a video signal, a video compressor that compresses the video signal, a system control processor that passes the compressed video signal, and a network interface that receives the compressed video signal, wherein the video compressor comprises configurable parameters that affect a bandwidth of the compressed video signal.

In another embodiment, a method for compressing a video signal comprises sending video compression parameters from an operator console to a camera system, wherein the operator console is adapted to control the camera system, receiving the parameters by a system control processor of the camera system, and based on the parameters, configuring one or more a video compression devices of the camera system, and based on the configuring, compressing an available video signal by the system control processor to produce a video stream which will not exceed an available communications channel capacity.

In a further embodiment, a network comprises a camera system that comprises a camera that produces a video signal, a video compressor that compresses the video signal, a system control processor that passes the compressed video signal, and a network interface that receives the compressed video signal, a server, and an operator console that controls the camera system, wherein the console uses the server as an intermediary when requesting the compressed video signal.

In yet another embodiment, a method for compressing a video stream, comprises receiving high-bitrate video streams at an operator console from a camera via a channel that does not have sufficient capacity to transmit the high-bitrate streams, automatically switching the camera to an alternate stream type and providing the camera with video compression parameters such that the video streams produced by the camera will not exceed a capacity of a communications channel used to transfer the video streams, and automatically switching the camera back to an original high-bitrate stream after the alternate stream type is received.

In yet a further embodiment, a computer readable medium comprises instructions for: receiving a video stream request at a first server, routing the video stream request to a second server that has a-priori knowledge of a capacity of a low-bandwidth communications channel, and automatically switching a camera that produces a video stream to an alternate stream type and providing the camera with video compression parameters such that the video stream produced based on the request will not exceed the capacity of the communications channel.

In yet another embodiment, a system comprises a camera system, a surveillance network that has sufficient bandwidth to support a full 30 frame-per-second compressed video stream, a server that receives this stream, and an operator console that places a request to the server for a video stream from the camera system, wherein the server has knowledge of a capacity of the system, and based on that knowledge, begins forwarding selected frames of the video stream to the operator console.

BRIEF DESCRIPTION OF THE DRAWINGS

FIG. 3D1-3D4 depicts a combination of pan, tilt and zoom features in accordance with a preferred embodiment of the present invention;

FIGS. 3F-3F4 depict a scene with four objects of interest in accordance with a preferred embodiment of the present invention;

FIG. 3G depicts a megapixel imager viewing a scene containing different areas of interest in accordance with a preferred embodiment of the present invention;

FIG. 4 depicts a camera system in accordance with a preferred embodiment of the present invention;

FIG. 13 depicts an array of megapixel imagers in accordance with a preferred embodiment of the present invention;

DETAILED DESCRIPTION OF THE INVENTION

Figure 1:
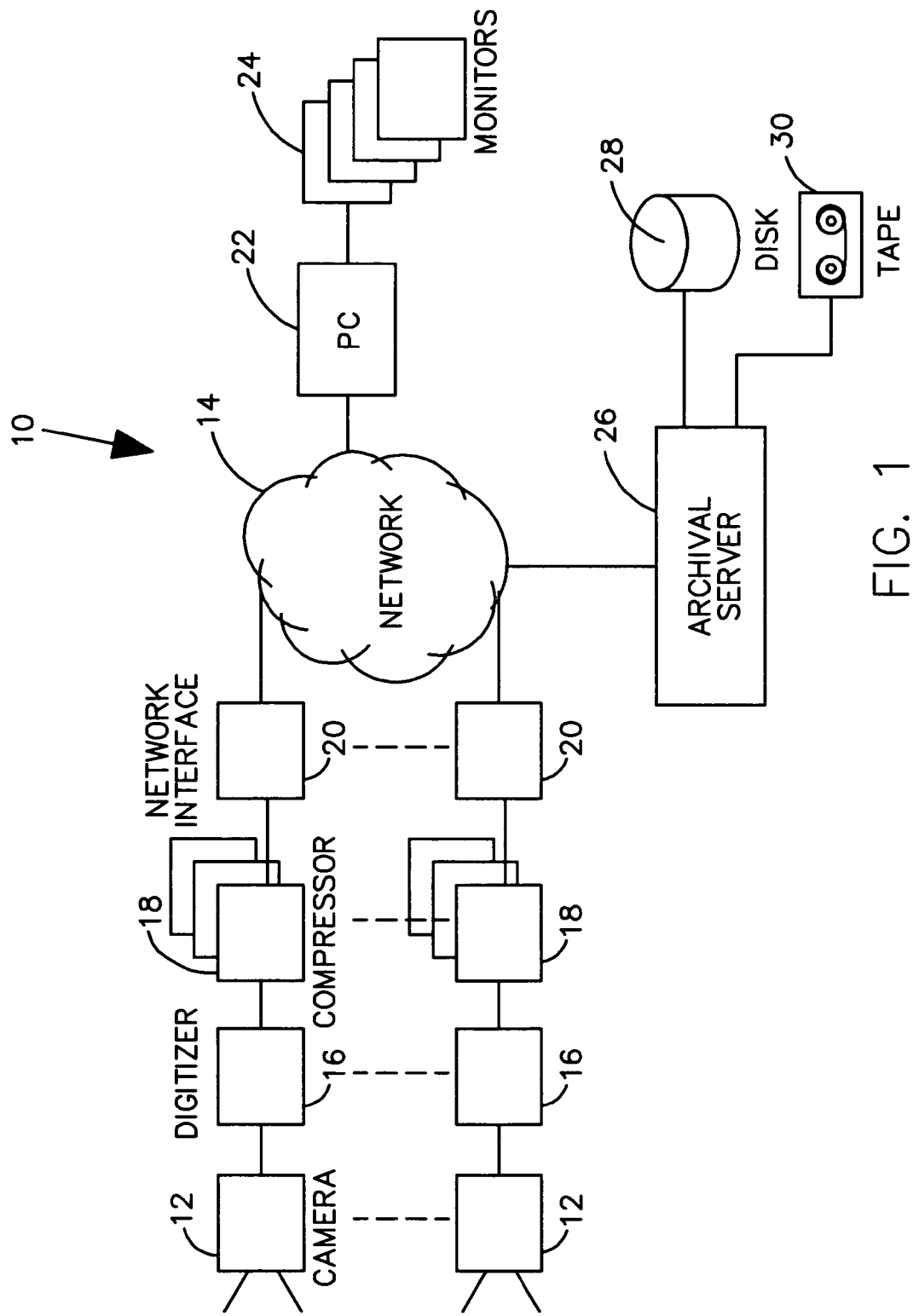
FIG. 1 depicts a system in accordance with a preferred embodiment of the present invention.

Referring now to FIG. 1, a system 10 contains a camera or a plurality of video cameras 12 operable via a common network 14. These cameras 12 are disposed around a location or locations to be monitored. Each camera produces a video signal representing a scene of interest. The video signal is digitized by digitizer 16, compressed by compressor(s) 18, and transmitted to the network 14 via network interface 20. The network may be a data network such as the Internet or a private network. In a preferred embodiment of the present invention, multiple compressors 18 are employed in each camera to compress the captured image into a plurality of different compressed signals, each representing different degrees of image resolution, region of interest within the camera view, filtered or masked data from the camera view, compression type, or compressed bit rate. These multiple video streams may be combined into one composite stream for network transmission, or may be maintained as separate and distinct video or still frame streams throughout the network or portions of the network.

The digitizer 16, the compressor 18, and the network interface 20 are typically integrated within a single camera housing. In an alternative but functionally equivalent embodiment, these functions may be housed in a separate enclosure or enclosures, such as with a device to digitize, compress, and network video signals from a previously-installed 'legacy' analog camera. Video or images thus networked may be selectively viewed on a console including PC(s) 22 and monitor(s) 24 which may be controlled by an operator, or may be received by a networked server 26 for storage, analysis, and subsequent retrieval via, for example, disk storage 28 or tape storage 30.

The cameras 12 preferably use the IP networking protocol. Using the Open Systems Interconnect hierarchy, Ethernet can be used for the physical layer, and Universal Datagram Protocol/Internet Protocol is used for the network and transport layers. Networks may be wired, fiber, wireless and/or a combination of the above. Other network protocols and topologies may also be utilized without departing from the scope of the present invention.

The network 14 may be a local-area-network (LAN), providing sufficient capacity for a plurality of cameras which simultaneously produce compressed video signals. For example, Ethernet LAN's typically have a capacity of 100 Mbps or more, which provides adequate capacity for a plurality of the cameras 12. These LAN's, however, operate over limited distances. To increase the geographic coverage distance, local and distant LAN's may be interconnected via a variety of communications pathways. These networks are often called Wide Area Networks, or WAN's. These interconnections, unfortunately, typically offer limited bandwidth. The Internet is an example; users typically connect to their local network at a connection speed of 100 Mbps, but the gateway paths to the internet backbone may be 1.5 Mbps or less. Long-haul interconnect paths may be even slower, such as ISDN, mobile, cellular or satellite paths which support only one or two 64 kbps data channels. This presents a problem when using, for example, a network arrangement for distribution of surveillance video. Users monitoring the various cameras on the local network have access to the high-bandwidth, full-motion video produced by the camera(s) 12. Users outside the local network, however, are often severely limited in available bandwidth, and may only be capable of receiving one (or possibly none) such camera video signals. In addition to fundamental bandwidth limitations of these circuits, the circuits due to their nature may suffer from errors or data delivery capacity reductions caused by peaks in traffic due to network sharing. This further limits the information carrying ability of the network. To further complicate the situation, errors in wireless systems and usage peaks in shared networks are not totally predictable and cause changes in effective bandwidths over time. These can be step functions, such as the garage door opener transmitter quashes the wireless LAN for a few seconds, then it is gone, or gradual functions, such as Internet traffic drops in the middle of the night, but peaks during business hours and in the evening.

Improved Pan/Tilt/Zoom Control Methods

Surveillance cameras are often designed to be capable of pan/tilt movement, usually controlled by a person viewing the camera's video. Control is often limited to a simple joystick or equivalent device, which directly activates the camera's pan and tilt motors. While useful, such a simple control scheme suffers from several shortcomings. First, compressed digital video, conveyed over a network, often exhibits significant latency—often on the order of one or two or more seconds. Such latency is usually functionally inconsequential as far as surveillance is concerned. However, even small amounts of system latency seriously interfere with a person's ability to track a moving person or object or both. Such latency causes a significant 'lag' in the apparent camera response, and as a result the operator inevitably overcorrects. An additional problem with a simple joystick pan/tilt control is the difficulty in making fine adjustments. This difficulty is more pronounced when the camera is at its maximum zoom. Small, minute adjustments in the camera's position may be impossible.

A number of pan/tilt cameras exist which use motors and microprocessors to position a camera. In such a camera, control inputs take the form of data messages sent via a network, typically RS-232 or RS-422. This offers a number of improvements in ease-of-use. For example, the pan/tilt speed may be controlled, thus allowing more precise positional control of the camera at high zoom factors. Also, these cameras may use programmable preset positions, wherein an operator may easily return the camera to a pre-programmed position and zoom setting. These improvements, however, do not address the difficulty of tracking a moving object when the system suffers from significant latency. Several of the cross-referenced patent applications describe systems and methods to alleviate this problem. For example, continuous joystick movements, referenced to a 'reference' joystick position, command continuous and corresponding camera movements. While promoting ease-of-use, certain user control difficulties can still arise from network latency.

Figure 2:
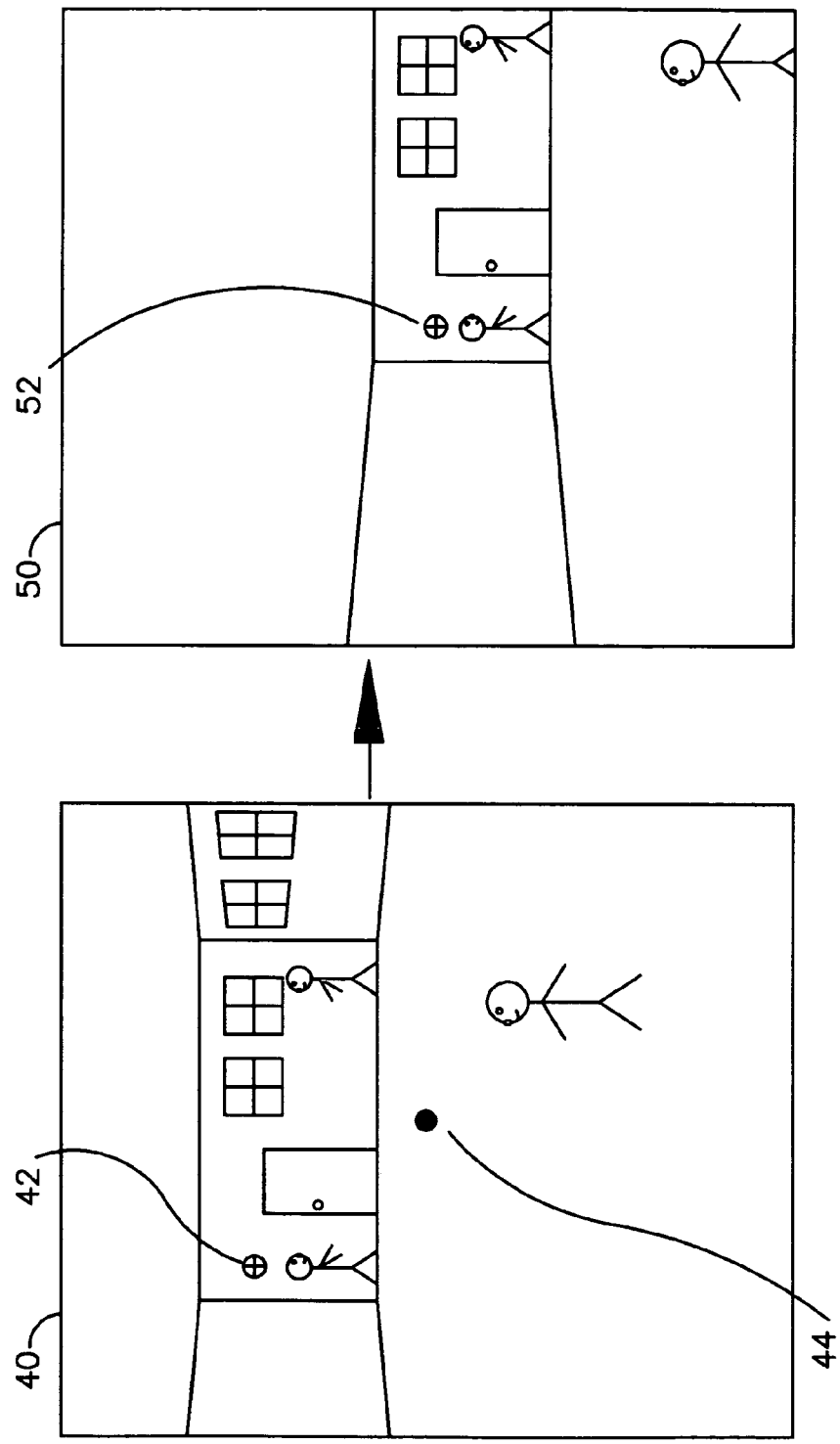
FIG. 2 depicts a video window view from an operator's console in accordance with a preferred embodiment of the present invention.

As such, the present invention alleviates these control difficulties, providing an effective 'point and click' positioning method for control of a remote pan/tilt camera mount. Referring now to FIG. 2, various views from a networked operator's console, such as scenes 40 and 50, imaged by a pan/tilt equipped network camera, are depicted. In various scenarios, an operator may wish to reposition the camera so as to center on a person or other object in the scene. A visual crosshair 42 is superimposed on the scene 40 by a software algorithm operating within the networked operator's console. This crosshair is movable under operator control, using a conventional pointing device such as a mouse, joystick, touch screen, or equivalent pointing device. The operator uses the crosshair to indicate a location within the scene 40 that, preferably, should occupy the center of the screen. Other locations and multiple locations are also possible without departing from the scope of the present invention.

Once the location is selected, the operator informs the software that this is the desired 'center of scene' location, by clicking the mouse, operating a trigger or other button on the joystick, or equivalent. The software, preferably operating in the networked operator's console, determines the desired camera movement, and commands the remote pan/tilt camera 12 to move by the commanded amount. This is a distinct feature wherein the pan/tilt camera is now 'intelligent' and operable not only through simple on/off commands to the pan & tilt motors (or incrementing/decrementing virtual tilt/pan offset pointers in sub-sampled megapixel camera units such as those described in several of the cross-referenced patent applications), but can be commanded to position or microposition the pan/tilt mount as desired, through command protocol messages sent via the surveillance network 14. The software can also be stored and operated in one or more of the components of FIG. 1 (or of FIGS. 4-9) without departing from the scope of the present invention.

Determination of the desired position occurs when the software operating in the networked operator's console, networked server, or indeed the appliance itself notes the screen location of the commanded position 42 as an X,Y coordinate pair. The software then differences this (X,Y) location from the effective screen center location 44, resulting in an ($\Delta X$, $\Delta Y$) offset. This offset is then multiplied by the current zoom factor of the remote camera, which may be known a priori or may be determined via inquiry of the camera. The ($\Delta X$, $\Delta Y$) offset is then scaled according to the camera's zoom factor, and the resulting movement data is transmitted to the remote pan/tilt camera via the intervening network. The pan/tilt camera correspondingly moves to the new location, resulting in the scene 50 wherein the previously-selected spot now occupies the center 52 of the scene.

Figure 3:
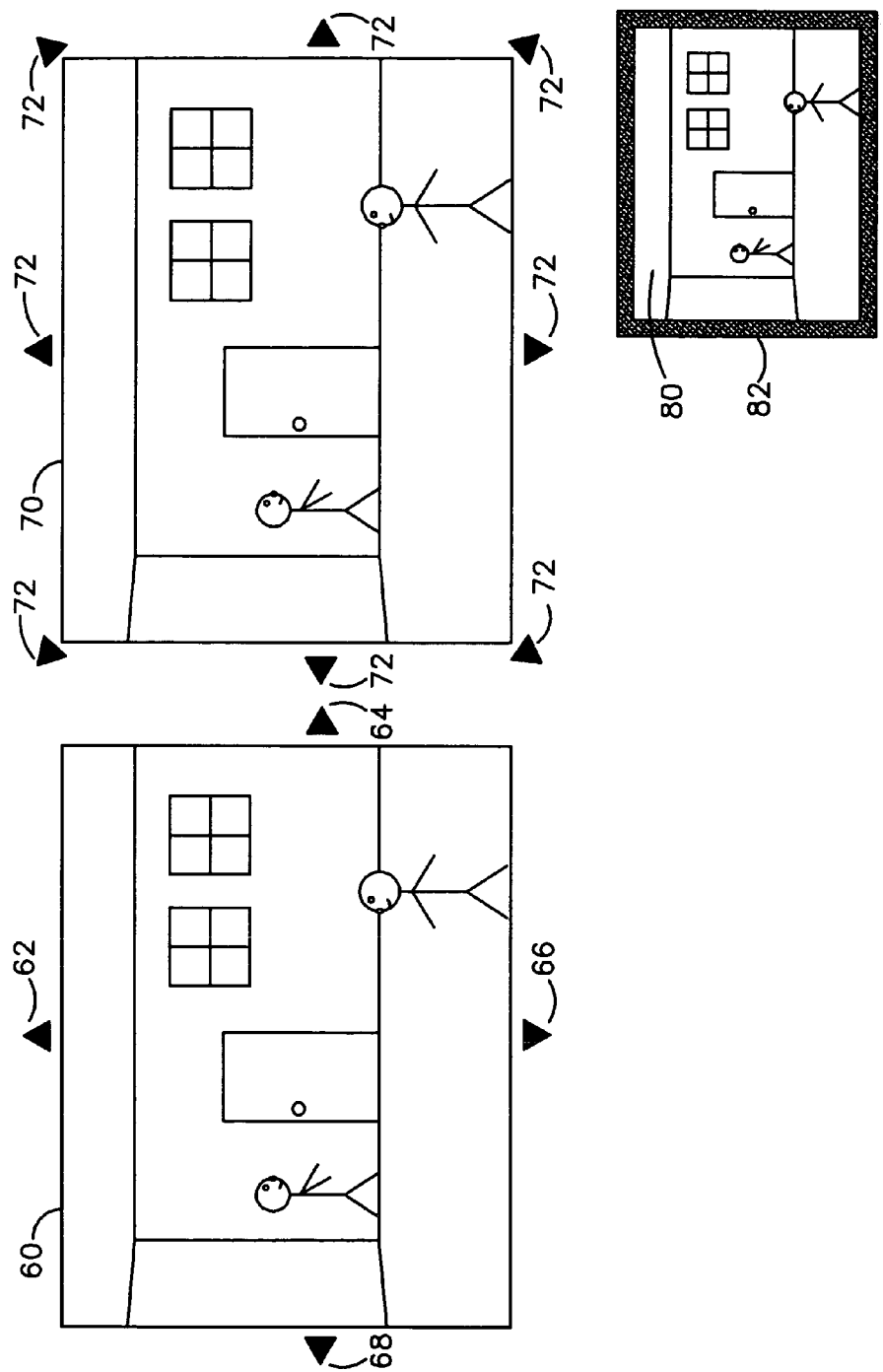
FIG. 3 depicts views from an operator's console including jog buttons in accordance with a preferred embodiment of the present invention.

In another embodiment of the present invention, the operator may command the remote camera to move by exactly one screen width and/or one screen height or a fractional or an incremental screen width and/or screen height. This is a very helpful function in allowing an operator to track a moving person and/or object, which may be rapidly moving out of a current field-of-view. Referring now to FIG. 3, a scene 60 is displayed at the networked operator's console. A series of 'jog' buttons 62 through 68 are superimposed on the displayed video by the software operating in the networked operator's console. These buttons 62-68, when selected, command the remote pan/tilt camera to move in the direction indicated. Further, the software accounts for the remote camera's current zoom setting, and thereby commands the remote pan/tilt camera to move an angular distance equal to the scene width, as viewed on the operators console.

It is important to note that the buttons do not need to be limited to moving the field of view by an integer multiple of the view. In other words, this feature may bump the view by various amounts, such as specified, for example, with a slide bar or radio buttons offering field movement increments equal to the view, a fraction of the view, or a multiple of the view greater than one. Multiple buttons can also be implemented, allowing various tilt/pan amounts to be assigned to corresponding buttons. For example, three buttons may be placed on each side such that one button moves the camera view by one half of the field of view, one button moves the camera view by one complete field of view, and one button moves the field of view by two fields of view.

It is important to note that the present invention need not be limited to movements in one axis only. For example, a viewed scene 70 is seen with eight superimposed 'jog' buttons 72. Each of these buttons commands the remote pan/tilt camera, via the software operating in the networked operator's console, to move by exactly one screen dimension or an increment of the screen dimension. This allows the operator to command camera movements in finer angular increments (45° versus 90°). Other angular increments are also available either for the entire viewed scene or for a specific portion of the viewed scene. For example, based on the screen location of the commanded position or based on another variable (such as the position of a cursor, an eye or retinal position of the operator, etc.) finer angular increments may only be displayed in an area corresponding with such a screen location or other variable.

In another embodiment of the present invention, a scene 80 is shown surrounded by a continuous border 82 which represents, in effect, an infinite number of 'jog' buttons that completely surround the image. When a spot on border 82 is selected by the operator, the software, operating in the networked operator's console, determines the angle from screen center which has been selected by the operator. The software calculates the pan and tilt offset necessary to move the remote pan/tilt camera by one screen height & width or an increment of the screen height & width, along the angle effectively commanded by the user. This feature is very useful, for example, when an operator is attempting to track, for example, a moving vehicle at high magnifications. The operator need only 'click' the spot or position on the border 82 where the moving vehicle went off-screen. The resulting new image will depict the moving vehicle, approximately centered in the scene.

In a further embodiment of the present invention, and via the software of the present invention, the resulting new image of the moving vehicle, approximately centered in the scene, is automatically depicted when the moving vehicle goes off-screen at the spot or position on the border 82. In other embodiments, a combination of the 'jog' buttons 62-68, the 'jog' buttons 72, and the border 82 may be used.

Calculations of the required camera movement are straightforward. Typically, objects under surveillance are located at some significant distance from the camera, and angular movement rate is not large. Since the required camera angular movements are small, they can be accurately approximated as linear displacements, rather than spherical. Hence, movement calculations may be treated as simple proportionalities. Given:

$X_0, Y_0$=Location of the center of the screen, measured in pixels
$X_1, Y_1$=Designated target location
Z=Camera's current zoom factor
$R_X, R_Y$=Angular pixel pitch, in pixels/degree Then the required angular displacement is:
$D_X=(X_1-X_0)/(Z*R_X)$, and
$D_Y=(Y_1-Y_0)/(Z*R_Y)$ These are displacement values, to be transmitted to the camera's pan/tilt mechanism, which will center the screen on the designated target point $X_1, Y_1$.

Figure 3A:
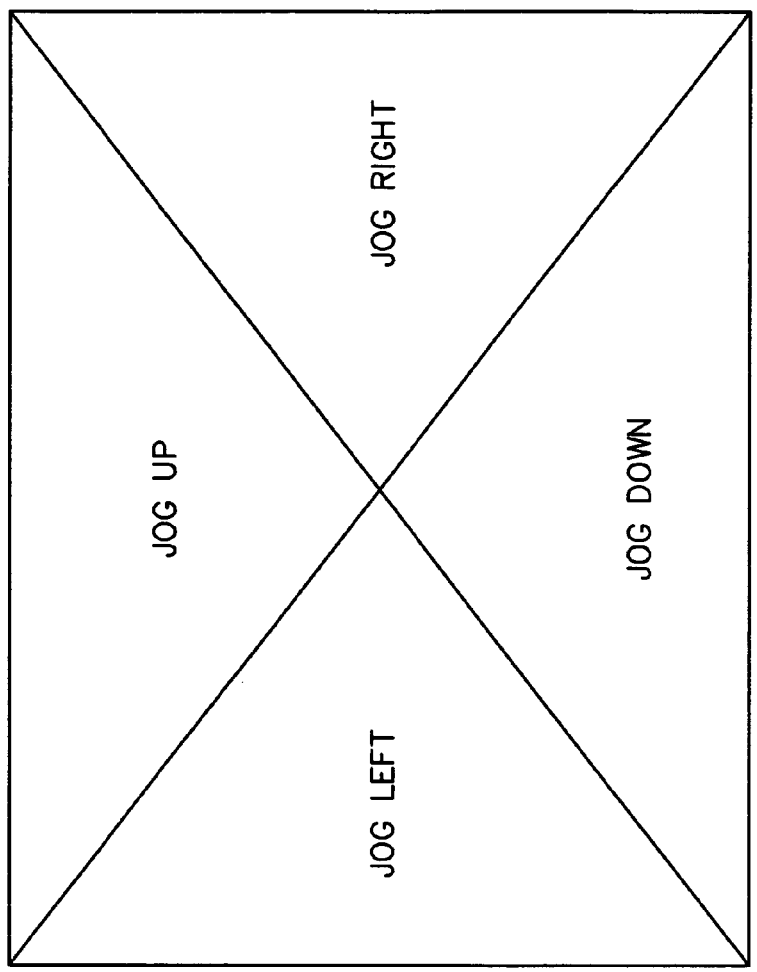
FIG. 3A depicts four jog segments on an operator's console in accordance with a preferred embodiment of the present invention.
Figure 3B:
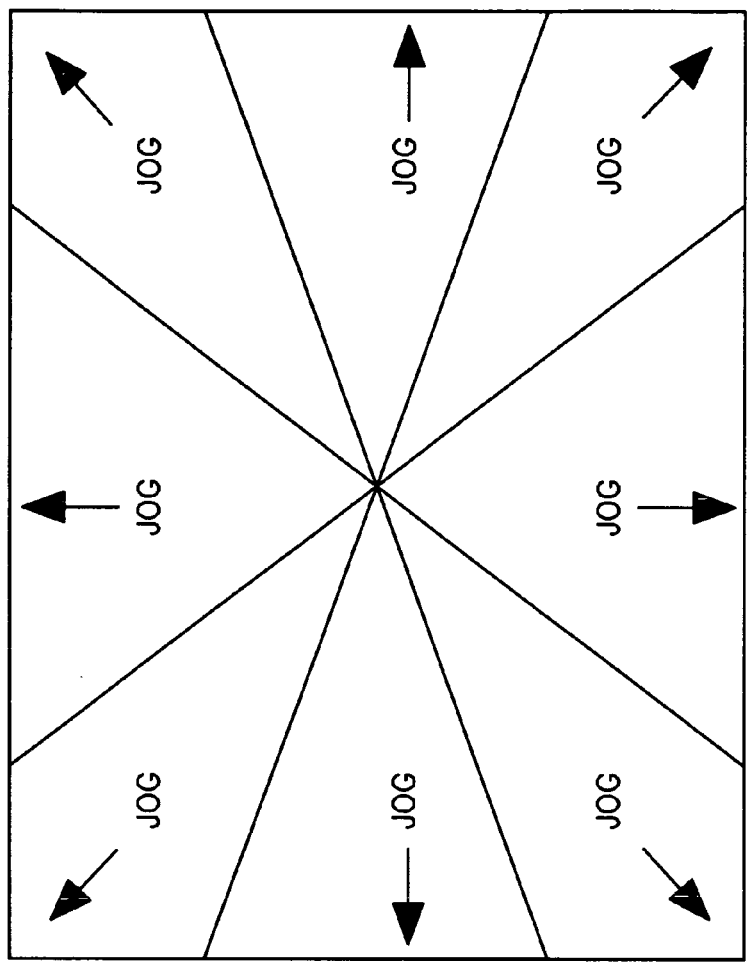
FIG. 3B depicts eight jog segments on an operator's console in accordance with a preferred embodiment of the present invention.

In lieu of or in addition to use of jog 'buttons', a mouse, trackball, touch screen or joystick cursor may be used to initial the jog. For example, mice and joysticks often have multiple application or user assigned buttons. These may be utilized to indicate that a jog is to be initiated. Based upon the position of the cursor, clicking on segments of the field of view, such as upper segment, lower segment, right segment, left segment, will initiate a tilt/pan operation in the corresponding direction. More than four segments, as illustrated in FIG. 3A, can be used. For example, FIG. 3B shows eight segments thus allowing jogging in both the X and Y axis simultaneously. This concept can be further expanded such that essentially an infinite number of jogging vectors can be specified based on where the mouse/joystick click is aimed on the view. The radial from the screen center will specify the direction of movement.

Figure 3C:
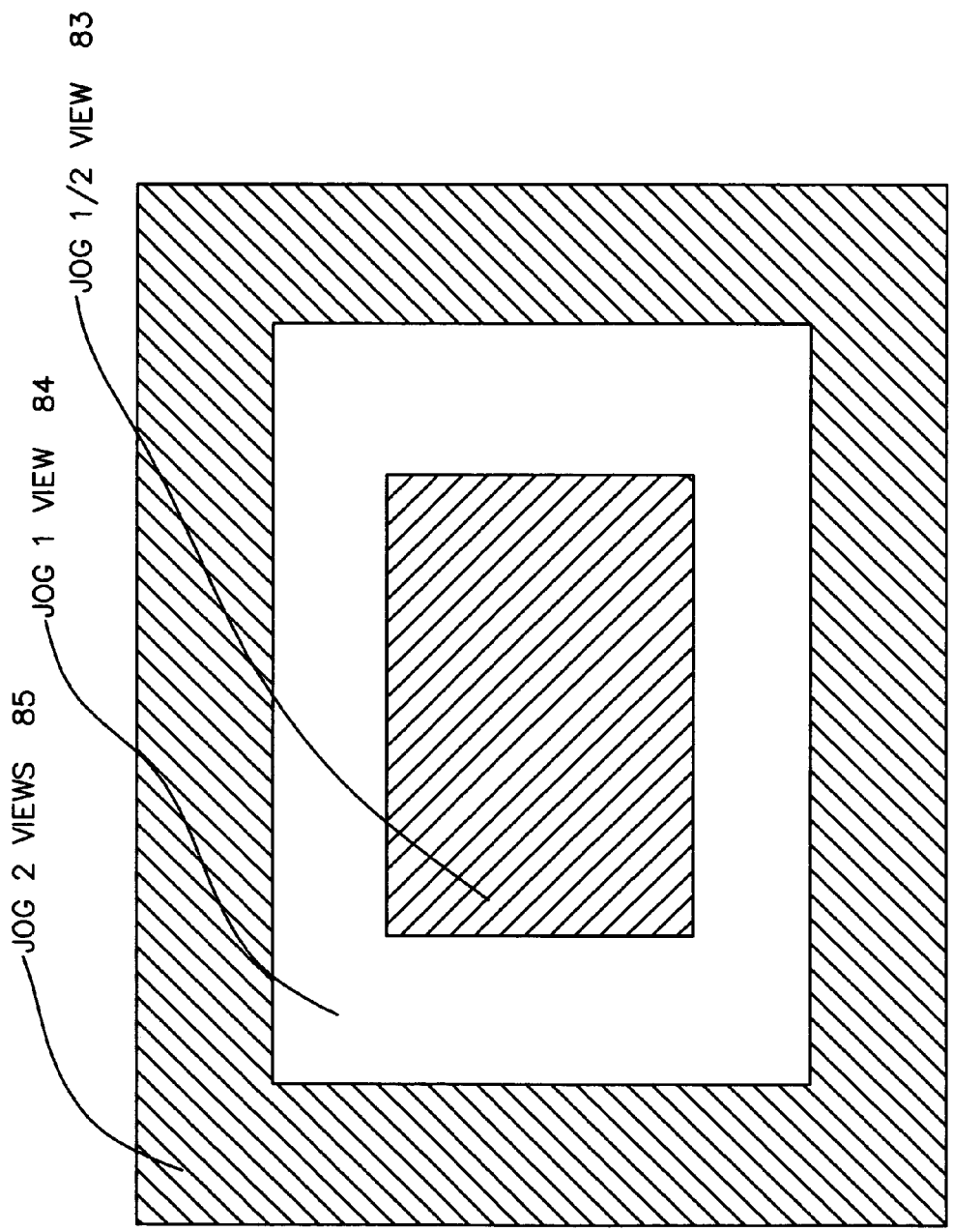
FIG. 3C depicts an amount of a jog that can be controlled in accordance with a preferred embodiment of the present invention.

In addition, the amount of the jog can be controlled as is illustrated in FIG. 3C. In this implementation, the distance that is jogged is established by a plurality of regions that radiate from the center of the view. For example, clicking on the region nearest to the center of the screen would generate a movement equal to ½ of the view. The next region out would generate a movement equal to the field of view. The outer region of interest would generate a movement equal to two times the field of view. It is important to note that the increments of distance moved can also be defined in very small amounts such that a near infinite resolution of jogging distance can be specified, not just three as is illustrated. It is also important to note that the distance moved and the vector moved can both be simultaneously specified using this technique. In other words, the point hit relative to the center of the screen will both specify the direction of movement through the vector from the center, and the distance as specified by the distance on the vector from the center to the edge of the screen. The processing sequence, as performed within the monitor application software, proceeds as follows:

Detect Mouse Click
  Capture the screen X,Y location of the mouse click
  Determine which of the pre-defined screen zones X,Y is in
  Look up the required pan/tilt displacement from a table
  Transmit the displacement variables to the pan/tilt unit.

Figure 4:
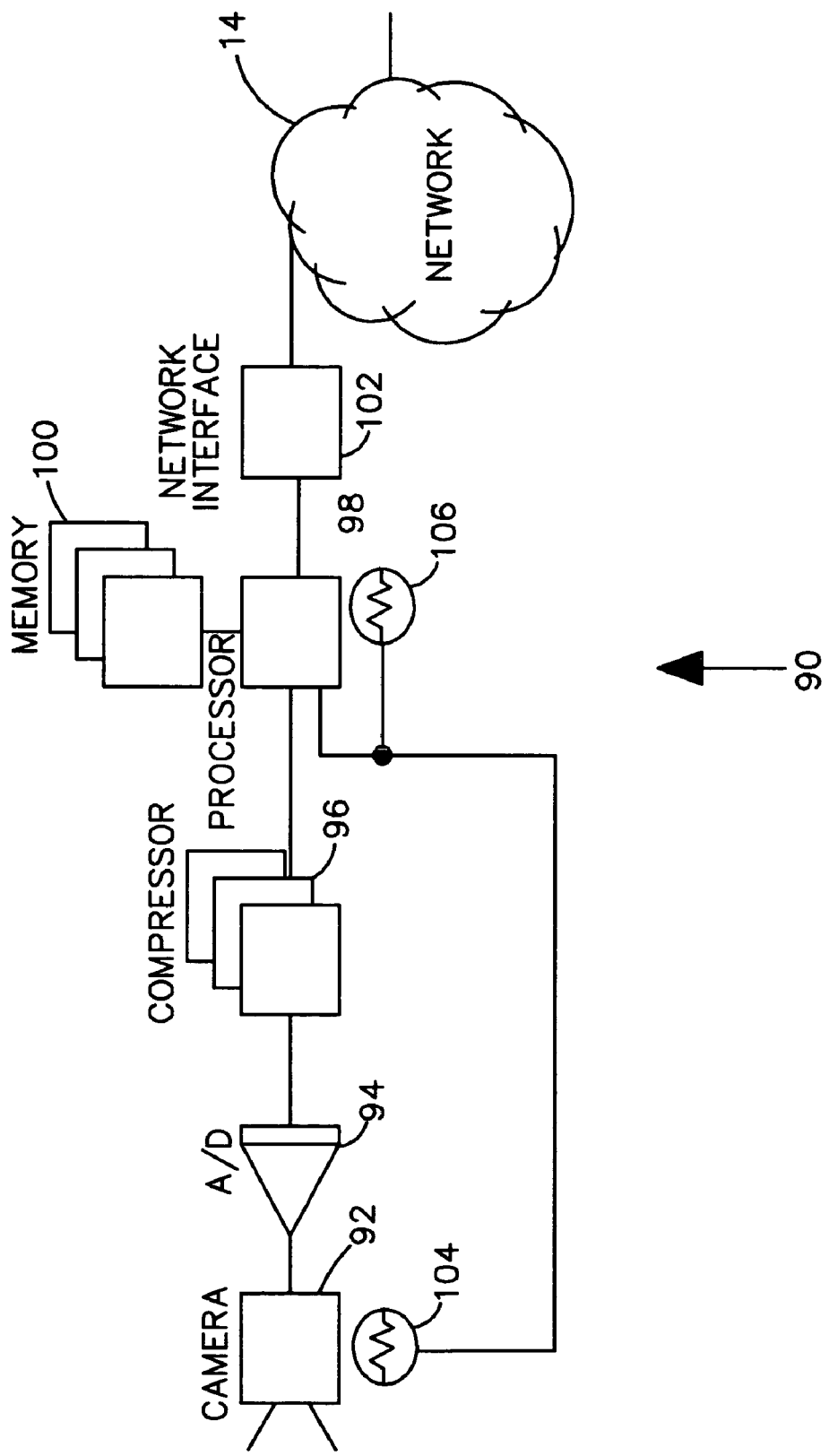

A further adaptation of this technique allows combination of pan, tilt and zoom features in one combined operation as is illustrated in FIGS. 3D1-3D4. In FIG. 3D1, an object, for example a car, is found in the upper right hand corner of the image. It is desired to view this object closer. Clicking at a point (for example, the 'cross-hair' cursor) as illustrated in FIG. 3D2 establishes a point on the image view. Dragging and clicking (as indicated by the dashed line) at a point as illustrated in FIG. 3D3 defines, in this case, a rectangular area of interest. When the 'unclick' is done, then the tilt/pan/zoom operation can be commenced whereby the degree of tilt, pan and zoom are transmitted via an IP message thus initiating the operation and resulting in an image as depicted in FIG. 3D4. Note that it is preferable, while the user is defining the rectangular area on the screen, that the computer depicts the screen rectangle with the camera's correct aspect ratio. In other words, as the user drags the mouse across some arbitrary region to define the desired scene, the computer may preferably maintain the aspect ratio of the rendered rectangle at an aspect ratio of 4:3, for example, to accurately depict the area to which the camera will be panned/tilted/zoomed.

It is important to note that the calculations can be performed at the monitor application, the server controlling the system, or in the tilt/pan/zoom/encoding appliance that is providing the view. In the case of performing the calculations at the monitor application, the application must have knowledge of the tilt/pan/zoom appliance. The calculations are preformed by the monitor station based upon knowledge of the appliance, then the tilt/pan/zoom parameters are transported to the appliance by the network, either through a server or directly, and the operation is performed. This has the advantage that the parameters can be easily updated, but has the disadvantage that the application has to have specific knowledge of the appliance geometry. In addition, if the application controls the camera directly, other applications may not know the current camera view and be unable to update their screens, etc.

In the case of performing the calculations at the monitor application, processing of the pan/tilt/zoom input data within the user application proceeds as follows:

When the user selects a camera for viewing, the camera's pan/tilt/zoom data are loaded from the server to the monitor application
  User selects a first $X_1, Y_1$ location on the display screen
  User drags the mouse or equivalent pointing device to a second location $X_2, Y_2$ on the screen, and releases the mouse button.
  Monitor application draws a box on the screen, superimposed over the image, with diagonal corners $X_1, Y_1$ and $X_2, Y_2$.
  Monitor application calculates the new zoom factor for the camera
  Monitor application calculates the new Pan/Tilt position $X_0, Y_0$, which is the center of the user's diagonal line.
  Monitor application determines the Pan/Tilt displacement vector from the present position to the new $X_0, Y_0$.
  Monitor application scales the displacement vector from pixels to actual pan/tilt/zoom values for the pan/tilt/zoom camera
  Monitor application transmits the displacement and zoom data to the camera via the network.

In the case of performing the calculations at the server, the selected screen coordinates from the monitor application are transmitted via IP to the server. The server has knowledge of the appliance and the calculations are performed by the server. The resulting tilt/pan/zoom parameters are transported to the appliance by the network and the operation is performed. The advantage is that the server can maintain the latest status of the camera view. This can then be shared with other applications and monitor stations for display and coordination purposes as has been previously discussed. This can greatly reduce latency in certain network configurations.

In yet another implementation, the screen vectors are transmitted to the appliance via the network directly or through the server. The appliance then calculates tilt/pan/zoom increments based upon the geometry of the appliance. This implementation has the advantage that the geometry does not have to be known by the application or the server. Various appliances of various geometries can take source commands from the application or server and perform the calculations locally based upon their individual parameters. Appliances of different geometries can then be driven by the same command data. A disadvantage of this approach is if the application controls the camera directly, other applications may not know the current camera view and be unable to update their screens, etc. The command processing sequence proceeds as follows:

User selects some location $X_1, Y_1$ on the monitor screen

Monitor application determines the displacement of $X_1, Y_1$ from the image center $X_0, Y_0$ Monitor application transmits this displacement vector to the appliance directly, or via the network server Appliance scales the displacement data according to it's current zoom setting Appliance moves to the new position $X_1, Y_1$ It is important to note that for all of the modes above, the operations of tilt/pan and zoom may be performed singly or in any combination of two or all three functions.

The foregoing described several different and distinct modes of pan/tilt zoom operation. One method described was a 'move to crosshair' mode. Another method involved selecting various pre-defined zones on the image. In yet another mode, the user drew a 'box' around some desired scene, and the monitor application determined the effective location of the box and moved the pan/tilt/zoom mechanism to match. Note that these various modes of controlling the pan/tilt/zoom camera are largely incompatible. It is thus necessary to pre-define a 'mode' button on the mouse or joystick or equivalent pointing device. This mode button allows the user to change from one mode to another. This 'mode' button is preferably a dedicated button on the pointing device. It may alternatively be an on-screen button, activated when the user clicks a mouse button normally used for some other purpose. In any case, current mode status is preferably displayed on the monitor application screen, and preferably in a manner suited to a user's peripheral vision, thus allowing the user to maintain visual focus on the actual camera video images.

Note also, in conjunction with the foregoing, that it may be preferable to inhibit some pan/tilt/zoom functions while others are taking place. Take, for example, the case where a user is in 'pan-to-crosshair' mode, has just positioned the crosshairs on some desired spot, and activated the function (normally done by releasing the mouse button or trigger). Activating the function causes the pan/tilt movement command to be sent from the monitor application to the pan/tilt camera. During the time that the pan/tilt camera is actually moving, it is undesirable to allow further user inputs. (Since the image on the user's screen is moving during this time, position commands derived from the screen are meaningless). It is preferable to suppress user pan/tilt inputs until the appliance reports that it has ceased moving.

Another important feature of these architectures is allowing the appliance to report the status of its position to the server or to the application. This allows positional display of the view to be presented by the viewing applications as has been described in some of the cross-referenced patent applications. This is accomplished by sending an inquiry via the network to the appliance, thus generating a response with the requested data.

Appliance status information may be stored at the server for inquiry. This has a great advantage when the appliance is positioned over a lower bandwidth and/or higher latency circuit. When other applications and viewers need to know the status of the appliance, they can inquire at the server which has stored an image of the appliance status. The server can then respond for the appliance, thus reducing the traffic required to the camera.

A further improvement includes status inquiries to the server to be serviced by the server, but if the information is non-existent or stagnant, then the server would make the inquiry of the appliance and update its table in concert with providing the information to the requestor.

Figure 3E:
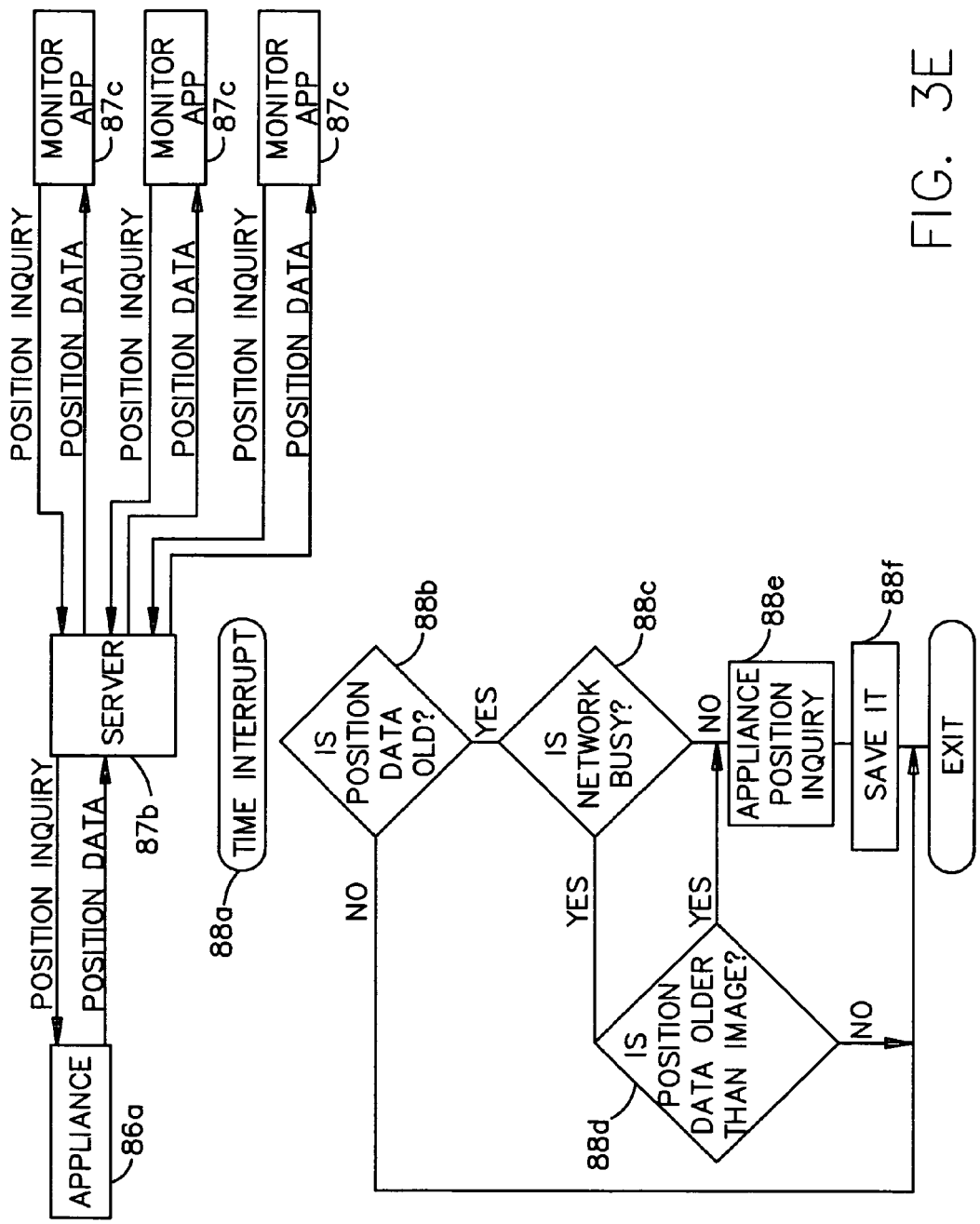
FIG. 3E depicts transactions between an appliance, a server, and monitor applications, and a flowchart describing a process for maintaining an updated cache of appliance position and zoom data in the server in accordance with a preferred embodiment of the present invention.

Yet another improvement, particularly for large enterprise networks, provides for the server to periodically update status of the appliance when bandwidth demands on the network are low. This can be accomplished by prediction, such as the middle of the night, or by actual measurement. FIG. 3E depicts the transactions (position inquiry and position data messages) between the appliance 86a, the server 87b, and monitor applications 87c, and a flowchart describing the process for maintaining an updated cache of appliance position and zoom data in the server. After a time interrupt 88a, for example, a determination is made regarding the age of the position data 88b. If the data is not old, the process ends. If it is old, however, a determination is made regarding the capacity of the network 88c. If the network is busy, a determination is made regarding the age of the position data versus the image 88d. If the position data is not older than the image, the process ends. If, however, the position data is older than the image, and if the network is not busy, an appliance position inquiry is determined 88e and saved 88f before the process ends. Megapixel sensor appliances have been extensively described in many of the cross-referenced patent applications. The ability of providing multiple streams from these sensors, including multiple streams from different areas of the sensor has been defined. These streams can be selected, switched, or simultaneously switched per the previous applications.

The techniques above of selecting tilt/pan/zoom parameters can be effectively applied to the selection of multiple streams from an appliance, such as specifying multiple sub-views from a megapixel camera. For example, in FIGS. 3F-3F4, a scene with four objects of interest is shown. The Graphical User Interface (GUI) is utilized to define a plurality of objects to be viewed from the wide-field of view. Each object is then provided with a stream that can be selected as one or a combination of two or more streams, combined into one master stream, or supplied as a plurality of streams. When a plurality of streams is generated, those can be processed by one application, such as a monitor station, or by multiple monitor stations. In addition, each stream may be defined as a unicast stream or a multicast stream as has been thoroughly described in my previous applications. Unicast streams and Multicast streams can be mixed when appropriate. When multicast streams are supplied, they may be received by one or more monitor applications. Multiple multicast streams or a multicast stream consisting of aggregated streams from multiple views can therefore provide for monitoring of multiple views on multiple monitoring stations.

In FIG. 3G, a megapixel imager 89a views a scene containing four different areas of interest. The imager's output signal is digitized 89b, and then logically separated into the four pre-defined regions of interest by a de-multiplexer 89c. Visual data from each such region is then separately compressed 89d and placed on a network transmit stack 89e for subsequent transmission into a network 89f. A GUI 89g allows a user to define properties for each of the defined regions of interest. In the example shown, the GUI indicates that the scene contains four defined regions of interest. The user has selected region 1 to be transmitted as a Unicast stream. Regions two and three have been selected to be transmitted as multicast, and have been defined to share a common multicast group address. Finally, region 4 has been defined to be transmitted as a multicast stream, with its own separate Multicast group address.

Figure 3H:
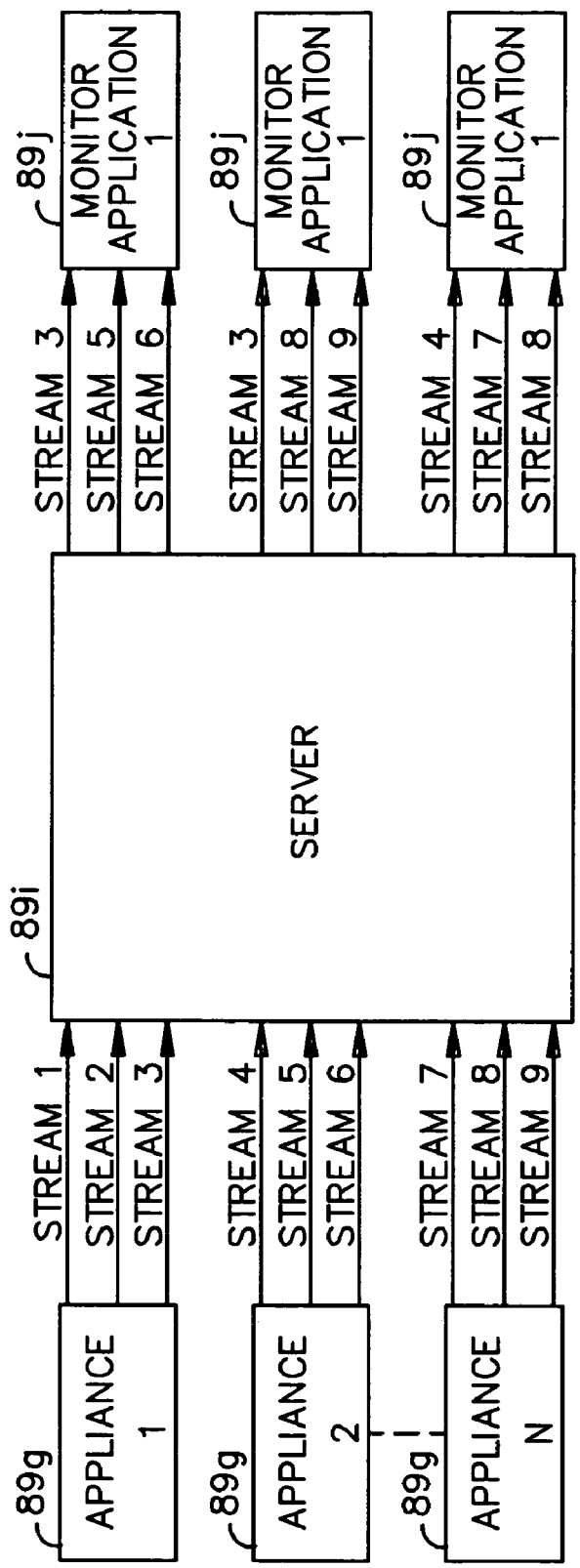
FIG. 3H depicts several appliances producing and transmitting multiple streams to a network server in accordance with a preferred embodiment of the present invention.

In some instances, dividing of image feeds is best done at the server. In this case a stream from the appliance consisting of aggregated views is sent to the server. Essentially the multiple streams are multiplexed and sent the server. The stream into the server would logically be a unicast stream, but could be multicast. The server then demultiplexes the stream and rebroadcasts them to the applications needing the data. The rebroadcasts can be either unicast streams to one monitor, multiple unicasts to multiple monitors, or multicast to multiple monitors. The streams can be sub-sampled or transcoded as well as is described in my previous applications. In FIG. 3H, several appliances 89h each produce and transmit multiple streams to a network server 89i. The server 89i forwards or re-broadcasts the streams to the various networked monitor applications 89i, as requested by each application. As previously described, each such stream may be modified by the server to meet the needs or restrictions of each monitor application. In other words, the forwarded or re-broadcast streams may be converted by the server from multicast to unicast or vice-versa, and may be translated or transcoded as necessary depending on requirements of the particular monitor application and associated network connection.

Camera Temperature Management

Typical cameras generally produce composite video and are connected by coaxial or twisted-pair cabling to some central point. As such, power consumption is typically quite low, often on the order of 2 Watts. The networked surveillance camera of the present invention is considerably more sophisticated than a simple analog camera and includes a high-speed video Analog-to-Digital (A/D) converter chip, several powerful Application Specific Integrated Circuits (ASICs) which perform, among other functions, real-time video compression, a sophisticated microprocessor, a great deal of memory, and network interface hardware. As such, power consumption is significantly higher than prior-art cameras, potentially on the order of 10 Watts. In addition, the surveillance cameras of the present invention are often located outdoors, where the temperature and solar heat load may be severe. This fact, combined with the increased power dissipation, mandates that aggressive temperature management techniques be employed.

The present invention accomplishes such temperature management through the use of innovative software and hardware. Referring now to FIG. 4, a networked surveillance camera 90 contains an analog camera 92, an A/D converter 94, video compressor chips 96, a processor 98 with associated memory 100 and other peripheral devices, and a network interface 102. In an outdoor setting, or even in an indoor setting if poorly ventilated, camera temperatures will rise above ambient temperature during camera operation.

Thermally, the 'weakest link' is the camera itself. Inside the overall device, the various semiconductor devices have maximum acceptable operating temperatures which are quite high—typically between 90° C. and 125° C. Video cameras, however, are typically specified with a maximum operating temperature of 40°-50° C. This limitation is due to two factors. First, video cameras often have moving parts such as focus motors, zoom motors, and iris motors. These are precision parts, operating through plastic gears and mechanisms. Elevated temperatures degrade the life expectancy of these parts. Second, the signal-to-noise ration of video imagers, particularly charge coupled device imagers, degrades rapidly with temperature.

In general, the electronic components are capable of operating safely at temperatures much higher than the camera's maximum operating temperature. It is possible, therefore, to thermally protect the camera by means of thermal management hardware and/or software operating within the device's firmware.

Referring again to FIG. 4, several temperature sensors 104 and 106 are logically connected to the system's 90 control processor 98. These temperature sensors may take a variety of forms, from simple resistive sensors, to more intelligent solid-state band-gap sensors. Logical connection to the system's control processor 98 may take a variety of forms, such as an $I^2C$ bus, SPI bus, A/D converter connected to a processor port pin, and the like. These sensors are located in tight thermal proximity to the devices of interest. For example, temperature sensor 104 is in close thermal proximity to the camera 92, and sensor 106 is in close thermal proximity to the system's control processor 98.

During operation, the control processor 98 periodically measures the temperature of the camera 92. As the camera's temperature rises during operation, control processor 98 compares the camera's temperature against a first pre-determined value representing the cameras maximum allowable temperature. As the camera's temperature approaches its maximum limit, hardware, software, and/or firmware executing in or via the system control processor 98 composes and transmits a warning message to networked server(s), and to any networked operators consoles which may be viewing the camera video. Messages to the networked server(s) may take the form of a simple data message, such as a UDP datagram, informing the server(s) of the camera's temperature. Servers may log this condition in a system database. Likewise, messages to any networked operators consoles which may be viewing the video may preferably be UDP datagrams, or alternatively may take the form of viewable video text superimposed over the compressed video scene transmitted by the camera.

As the camera's temperature continues to increase, the system control processor 98 may begin to reduce the system's heat load by selectively switching off various internal devices. For example, the plurality of video compression ASICs 96 (in this example, three ASICs are depicted) represent a major source of heat, dissipating approximately 1 Watt each. To reduce the system's 90 internal heat load, the system control processor 98 selectively removes power from these ASICs, or simply disables one or more of them, according to a predetermined sequence. For example, one of the ASICs may be compressing the video signal in a high-resolution, high frame rate format, while another ASIC may be compressing an occasional video frame into a still-frame JPEG image every few seconds. It is obviously preferable to disable the high resolution/high frame rate ASIC first, since it is dissipating more power. In this way, the ASICs may be selectively disabled by the system control processor, in an effort to manage the camera temperatures. In other embodiments, the ASIC dissipating the most power is not disabled first because the function of the ASIC may be deemed too important. Thus functionality of the ASIC is also an important consideration when determining whether or not to disable the ASIC.

As this process continues, the compressor ASICs 96 may eventually be shut down. At this point, the video digitizer 94 and the camera 92 may be shut down as well, since they are no longer in use. The system is still capable of communicating with the networked server(s), as well as with any networked operators consoles, but would not be transmitting any compressed video thereto because the video camera 92, the digitizer 94, and the compressors 96 have been shut down. The system 90 continues, however, to transmit status messages to the server(s) and monitor stations, if any.

In severe climates, the temperature may continue to increase to the point where the semiconductor components may be endangered. To prevent this scenario from unfolding, the system control processor 98 continues to monitor the system's internal temperatures. As the internal temperature reaches a second pre-determined value, the system control processor reduces its internal clock speed, to effect a further reduction in power consumption. During this time, the system control processor 98 maintains network communications via the network interface, and is thus able to report its temperature and other status to the networked server(s) and to any networked operators consoles which may be monitoring the camera.

As the temperature continues to climb, the system control processor 98 finally, as a last resort, places itself in a 'sleep' mode or state, where power consumption is effectively reduced to zero. Under control of an on-chip timer (which continues to run even during the 'sleep' mode), the system control processor 98 'awakens' periodically, to determine if the system operating temperatures are safe. If the system control processor's temperature is deemed unsafe, the processor 98 returns to the 'sleep' mode. If, on the other hand, the internal temperature has decreased to a pre-determined 'safe' value, the system control processor 98 resumes operation in the low-clock-speed mode, and resumes network communications. As the system's 90 temperature continues to decrease, the system control processor 98 returns power to the camera 92, the camera's A/D converter 94, and the video compressor ASICs 96, one at a time, in a sequential manner (such as from the ASIC that uses the least power to the ASIC that uses the most power, or vice versa) or in a dynamic and more arbitrary order.

Bandwidth Management

The video surveillance network, as depicted and described in FIG. 1, lends itself to widespread usage in mobile or remote applications. For example, one or more cameras may be geographically remote from the surveillance network proper, and may in fact be mobile. They may be connected to the surveillance network via some low-bandwidth communications link. On the other side of the network, for example, the operator's consoles may be geographically remote, or mobile, and may be connected to the surveillance network via some low-bandwidth communications links. The present invention includes useful techniques for dealing effectively with such low-bandwidth communications pathways.

Figure 5:
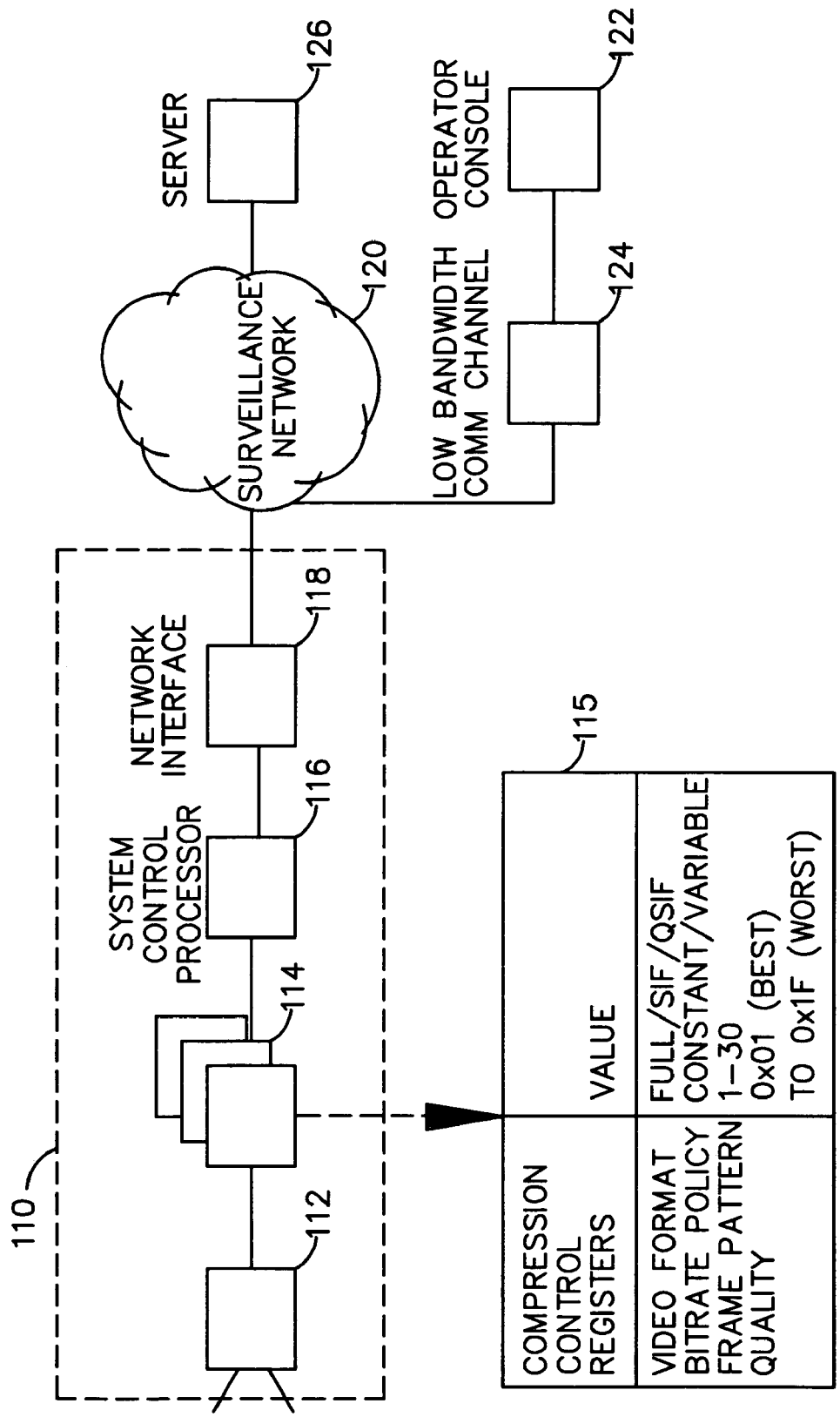
FIG. 5 depicts a camera system and configurable parameters in accordance with a preferred embodiment of the present invention.

Referring now to FIG. 5, an 'intelligent camera' 110, includes a camera 112 that produces a video signal, which is compressed by one or more video compressors 114 (the video digitizer is assumed), a system control processor 116 that executes the necessary network transmission stack and handles the network protocol, and passes compressed video data to network 120 via a network interface 118. It should be noted that any reference to a network, refers to a network that is able to transmit and receive messages to and from a camera, such as, for example, the camera 110. A remote, or possibly mobile operator console 122 is attached to the surveillance network 120 via a low-speed communications channel 124. For remote yet fixed-location operator's consoles, this communications channel 124 may be DSL, ISDN, ATM or the like. For mobile operator consoles, this communications channel may comprise a wireless service, such as IEEE 802.11, IEEE 802.16, GSM, CDMA, and the like.

Bandwidth Control Via Compression Parameters

Video compression devices have a number of configurable parameters, each of which affects the bandwidth of the compressed video stream. This concept is illustrated in table 115, which describes a set of control registers within such a compression device 114. As depicted, the Video Format register may be loaded with data which commands the device to compress the incoming video at various resolutions, from, for example, FULL (typically 704×480 pixels), SIF (352×288 pixels), or QSIF (176×144 pixels). Obviously, a choice of higher-resolution output format will result in a higher compressed bandwidth. Another register defines the Bitrate Policy, which may be set to command a variable bandwidth or constant bandwidth output. This choice again affects the compressed video output bandwidth. The Frame Pattern determines how many incoming analog video frames are compressed. For example, if a value of '1' is selected, then every incoming video frame will be compressed, resulting in a 30 frame per second output stream. If a Frame Pattern value of 10 is selected, then an output stream of only three frames per second will be produced, thereby reducing bandwidth dramatically. The Quality register may be set to select a Quality level from 0x01 to 0x1F. This effectively controls the degree of compression by selecting how much high-frequency content of the transformed data actually gets transmitted. This provides a means for making a trade-off between compressed image resolution versus amount of data transmitted. Lower resolution output streams require less communications channel bandwidth. Finally, the Stream Status register may be set to ON or OFF. When the Stream Status register is set to ON the video stream is transmitted as defined by the aforementioned compression parameters. When the Stream Status register is set to OFF, no data is transmitted.

The remote operator console 122, wishing to view video from the camera 110, makes a logical connection thereto via the available communications pathways 120 and 124. As part of this request, the console 122 provides the camera 110 with a set of video compression parameters to be used, as described in the foregoing. Within the camera 110, the system control processor 116 receives this compression configuration information. Based on this information, the system control processor 116 configures one or more of the video compression devices 114 to compress the available video signal to produce a stream which will not exceed the available communications channel capacity. As discussed earlier, circuits have a known fundamental bandwidth. For example, a wired ISDN circuit can have a fixed 128 kbps bandwidth. It is not normally susceptible to noise bursts and is dedicated point-to-point and therefore is not susceptible to peak data interruptions from other users. Other circuits, such as a DSL Internet connection, may have a known fundamental bandwidth, such as 1.5 mbps download and 256 kbps upload, but the peak load from shared use with other subscribers can reduce those data rates in an unpredictable manner. Yet other circuits, such as GPS wireless circuits or 802.11 W-LANS, are based on RF distribution techniques that are subject to environmental and man-made noise, transmission path irregularities, and competing systems on the same frequency in addition to shared use conflicts.

It is widely known that a number of parameters influence the output bitrate of a video compression system. Choice of a particular compression algorithm affects the output bit rate. In addition, the frame rate, or number of source frames coded per second, also directly controls output bit rate. In some motion-video schemes such as MPEG, system designers have some choice over allocation of intra- versus inter-coded frames, which allows the system designer to adjust output bit rate for a given frame rate. For example, output bit rate can be reduced by using fewer intra-coded frames and more intra-coded frames. Resolution of the source image obviously affects output bit rate; a 352×240 pixel SIF input image has one quarter the number of pixels as a full-resolution 704×480 pixel image. Finally, a 'degree of compression' parameter 'Q' controls the output bit rate by controlling (primarily) how much image detail data is transmitted. In concert, these are the primary variables controlling the system's output bit rate. For a given compression format, the system's output bitrate can be expressed generally as:

$$\text{OUTPUT BIT RATE} = \frac{K * \text{Frame Rate} * \text{Source Resolution}}{\text{Inter-Frame Rate} * Q * I \text{ Frame Spacing } (MPEG)}$$

Where 'K' is a system constant.

In previous systems disclosed in a number of the cross-referenced patent applications, the selections of Compression Algorithm, Spatial Resolution, Q, Frame Rate, and Target Bit Rate are 'dialed' in by the operator to generate a stream of a given nominal bandwidth. The operator may select these parameters until a combination happens to produce a stream whose bandwidth will fit in the available circuit bandwidth. This is relatively easy in the case of a circuit that has a fixed reliable bandwidth, but becomes problematic on circuits with dynamically and unpredictable bandwidths. If the operator does not de-rate the stream bandwidth selected, when the circuit effective bandwidth is reduced by noise, errors, or traffic, the delivered video can fail.

To address these issues, several techniques have been developed. First, to assist an operator in a manual set-up situation, a table of preferred parameters is generated based on bandwidth. For example, a table may have a selection of Image Resolution, Compression Algorithm, Quality of compression (Q), and Frame Rate specified. When a given maximum bandwidth target is specified, a preferred combination of parameters can be selected. The table may be constructed by the manufacturer based on their experience, or by the user based on the user desires. Other parameters may also be in the trade space, such as Color vs. Monochrome, or co-stream Audio On vs. Audio Off.

| BANDWIDTH | RESOLUTION | COMPRESSION | Q | FRAME RATE |
|---|---|---|---|---|
| 128 K | SIF | MJPEG | 16 | 2 |
| 256 K | QSIF | MPEG-4 | 12 | 15 |
| 900 K | QSIF | MPEG-1 | 6 | 15 |
| 1.5 M | SIF | MPEG-1 | 5 | 30 |
| 3.0 M | SIF | MPEG-2 | 3 | 30 |
| 6.0 M | SIF | MPEG-2 | 1 | 30 |

In the chart above, note that selections have been made that nominally produce improved video delivery that tracks circuit bandwidth (compressed image size is normally a function of the reciprocal of the 'Q' parameter). There may be multiple tables based on user requirements. For example, resolution of the video may be more important than frame rate. If it is critical to read license plates or identify individuals, a given resolution may be required. Other applications may require emphasis on frame rates, but resolution is not as important. Counting traffic on the freeway may require higher frame rates, for example.

Tables may be constructed based on user requirements and selected based on user interface. For example, 1) The GUI may provide for entry of the maximum Bandwidth. That would index into the table.
2) The GUI may also provide for entry of required Quality. That would select the tables that would be indexed to.
3) The GUI may provide for entry of required Frame Rate. That would select the tables that would be indexed to.

As mentioned previously, these parameters of bandwidth, resolution, and frame rate are interrelated, and a trade-space is generated. Adjusting one parameter will affect the other two. A GUI can be constructed that automates this interdependence. For example, three slide-bars may be implemented for Bandwidth, Quality, and Frame Rate. Adjusting one upward would drag down one or both of the other parameters. Conversely, adjusting one downward would adjust one or both of the other parameters. The user could then ultimately come up with settings of all parameters to produce the desired performance based upon available resources.

An important feature is to allow display of the video Quality and Frame Rate in near real-time as the adjustments are made. This allows the user to see the actual effect of the adjustments.

It is important to note that this technique can be used for adjustment of other parameters or fewer or more parameters than are illustrated. For example, for the purposes of simplifying the illustration, image resolution and Q setting are grouped together in the "Quality" user interface setting because they have similar effects on the image. These could be broken out if the user needs to have specific control on these parameters. Other parameters, such as monochrome/color, can also be included.

It is also important to note that algorithms can be utilized in combination with or in lieu of tables. In this manner, specific equations would define the settings that would be utilized for a given input parameters, such as bandwidth. This technique may give a greater accuracy in setting parameters based on inputs, but the complexity of setting up equations is greater than generating tables. It is also less easily changed because programming is required as opposed to adjusting of values in tables. For this reason, table driven approach is a great advantage and was selected for the preferred embodiment.

The above discussion describes manual selection of parameters by the operator based on GUI. It is also desirable to automate the process for several reasons. Automated selection is an advantage because it removes a requirement from the user. Users do not have to be trained in the intricacies of the adjustments, and cannot forget to make the selection or select optimized parameters. It is also very desirable in the case of circuits that are dynamically changing in effective bandwidth because the system can automatically change parameters based on the measured performance of the circuit at a given time.

Monochrome vs. Color selection is another parameter that can be used to match available bandwidth with data stream size. It is well known that a color image stream at a given image resolution requires more bandwidth transmit than a monochrome stream does. A table entry, therefore, can be color vs. monochrome encoding selection.

Color itself can have a "quality" range. The amount of information sent, thus bandwidth needed, can be varied based on need. It is well known that perception of color is a non-linear function. The brain does an amazing amount of prediction and processing of color in color perception. Because color is sometimes useful not in an absolute sense, but is useful in distinguishing features that are of a different color while perhaps not of a different luminance, we do not always have to represent information representing precise color rendition as is taught in the Land papers. Based on this concept, we can find advantage in allowing the user to specify the "quality" of the color that is needed. In a preferred embodiment, a GUI would provided a Color Q slide bar that would allow the user to "dial in" the amount of color accuracy required. Or this bar could be served with the other parameters, with calculations of required bandwidth being accumulated with the other bandwidth needs in order to present the possible selections.

In a preferred embodiment of the present invention, the GUI could look similar to the following:

```
FRAME RATE               --------X---------
SPATIAL RESOLUTION       -----------X------
IMAGE QUALITY            ---------X--------
COLOR QUALITY            -----X------------
AUDIO QUALITY            --------X---------
AUDIO CHANNELS               0  1  (2)  3  4
REQUIRED BANDWIDTH = 2.66 mbps
```

An improvement on the above is to present the bandwidth required for various components of the stream as is illustrated as follows:

```
VIDEO STREAM - BANDWIDTH = 1.90 MBPS
FRAME RATE               --------X---------
SPATIAL RESOLUTION       -----------X------
IMAGE QUALITY            ---------X--------
COLOR STREAM - BANDWIDTH = 0.56 MBPS
COLOR QUALITY            -----X------------
AUDIO STREAM BANDWIDTh = 0.20 MBPS
AUDIO QUALITY            -------X----------
AUDIO CHANNELS               0  1  (2)  3  4
TOTAL REQUIRED AGREGATE BANDWIDTH = 2.66 mbps
```

It is important to note that the GUI can be adapted within these concepts to meet user's preferences. For example, a two-dimensional trade-space control can be fabricated. Clicking in any point within the triangle will define the tradeoff of Resolution, Frame Rate and Bandwidth.

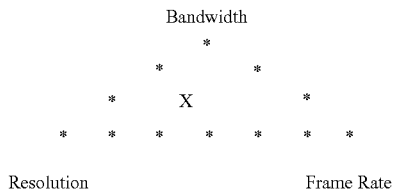

In the case of automatic selection, the system measures the circuit effective bandwidth and feeds the table or algorithm input enabling the other parameters to be selected for optimal performance. As discussed earlier, it is possible to set parameters that will exceed the effective bandwidth of susceptible channels during noise or peaks. The system must detect this condition and adjust accordingly. This is a "servo" technique that is well known by those familiar with the art. The application of the servo technique with the table driven parameters, or with the calculation technique, provides for a significant improvement over the current state-of-the-art.

Another improvement is a combination of manual and automatic techniques above. For example, it is desirable to allow the user to input some tradeoffs, such as frame-rate vs. quality, yet have the bandwidth determined dynamically and transparently to the user as described above. This is "the best of both worlds" in that it allows the user to configure general parameters that he or she cares about, yet the system can continuously and transparently adjust a multitude of specific parameters based on measured bandwidth. This delivers optimal video for any given time within the desires of the user.

The preferred embodiment of this invention utilizes a GUI slide bar for selecting the degree of Frame Rate vs. Quality, Radio Buttons for Monochrome vs. Color vs. Automatic. This specifies the tables or equation entries that will be used. Bandwidth indexes into the tables or the equations are then supplied by the bandwidth measurement servo.

In another embodiment, the remote or mobile operator console 122 uses a server 126 as an intermediary when requesting the video stream from the camera 110. In this scenario, the operator console 122 sends the video stream request to the server 126. The server 126 has a-priori knowledge of the capacity of the low-bandwidth communications channel 124, by, for example, having been pre-configured with this 'bandwidth' data during installation of the communications hardware or via an automated diagnostic test. In either case, upon receipt of the video request from the operator console 122, the server 126 configures the compression configuration registers 115 within the camera 110 so as to produce a video stream which does not exceed the channel capacity to the operator console 122.

Figure 6:
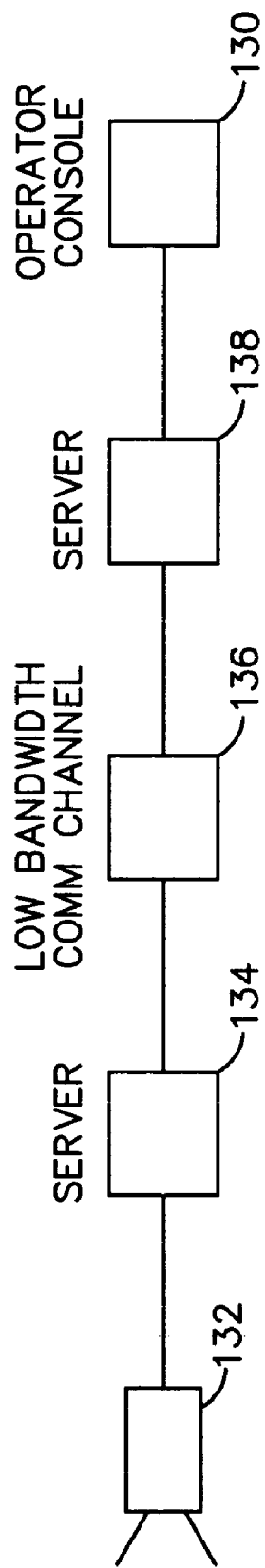
FIG. 6 depicts a camera system with intermediary servers in accordance with a preferred embodiment of the present invention.

Referring now to FIG. 6, an operator console 130 uses two network servers 134 and 138 as intermediaries when requesting the video stream from the camera 132. In this scenario, the operator console 130 sends the video stream request to the server 138, which then routes the request to the server 134. The server 134 has a-priori knowledge of the capacity of the low-bandwidth communications channel 136, either by having been pre-configured with this 'bandwidth' data during installation of the communications hardware, or via an automated diagnostic test. In either case, upon receipt of the video request from operator console 130, the server 134 configures the compression configuration registers within camera 132 so as to produce a video stream which does not exceed the channel capacity to the operator console 130.

Bandwidth Control Via Automatic Stream Selection

The present invention describes methods to control bandwidth utilization via the use of compression parameters. Such methods are more effective when used with some video stream types than with other stream types. When bandwidth is severely limited, the most effective bandwidth control is obtained when cameras produce those video stream types that offer more effective bandwidth control.

Referring again to FIG. 5, the operator console 122 connected to the network interface 118 may receive high-bitrate video streams from the camera 112 through the surveillance network 120. The low bandwidth channel 124 does not have sufficient capacity to transmit the high-bitrate streams to the operator console 122. When a video stream from the camera 112 is selected for viewing on the operator console 122, the console 122 automatically switches the camera 112 to an alternate stream type and provides the camera 112 with a set of video compression parameters such that the video stream produced by the camera 112 will not exceed the capacity of the communications channel 124. When the video stream is subsequently de-selected on the operator console 122, the console 122 automatically switches the camera 112 back to the original high-bitrate stream.

Figure 5A:
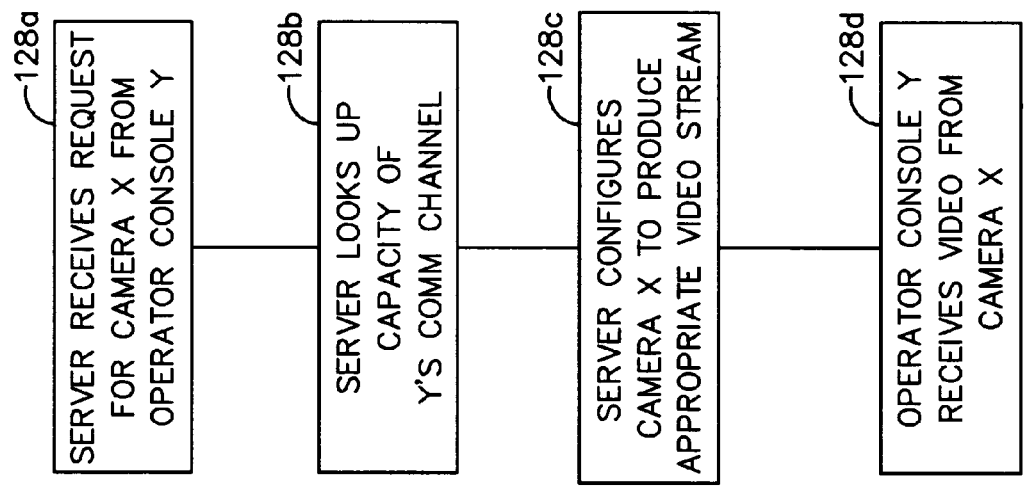
FIG. 5a depicts a flow chart describing a video request via a channel in accordance with a preferred embodiment of the present invention.

Referring now to FIG. 5a, a flow chart describing a video request via a channel is depicted. At step 128a, a sever receives a request for a particular camera (such as camera x) from an operator console (such as operator console y). The server looks up the capacity of the operator console's communication channel at step 128b and configures the camera to produce an appropriate video stream based on the capacity at step 128c. At step 128d, the operator console receives the video stream from the camera via the communication channel.

Referring again to FIG. 6, the operator console 130 uses two network servers 134 and 136 as intermediaries when requesting the video stream from the camera 132. In this scenario, the operator console 130 sends the video stream request to the server 138, which then routes the request to the server 134. The server 134 has a-priori knowledge of the capacity of the low-bandwidth communications channel 136, either by having been pre-configured with this 'bandwidth' data during installation of the communications hardware, or via an automated diagnostic test. In either case, upon receipt of the video request from the operator console 130, the server 134 automatically switches the camera 132 to an alternate stream type and provides the camera 132 with a set of video compression parameters such that the video stream produced by the camera 132 will not exceed the capacity of the communications channel 136. When the video stream is subsequently de-selected on the operator console 130, the server 134 automatically switches the camera 132 back to the original high-bitrate stream.

Bandwidth Control Via Conditional Transmission

A video surveillance network, as described in FIG. 1 and associated description, may be so designed that multiple cameras are separated from the surveillance network proper by a low-bandwidth communications link. The link may be such that it is not possible to transmit all of the compressed video from all of the cameras simultaneously. Less bandwidth is required if cameras transmit data over this link only when the data are required by devices in the surveillance network proper. When data from a camera is not so required the data are not transmitted, thereby conserving communications bandwidth.

Figure 7:
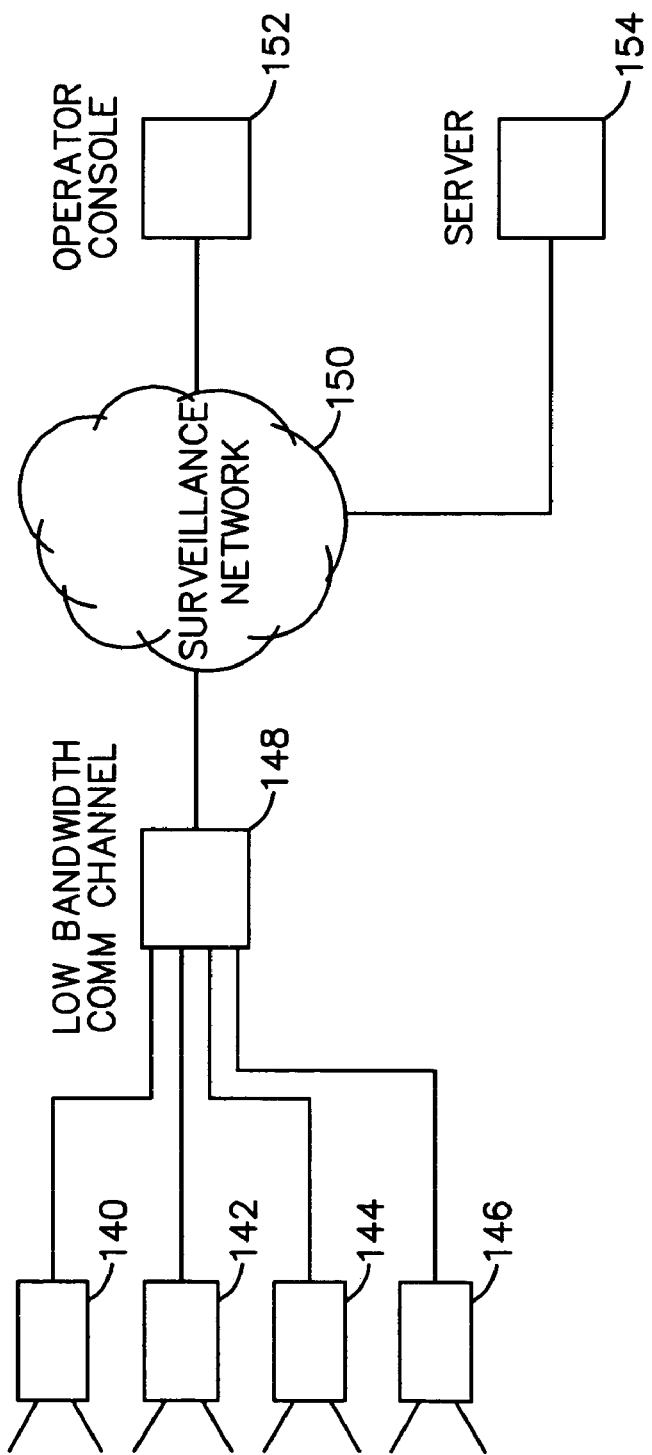
FIG. 7 depicts a system including multiple cameras in accordance with a preferred embodiment of the present invention.

Referring now to FIG. 7, multiple cameras 140-146 are separated from the surveillance network 150 by a low-bandwidth communications channel 148. Initially, all of the cameras' 140-146 Stream Status registers are set to OFF, as described above, and no data are transmitted over the low-bandwidth communications channel 148. When a video stream from camera 146, for example, is selected for viewing on the operator console 152, the network server 154 re-configures the Stream Status register within the camera 146 to ON, causing the camera 146 to transmit the video stream through the low-bandwidth communications channel 148 to the surveillance network 150, and thence to the operator console 152. When the video stream is subsequently de-selected on the operator console 152 and therefore no longer required, the network server 154 re-configures the Stream Status register within the camera 146 to OFF, causing the camera 146 to stop transmitting the video stream through the low-bandwidth communications channel 148.

Referring again to FIG. 6, the operator console 130 uses two network servers 134 and 136 as intermediaries when requesting the video stream from the camera 132. In this scenario, the operator console 130 sends the video stream request to the server 138, which then routes the request to the server 134. Initially no video streams are transmitted from the server 134 to the server 138 through the low-bandwidth communications channel 136. Upon receipt of the video request from the operator console 130, the network server 138 begins transmitting the video stream for the camera 132 through the low-bandwidth communications channel 136 to the network server 138 and thence to the operator console 130. When the video stream is subsequently de-selected on the operator console 130 and therefore no longer required, the network server 138 stops transmitting the video stream for camera 132 through the low-bandwidth communications channel 83.

Bandwidth Control Via Sub-Sampling at the Server

In one embodiment of the present invention, reducing compressed video bandwidth occurs via the 'frame pattern' parameter. This parameter, an integer, essentially commands that every $N^{th}$ frame of available video be compressed and transmitted. For example, a value of '2' commands that every other video frame be transmitted, resulting in a compressed frame rate of 15 frames per second (given a 30 frame-per-second input). A value of '4' produces a 7.5 frame-per-second output, and so on. This is a simple manner in which to control the bandwidth of the compressed video stream. This function may be performed after the compressed stream has already been generated at its full frame rate which allows greater flexibility in the generation and dissemination of the compressed video stream.

Figure 8:
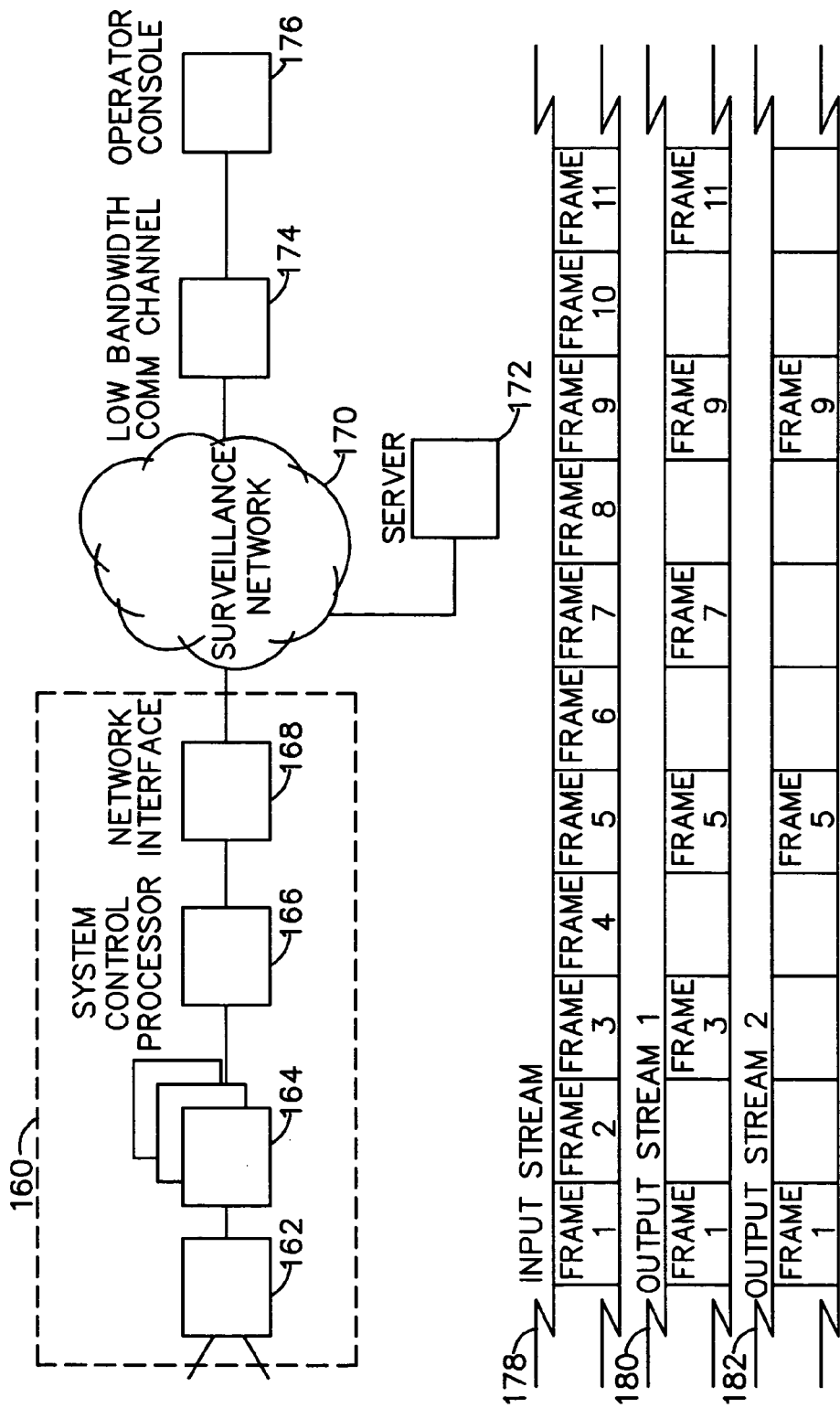
FIG. 8 depicts a camera system and input and output streams in accordance with a preferred embodiment of the present invention.

Referring now to FIG. 8, a camera system 160 includes a camera 162, one or more video compression devices 164, a processor 166, and a network interface 168. The camera system's 160 connection to a surveillance network 170 has sufficient bandwidth to support a full 30 frame-per-second compressed video stream 178. A server 172 receives this stream 178 via the surveillance network 170. A remote or mobile operator console 176 places a request to the network server 172 for a video stream from the camera system 160. The server 172 has knowledge of the capacity of the low-bandwidth communications channel 174, as previously described. The server 172, based on that knowledge, begins forwarding selected frames of the requested video stream to the operator console 176. The choice of how often to forward a frame is based on the server's 172 knowledge of the channel capacity of the low-bandwidth communications channel 174. For example, if the channel 174 has moderate capacity, the server 172 may discard alternate video frames, thus forwarding to the operator console 176 a video stream with half of the original data. The stream could, alternatively, be reduced to one-fourth of its original size by forwarding only every fourth frame. In general, the server decimates the incoming compressed video stream by discarding every $N^{th}$ frame, as necessary to create a lower bitrate stream which will not exceed the available channel capacity.

In an alternate embodiment, and referring again to FIG. 6, the operator console 130 uses two network servers 134 and 138 as intermediaries when requesting the video stream from the camera 132. In this scenario, the operator console 130 sends the video stream request to the server 138, which then routes the request to the server 134. The server 134 has knowledge of the capacity of the low-bandwidth communications channel 136, as previously described. The server 134, based on that knowledge, begins forwarding selected frames of the requested video stream to the server 138 and thence to the operator console 130. The choice of how often to forward a frame is based on the server's knowledge of the channel capacity of the low-bandwidth communications channel 136, as previously described, in order to create a lower bitrate stream which will not exceed the available channel capacity Bandwidth Reduction Based on Number of Viewed Panes The use of simultaneous multiple video 'panes' on an operator's console has been disclosed. These panes are used to display video streams received from more than one of the networked surveillance cameras. For a remote or mobile operators console with limited communications channel capacity, the support of multiple video panes is problematic. Each additional stream selected by the operator adds another stream to the communications channel, and the channel capacity may easily be exceeded if too many simultaneous video streams are selected.

In one embodiment of the present invention, a network server is able to intelligently sub-sample a sequence of incoming video frames, so as to reduce the streams' bit-rate according to some channel capacity. It is important to ensure that channel capacity is not exceeded if too many video panes are selected on the operator console.

Figure 9:
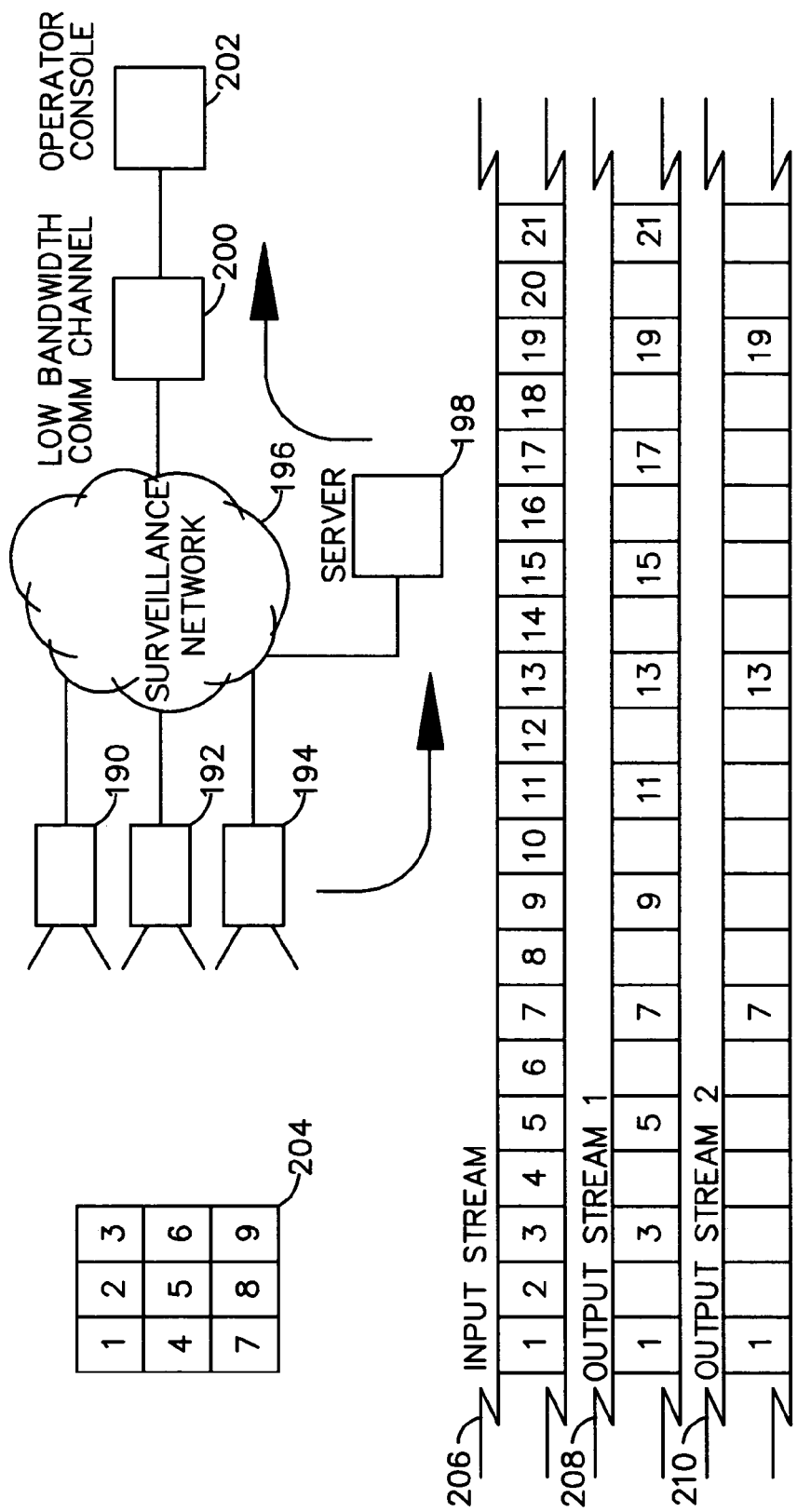
FIG. 9 depicts a system including multiple cameras and input and output streams in accordance with a preferred embodiment of the present invention.

Referring now to FIG. 9, several cameras 190-194 are attached to a surveillance network 196, and send a full thirty frame-per-second compressed video sequence to a server 198. The surveillance network 196 has sufficient capacity to convey all these full-frame-rate streams. An operator console 202 is connected to the surveillance network 196 via a limited-bandwidth communications channel 200. As previously described, the server 198 is aware of the capacity of the communications channel 200. The server 198 accordingly forwards a selected video stream to the operator's console 202, discarding frames as necessary to arrive at a stream sufficiently small as to not exceed the channel capacity.

The operator's display 204 on the operator console 202 is subdivided into some number of video panes. The actual number of panes may be one, four, nine, or some other number, depending on the size and resolution of the device's display. The operator may summon up video from any camera on the network, and display that camera's video in a selected pane. All such video streams actually pass through the server 198, which forwards frames as necessary to the operator console 202. The server 198 is, therefore, aware of the number of streams being forwarded to the operator console 202. When only one video stream is being forwarded to the operator console 202, the server sub-samples the thirty frame-per-second by some number, according to the channel capacity. In the example depicted, the server sub-samples its input stream 206 by two, producing an output stream 208 which contains every other input frame. If the operator attempts to summon up two additional video streams into other video panes, the capacity of the communications channel 200 may be exceeded. Accordingly, the server 198 now sub-samples the stream more aggressively, sending only every sixth frame from each of the streams. In general, as more streams are selected for more viewing panes, the server increases the number of input frames which it discards. In this way, the server can maintain the volume of traffic being sent through the limited communications channel, and never exceed its capacity.

Bandwidth Control Via Discarding Frames Ad-Hoc

A means of reducing and controlling the amount of network traffic through the use of a 'frame pattern' integer N has been disclosed. The camera decimates frames by this amount, i.e. given a value of N=4, the camera compresses and transmits every fourth frame, thus reducing the amount of video data that must be borne by the network. While useful, note that this method results in a continuous reduction in the camera's transmitted frame rate. In another embodiment of this invention, individual frames may be dropped on an as-needed basis, depending on either the size of the video image after compression, or on the current value of network payload.

An operator's console can be connected to a surveillance network via a low-bandwidth communications channel. Application software in the operator's console continuously monitors the amount of data being carried by the channel. It may, for example, keep track of the level of the console's receive FIFO, or may keep track of the number of receive buffers that are allocated and used during some time interval. In either case, the operator's console software maintains knowledge of the amount of data being carried by the channel.

Traffic through such a network is often bursty, exhibiting occasional transient intervals of intense activity. During such intervals, the video data being transmitted to the operator's console may exceed the channel capacity. As previously described, it is possible to prevent this by selecting a frame pattern 'N' which reduces the video data to an acceptable rate. This results, however, in a long-term reduction in video frame rate. In an enhancement of the invention, individual frames may be dropped as needed, during periods of heavy network traffic. To accomplish this, the operator console software tracks current receive channel usage using one of the methods previously described, and continually and periodically reports this data to the network server. The server forwards this 'remaining capacity' data to the originating camera. Thereupon the camera, on a frame-by-frame basis, compares this 'remaining capacity' data with the size of the current image to be transmitted. If the size of the current image is large enough to exceed the 'remaining capacity' of the low-bandwidth communications channel, then the camera does not transmit the image. The camera receives another 'remaining capacity' message from the operator console software and forwarded by the server, and also captures and compresses another frame of video. Again, the camera compares the 'remaining capacity' data with the current image size, and transmits the image only if the low-bandwidth channel capacity will not be exceeded. In this way, frames are discarded only as needed, and not continuously as in the case using the 'frame pattern' parameter N.

Note that in those cases where the camera video is being routed through the server to be re-broadcast or re-formatted, this 'ad-hoc frame dropping' method may be advantageously employed in the server itself. The primary advantage of this approach is that it supports the simultaneous use of several different remote operator consoles, through different low-bandwidth communication channels. These different channels may have different capacities and may carry different amounts of traffic. If the video data is sent to the server at the fastest possible frame rate, then the server may selectively apportion frames to the various operator consoles, individually based on each channels capacity and current payload.

Bandwidth Control Via Delaying Frames

While effective, the approach of dropping every Nth frame or dropping frames ad-hoc may result in video that is spasmodic or jerky. This may in fact be the optimal approach with certain network topologies and loads. However, in many cases it may not be necessary to actually discard video frames during brief periods of transient network loads. In another embodiment of the invention, the frame transmission time is delayed slightly to accommodate a brief-duration peak in network traffic. In this embodiment, the network camera again receives periodic messages from the remote operator console describing the remaining capacity of the low-bandwidth communication channel. The camera, in turn, compares the size of the current image with the 'remaining capacity' of the low bandwidth communication channel. If the current image would exceed the channel capacity, then the camera does not transmit it—but in this case the camera does not discard it. The camera awaits the receipt of the next 'remaining capacity' message and again compares it with the image size. The image is transmitted if it will not exceed the channel capacity.

As before, this may be accomplished in the camera itself, however, it may be advantageously done within the network server. The previously-described advantages apply; if the server is supporting forwarding or re-broadcasting video to several distinct and dissimilar low-bandwidth communications channels, then the server may separately and individually delay frames to each channel, according to each channel's needs.

Pan/Tilt/Zoom Cameras and Further Control Methods

Cameras that have high resolution or that have pan, tilt and zoom capability are now being integrated into DVR and IP video systems such that viewing of a wide area of view can be accomplished. Several of the cross-referenced patent applications describe systems and methods to alleviate this problem. Currently this is being done by manual control "driving" pan/tilt/zoom views manually around the scene. The present invention describes advanced techniques of installing, controlling, managing and viewing pan/tilt/zoom and megapixel cameras in security and surveillance systems.

Megapixel video imagers provide opportunities for novel pan/tilt/zoom techniques. For example, a megapixel imager or array thereof may be held physically immobile, and the various tilt/pan/zoom functions may be accomplished 'virtually' in software. The elimination of moving parts reduces system cost, and improves tracking speed. Moreover, as megapixel imagers continue to offer ever-greater resolution, the 'virtual zoom' functions may be accomplished without loss of image resolution, as compared with traditional analog video systems.

Various lenses also exist that can be placed on a camera that has a 360 degree field of view. The resulting raw image is "doughnut shaped" and distorted by the geometry of the lens. Software is then used to "de-warp" the image and to emulate pan/tilt/zoom functions within the field of view of the 360 degree lens.

Advanced Tilt/Pan Control Techniques

Cameras with tilt/pan capabilities have been in common use for many years. These typically comprise a motorized camera mount, which physically move the camera horizontally (pan) and vertically (tilt). Some of these cameras also allow an operator to 'zoom' the camera in or out of a given scene. The operator typically controls camera movement with a joystick or equivalent pointing device. More recently, some systems provide a means for operator control of the camera via a computer mouse or equivalent input device. In each case, control of the camera's tilt, pan, and zoom positions are under direct mechanical or electrical control of a human operator. The introduction of computers into both the viewing stations and the cameras themselves, allows opportunity for a variety of novel means of manipulating the tilt/pan/zoom functions.

Figure 10:
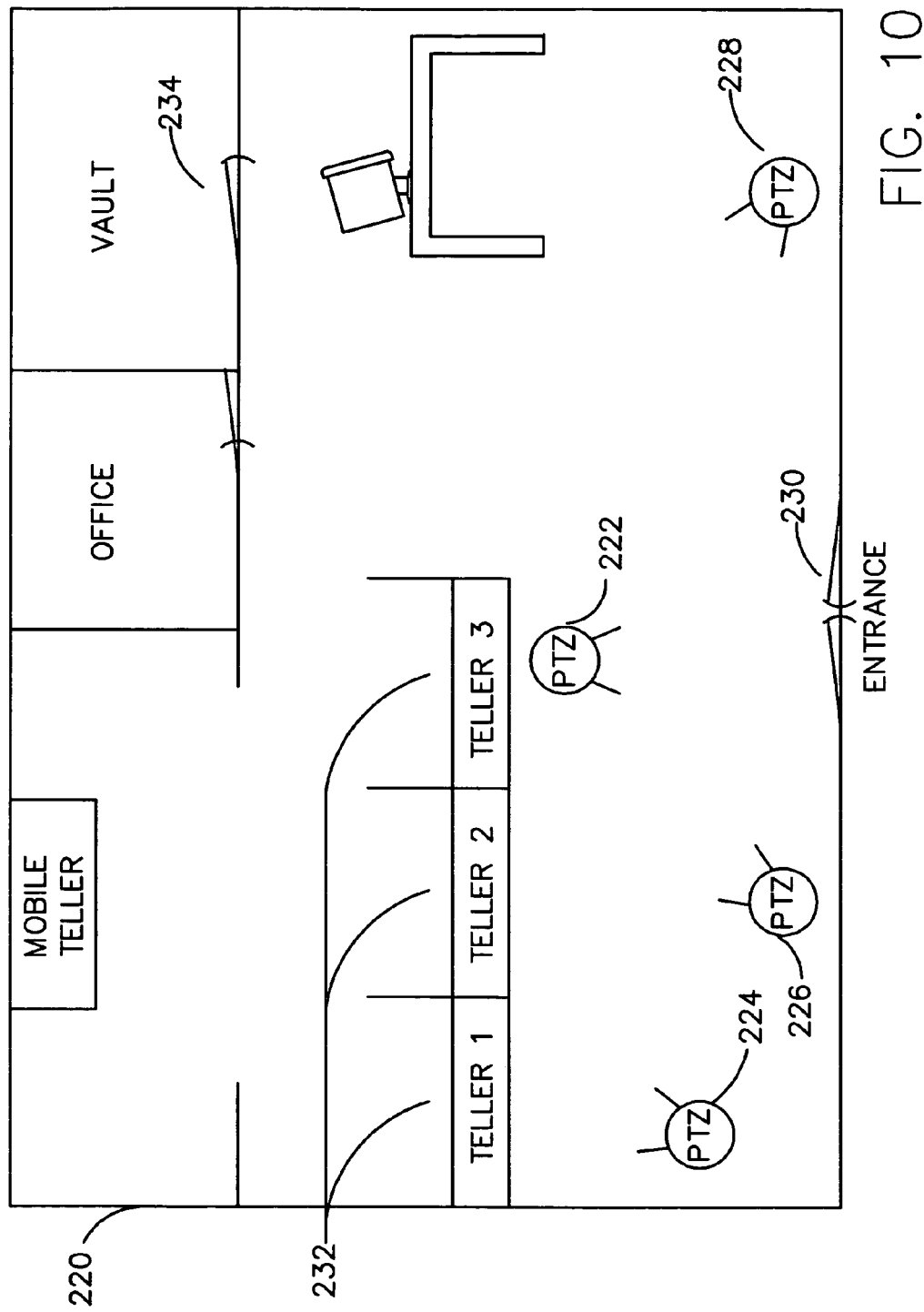
FIG. 10 depicts a map which graphically depicts the location of various cameras around a facility in accordance with a preferred embodiment of the present invention.

Placing Datum on a Map and Directing a Pan/Tilt/Zoom Based on Clicking on the Map Referring now to FIG. 10, a networked viewing station or operator console displays a map 220 which graphically depicts the location of various cameras 222-228 around a facility, for example. Some of these cameras 222-228 are capable of pan/tilt/zoom operation, as indicated by their distinctive icons. The map 220 also graphically depicts the locations of various points of interest within the facility. For example, an entrance door 230, a teller window 232 and a vault door 234 are indicated as icons on the map 220.

The networked viewing station contains predefined tilt/pan/zoom data for each point of interest, for each camera. For example, the camera 222 is situated to be capable of viewing the entrance door 230, while cameras 224-228 are situated within view of the teller window 232. The viewing station contains tilt/pan/zoom data for camera 222, as necessary to position the camera to view the entrance door 230. The viewing station also contains tilt/pan/zoom information for cameras 224-228 to point to the teller window 232.

In the present invention, it is not necessary for an operator at the viewing station to manually move and zoom a camera to a desired view. Instead, the operator need only click or otherwise select the appropriate icon or datum on the displayed map 220. The viewing station determines which of the cameras 222-228 are within sight of the selected spot within the facility, and sends tilt/pan/zoom commands to the cameras. For example, when a user clicks on the vault door 234, cameras 222 and 228 move to point towards the vault door 234.

In an alternative embodiment of the present invention, the tilt/pan/zoom data for each point of interest is stored in a table located within each of the cameras, rather than centrally stored in the viewing station. In this embodiment, when an operator at the viewing station clicks or otherwise selects an icon or datum on the displayed map, the viewing station sends data representative of the selected location of interest to the camera. The camera then retrieves the tilt/pan/zoom data necessary to view the item or location of interest.

Using a Regular Camera with Aide Angle in Conjunction with a Tilt/Pan/Zoom to Zoom in the Field When using a tilt/pan/zoom camera as described, a 'wide' view of the overall scene is inherently sacrificed when the camera is moved and zoomed to some small scene. Events occurring in the wide-area will be missed during the time that the camera is pointed and/or zoomed to some smaller area.

This deficiency may be overcome by combining the use of two cameras: one camera to capture an image of the wide scene, and a second, co-located camera to tilt/pan/zoom to some smaller area of the scene. The camera capturing the wide scene may be an immobile 'fixed' camera. Alternatively, the wide-area camera may be a tilt/pan camera without 'zoom' capability, or may be another tilt/pan/zoom camera which, under software control, is not commanded to zoom.

In any case, the wide area camera captures an image of the overall area. An operator at a networked viewing station views, simultaneously, the image captured by the wide-area camera, and the image captured by the companion tilt/pan/zoom camera. The operator may manually control the second camera's tilt/pan/zoom position, using traditional manual techniques, without thereby sacrificing the overall view of the wide-area scene.

Alternatively, the operator controls the tilt/pan/zoom location of the second camera by clicking or otherwise selecting a location on the wide-area image. Software, located within the networked viewing station, for example, thereupon directs the tilt/pan/zoom of the second camera. Yet another user control method uses computer-generated crosshairs, superimposed over the image produced by the wide-field camera. Using a mouse, joystick, touch-screen, or equivalent method, the user controls the position of the on-screen crosshairs, and commands pan/tilt movement to that location by activating a mouse or joystick button, or by double-tapping the touch screen, or equivalent method. Note that the wide-field camera may remain immobile while the narrow-field camera moves, or both may move to the commanded spot.

Figure 11:
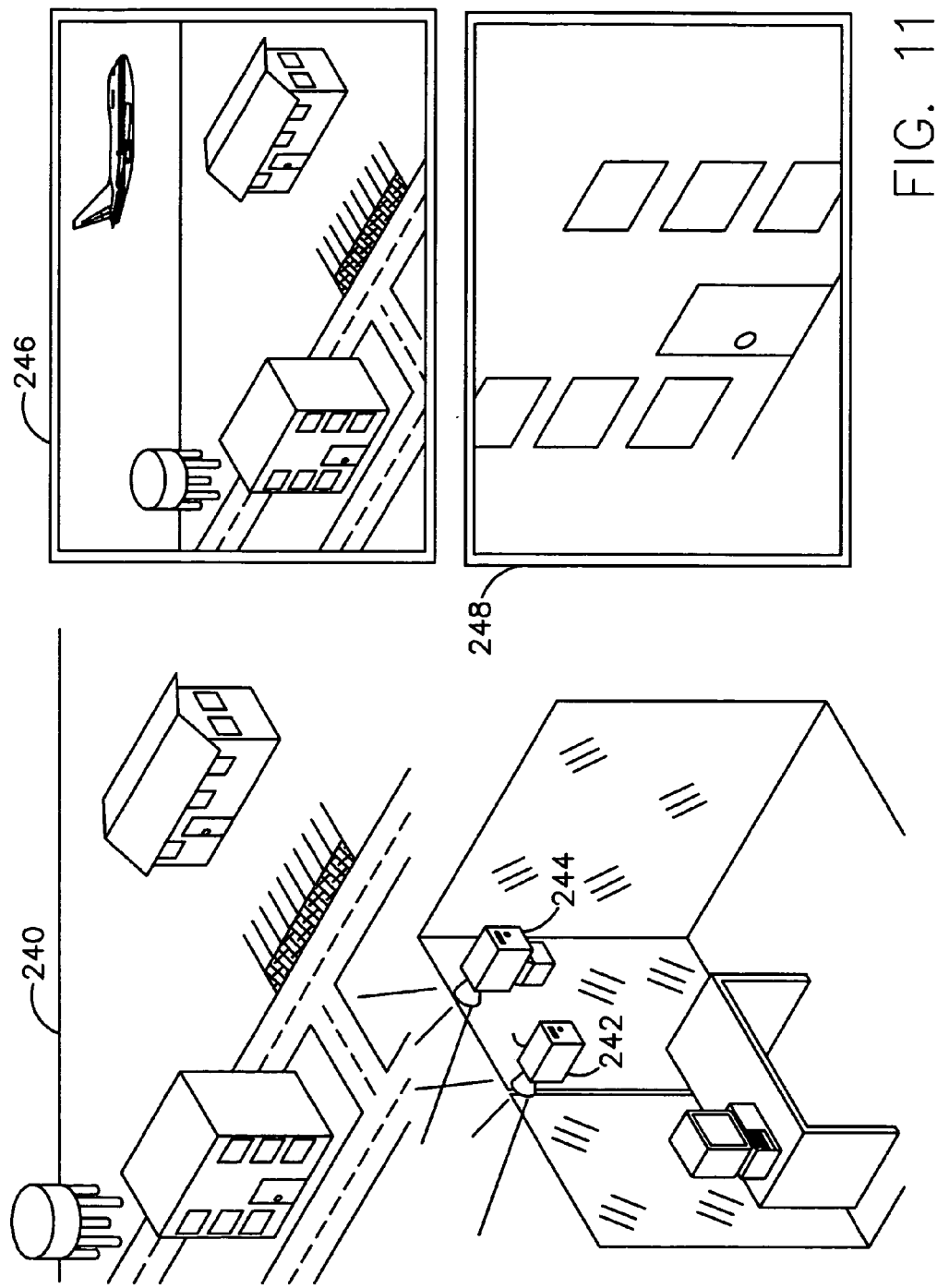
FIG. 11 depicts views of a wide-angle image and a narrow-angle image in accordance with a preferred embodiment of the present invention.

Referring now to FIG. 11, a scene 240 is captured by a wide-area camera 242 and by tilt/pan/zoom camera 244. An operator at the networked viewing station views the corresponding wide-angle image 246 and narrow-angle image 248. The operator clicks or otherwise selects a point within the wide-angle scene. Software located within the networked viewing station sends tilt/pan/zoom data to the camera 244, causing the camera to zoom to the desired 'narrow' scene within the overall wide-area scene.

Calculation of the exact tilt/pan location of the camera 244 is as follows. Assume that wide-area camera 242 is mounted in a fixed position and is not movable. Also, assume that the wide-area camera 242 has a fixed magnification lens. At the time of installation, the tilt/pan/zoom camera 244 is commanded to assume the same magnification as the fixed camera 242. The camera 244 is then tilted and panned until the image produced is identical to that of fixed camera 242. At this point, the two cameras are registered, and this reference tilt/pan position is duly stored in memory. It is assumed that the following calculations are performed inside the networked viewing station. However, alternative arrangements may have the calculations performed in the wide-area camera 242, the tilt/pan/zoom camera 244, or in any other suitable platform on the network.

When the user selects a location or icon on the viewing screen, the processor determines the angular displacement of the selected spot from the current image center. For example, if the wide-area camera has a field-of-view of 45 degrees, and the user selects a spot at the extreme right edge of the image, it is clear that the tilt/pan/zoom camera 244 must be moved 22½ degrees to the right of its reference position. Likewise, if the user selects a location or icon at the extreme top edge of the screen, the required vertical displacement is 16.875 degrees. (The video image has an aspect ratio of 4:3. For a horizontal field-of-view of 45 degrees, the vertical field-of-view will be 33.75 degrees. Half of that is 16.875 degrees.)

In some applications, the wide-area camera 244 may be capable of tilt/pan movement. Calculation of the required movement of the narrow-area camera 242 is now described. At the time that the cameras are installed, the two cameras must be registered as before, i.e., moved to a common position and zoom ratio, such that they produce identical images. This reference position is noted. Thereafter, any desired position selected on the wide-area image may be computed by adding the wide-area camera's 244 current position to the angular offset-from-image-center selected by the user. For example, if the user has the wide-area camera 244 pointed 90 degrees due east, and the user selects a spot on the extreme right edge of the screen, the narrow-area camera 242 must point to 112.5 degrees.

Placing Datum on a Wide Camera Image and Directing a Tilt/Pan/Zoom Based on Clicking on the Image.

In an alternative embodiment of the foregoing, viewed image on the networked viewing station, may be marked with various icons or datum's representing pre-determined scenes of interest. The graphical icons or datum's, when clicked or otherwise selected, pass tilt/pan/zoom data to the camera or cameras known to be within the field of view of the selected spot. The cameras thereupon tilt/pan/zoom to provide a narrow image of the selected area. For example, referring again to FIG. 11, a visually distinct icon may be superimposed on the image of the three-story building. When the operator selects the icon, the narrow-area camera is commanded to tilt and pan to that pre-determined spot.

Using Image Processing to Detect Motion on the Wide-Field Camera

The foregoing discussions have involved the use of a tilt/pan/zoom camera under manual control, and have described techniques to direct a tilt/pan/zoom camera to a particular static position within some area. In security surveillance applications, it is sometimes desirable to move a camera to follow a moving object. This is a difficult task for human operators to accomplish. Results tend to be jerky, spasmodic, and uneven.

Tracking of moving objects may be automated, through the use of techniques to detect motion within a video scene. Video motion detection techniques are well-known. In fact, most video compression techniques such as MPEG or H.263 involve motion detection, and moreover calculate motion vectors for various blocks and macroblocks within the video image.

In an embodiment of the present invention, two separate but co-located cameras are used. As described previously, one immobile camera is used to provide an overall, wide-area view of a scene of interest, while the second camera is commanded to tilt and pan under control of the first, wide-area camera. The wide-area camera generates these tilt and pan commands based on the presence, location, direction, and speed of motion detected within the wide-area scene. The second camera thus automatically follows moving objects under the control of the wide-area camera. In an alternative embodiment, the wide-angle camera may be commanded to track the moving object rather than remaining immobile. This offers the advantage that an object may be tracked even if it leaves the wide-angle camera's field-of-view. User input may be required to designate the moving object to be tracked. User input may be provided by a mouse, joystick, touch-screen, or equivalent pointing device. The user may simply click on the device to be tracked, then press (or release) a button. This function may be visually enhanced through the use of an on-screen crosshair, superimposed on the video image from the camera.

Referring again to FIG. 11, the cameras 242 and 244 view a scene 240, which contains a variety of items of possible interest. The camera 242 is a fixed-position camera, and is equipped with a lens that provides a wide field-of-view. The camera 244 is mounted upon a tilt/pan camera mount, and uses a lens with higher magnification, which also results in a narrower field of view. Alternatively, the camera 244 may be equipped with a variable-focal length lens, allowing end-user control of the degree of magnification.

In either case, the wide-area camera 242 detects the presence, location, direction, and speed of an item of interest within its field of view 246. The camera 242 thereupon forwards this motion location and vector data to the narrow-area camera 244. The camera 244 thereupon calculates the necessary tilt/pan data to maintain a view of the moving object, and commands its tilt/pan camera mount accordingly. The camera 244 thus tracks the moving object.

Image Processing Performed in the Network Camera and One Network Camera Controlling Another One Directly or Through a Server Calculation of the aforementioned motion vectors may easily be accomplished within a commonplace computer, for example the networked viewing station previously described. The networked viewing station may calculate the necessary tilt/pan movements of the narrow-angle camera, and transmit said tilt/pan data to the camera via the intervening network. However, calculation of said movement vectors are relatively straightforward, and may be accomplished within other networked devices. In another embodiment of the invention, the wide-area camera previously described may have the necessary data processing capacity to perform the motion calculations, and may send them directly to the narrow-area camera via the intervening network. Or, in yet another embodiment of the foregoing invention, the wide-area camera calculates motion vectors as a part of its video compression tasks, and simply forwards the raw motion vector data to the narrow-angle tilt/pan camera. The narrow-angle tilt/pan camera subsequently calculates tilt/pan data based on the wide-area camera's raw motion vectors.

In yet another embodiment of the invention, the wide-area camera calculates motion data and/or tilt/pan data for the narrow-area camera, and forwards said data to a networked server. The Server then 1) records the event, 2) calculates the tilt/pan movements required to track the moving object, and 3) forwards said movement data to the tilt/pan camera 244.

Use of One Pan/Tilt Camera

Pan/tilt/zoom cameras are useful because they can both look at wide fields of view to see in general any activity in an area, and can be pointed and zoomed to see a specific area of interest at a higher magnification. This provides a cost-effective capability. A problem with pan/tilt/zoom cameras, however, is that an operator can zoom a camera in to a specific area to look at something, then leave it there even after the interest in that area subsides. When the camera is zoomed to a smaller area, any activity in the larger area will not be noticed by the operator and will not be logged into the archival recording or database. An event could then occur outside of this field of view and not be recorded.

One solution to this deficiency is to provide cameras with a wide-field of view default setting. This default setting is be centered in the general area of interest and the zoom preset is wide-angle so a large area is under surveillance. A timer starts when an operator moves the camera to a different tilt/pan/zoom position. When the timer reaches a pre-defined time limit, the pan/tilt/zoom resets to the default position such that events are not missed.

The timer may be "retriggerable", such that any motion of pan, tilt, zoom, or other image pane related activities such as "print," moving it to another pane, or the like, retriggers the timer giving the operator more time to analyze his view. The timer may also have an audible or visual "warning" that indicates that the view is soon to go back to the default preset position. The viewing station's User Interface (UI) has a button, mouse click, audio command, or the like to "retrigger" the timer to forestall the camera's return to its preset position. The timer parameters, both the trigger time and the warning time, are configurable.

It should be noted that the cameras of the present invention or used with the present invention might be tilt/pan/zoom, tilt/pan without zoom, or zoom only without tilt/pan, pan only without title or zoom, or any combination of these parameters. The concept of returning to default is the same in every case. The operator controlled features of that particular camera are reset to the default position upon expiration of the timer.

Additional sensor/camera parameters that the operator may adjust, such as brightness and contrast, hue, and the like may also be handled as the position information above. In other words, an operator may "tweak" the contrast to get a better view of something in poor lighting conditions, but it would be reset back to the default setting after the timer times out.

Advanced Megapixel Techniques

As previously described, ongoing developments in high-resolution video imagers have resulted in multi-megapixel imaging devices. Such imaging devices offer far greater image resolution than commonplace compression and display technologies can utilize. For example, a common 6-megapixel imager produces an image that has a resolution of 3000 pixel (horizontal) by 2000 lines (vertical) resolution. Such resolution is much greater than the resolution of a typical composite video display. Such displays typically provide a resolution of approximately 700 pixels (horizontal) by 480 lines (vertical). It is obvious that the megapixel imager thus produces much more visual data than the display can use, and that much of the imagery's data is therefore lost prior to display. Note from the above numbers that, from the 3000×2000 resolution source image, one could derive approximately sixteen different and simultaneous 700×480 images (since the megapixel's resolution is approximately 4× the resolution of the display in each axis).

Similarly, visual data produced by commonplace cameras is necessarily decimated and compressed prior to its introduction into a commonplace data network. For example, an analog camera may produce an image with the above-mentioned 700×480 resolution. Such video data is usually decimated to SIF (352×288) or even QSIF (176×112) resolution prior to compression. The above described 6-megapixel imager thus produces enough visual data to produce approximately sixty simultaneous SIF-resolution images, or three hundred simultaneous QSIF-resolution images.

The present invention exploits the large resolution of the megapixel imager by providing a means to accomplish a 'virtual' tilt/pan/zoom movement of a camera. In the invention, the camera remains physically immobile, and the tilt/pan/zoom functions are accomplished 'virtually' by logically moving a 'window' within the overall scene viewed by the megapixel imager.

Figure 12:
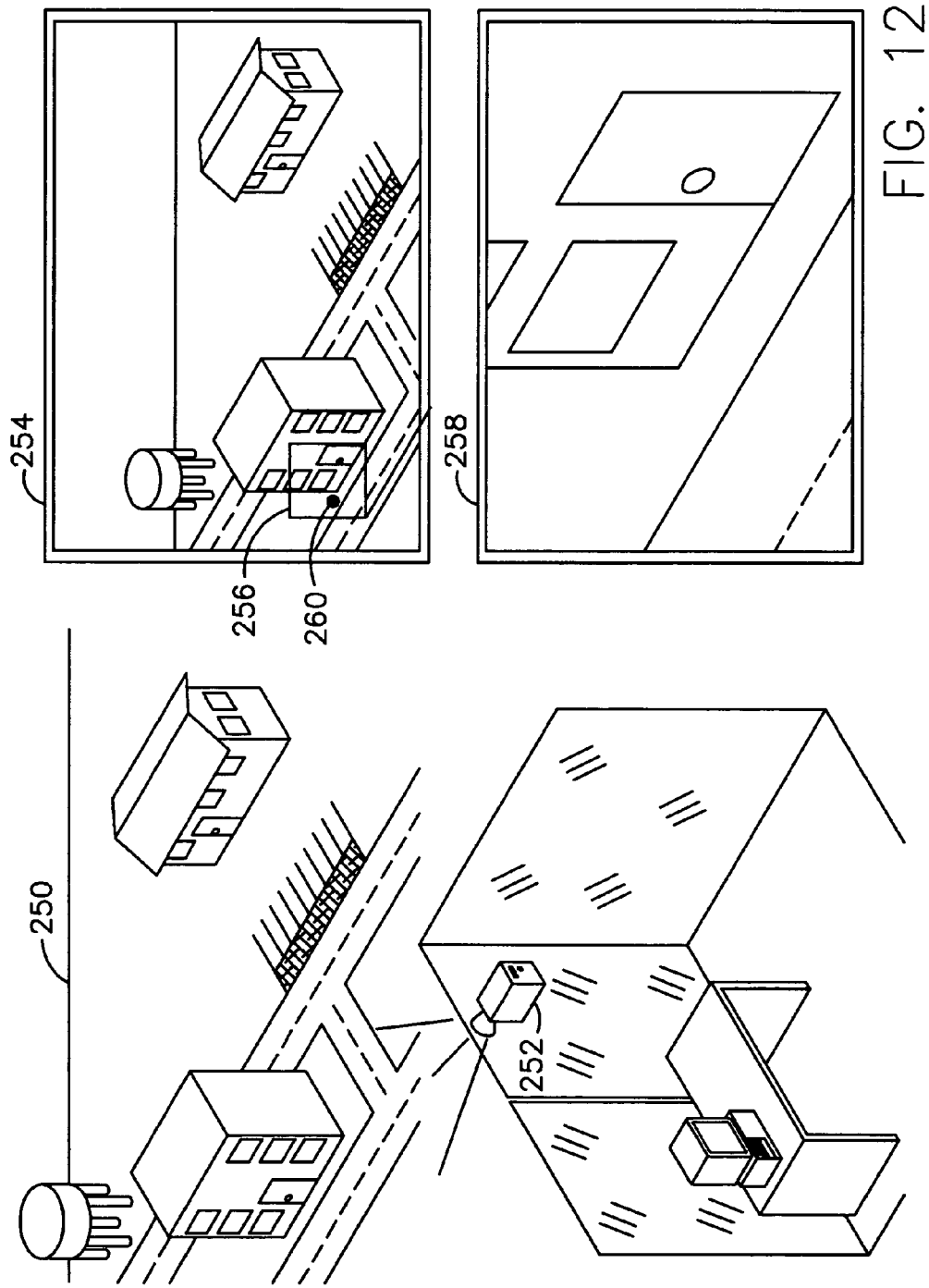
FIG. 12 depicts a scene that is captured by a megapixel imager with high-resolution in accordance with a preferred embodiment of the present invention.

Referring now to FIG. 12, a scene 250 is captured by a megapixel imager 252 with high-resolution. In this example, the megapixel imager 252 captures the image at a resolution of 3000×2000 pixels. In order to convey this image over a commonplace data network, the image resolution must be decimated prior to compression, to reduce the volume of visual data subsequently presented to the data network. In this example, the image is decimated-by-eight in each axis, resulting in a SIF-resolution image of 352×288 (note that some parts of the image need be cropped or filled, to arrive at the exact 352×288 SIF image format). The resulting SIF image is subsequently compressed, and transmitted into the data network. Networked viewing stations may thus view an image 254 of the entire scene 250 captured by the megapixel imager 252, at SIF resolution.

A user at a networked viewing station may wish to view some part of the image 254 in greater detail. To accomplish this, a sub-window 256 is logically defined within the megapixel's image. The visual data representing this SIF-resolution sub-window 256 is then compressed and conveyed to the viewing station via the data network. This results in a magnified image 258, representing the selected sub-window 256 of the image 254. The location of the sub-window within the megapixel image may be moved both horizontally and vertically, effectively resulting in a virtual tilt or pan movement. Note also that the transmitted 'sub-window' image 256 has a resolution of 352×288 pixels when captured. It has thus been effectively magnified, without loss of visual resolution. In effect, the image has been zoomed, without physical movement of the camera.

Placing Datum on a Map and Directing a Tilt/Pan/Zoom within the Megapixel Based on Clicking on the Map Through the use of visually distinct icons on a displayed map, a user may tilt and pan a movable camera to predetermined positions by clicking on an icon. Thus, the need for a user to directly tilt, pan and zoom the movable camera to a particular item within a scene was omitted. This technique is directly applicable when the imaging device is an immobile megapixel imager, and the tilt/pan/zoom movements are accomplished 'virtually' within the megapixel imager's field of view.

Referring again to FIG. 10, a user at a networked viewing station views a graphical Map 220 of the facility. Visually distinct icons 230-234 are superimposed on the map and represent particular points of interest within a megapixel imager's field of view. The user simultaneously views a SIF-resolution image representing the megapixel imager's overall field of view. The user may thereupon click or otherwise select a particular icon. When a map icon is selected, a corresponding sub-window is defined within the megapixel imager's field of view. Visual data representing this sub-window is thereupon captured, compressed, and sent to the viewing station in lieu of the visual data representing the imager's full field-of-view. This results in an effective tilt/pan and zoom to the selected spot within the image.

Placing Datum on an Image and Directing a Tilt/Pan/Zoom within the Megapixel Based on Clicking on the Image Similarly, icons may be superimposed directly on the displayed image received from the megapixel imager. Selection of the displayed icon again causes an appropriate sub-window to be defined, captured, compressed, and transmitted to the viewing station for viewing.

Referring again to FIG. 12, a scene 250 contains a variety of items of interest such as the buildings, roads, and parking lot shown. At the viewing station, a user may view a wide-area image 254, which depicts the megapixel imager's entire field of view at SIF resolution. A visually distinct icon 260 is superimposed on the wide-area image 254. When the icon 260 is selected, a logical sub-window is defined within the megapixel imager. Visual data from the selected sub-window is captured, decimated if necessary to produce a SIF image, then compressed and conveyed via the network to the networked viewing station. The resulting screen image 258 shows a tighter shot of the selected area, without loss of resolution.

Using Two Successive Views of a Megapixel and Two (or More) Views Coming from One Megapixel Camera at the Same Time The present invention discloses using two successive views of a megapixel (full field or near full field) for "wide angle" sighting, then a lesser view from the megapixel for the tilt/pan/zoom function, and two (or more) views (wide and narrow, or wide and multiple narrows) coming from one megapixel camera at the same time, to two (or more) different displays.

In the foregoing description, users at the networked viewing station view and control one map and one video image. In an enhancement of the invention, the user at the viewing station receives and views two simultaneous video images, both from the same megapixel imager. In this arrangement, the first video image contains the entire visual scene as captured by the megapixel imager. The second image contains a defined sub-window of the image, using techniques described previously. Again referring to FIG. 12, both image 254 and magnified image 258 may be viewed simultaneously at the networked viewing station.

The size and position of the sub-window 256 may be controlled by the user. For example, the user may move the location of the sub-window 256 through the use of a joystick, mouse, or equivalent pointing device. Moving the sub-window 256 effectively tilts and pans the image from the megapixel imager. In addition, the user may control the amount of image decimation used to define the sub-window. This effectively 'zooms' the camera without loss of visual resolution. As the user changes the amount of 'zoom', the equivalent size of the sub-window indicator 256 expands or shrinks to indicate the extents of the current magnified view.

Utilizing a Matrix of Megapixel Cameras, and Placing Datum on a Wide-View Image and Directing an Electronic Tilt/Pan/Zoom Based on Clicking on the Image Referring to the above description, it should be noted that this technique need not be limited to the use of one sub-window within the field of view of one megapixel imager. An array or matrix of megapixel imagers may be employed to allow coverage of a wider area, without materially departing from the scope of the foregoing disclosure. The usage of movable sub-windows still applies, even across image boundaries. Note that the individual imagers must be properly registered or aligned during assembly, to prevent overlap of the adjacent images. Alternatively, the individual images may be allowed to overlap by some measured amount.

Referring now to FIG. 13, an array of eight megapixel imagers 270, specifically imagers 272a-272h, are co-located and arranged in a radially symmetric pattern. Each of the eight cameras is equipped with a lens which provides a 45 degree field of view. The eight cameras are assembled and registered so that their respective fields of view abut, but do not overlap. As a result, the eight cameras cover a full 360 degree arc, divided into eight 45 degree wide fields of view 274a-274h.

The previously-described methods for defining and moving sub-windows within a megapixel imager may now be extended to two or more megapixel imagers. For example, a user at a networked viewing station may be viewing some wide-area scene 280 produced by one of the megapixel imagers 272a-272h. If the user wishes to select a magnified view of some part of the image, the user may simply select an icon 286 which is superimposed on the image 280. Upon selection, a magnified view 284 of that segment of the image 280 is displayed on a second display device. Alternatively, the image 280 may be replaced with the magnified image 280 on the user's display.

As an alternative to controlling the magnified view by selecting a screen icon, the user may control the position and size of the magnified view 284 through the use of an indicated sub-window 282, superimposed on the wide-area view. Using a mouse, trackball, touchscreen or other equivalent pointing device, a user may control the position and size of the 'hotbox' 282. When the user moves the sub-window box 282, the corresponding magnified view 284 moves to cover the new selected area. When the user shrinks or enlarges the size of the sub-window box 282, the magnification of magnified view 284 changes accordingly.

Since the imager array is constructed to have abutting but non-overlapping fields of view, said virtual tilt and pan movements are no longer limited by the left and right edges of any imager's field of view. A user may thus pan, continuously, the sub-window 54 through a full 360 degrees.

Image Processing to Detect Motion on a Wide-Field View and then Directing a Narrow Tilt/Pan/Zoom Field to that Area Zoomed in A previous part of this disclosure described the use of motion detection to control the tilt/pan movement of a mechanical tilt/pan camera mount. That invention may also be used with a megapixel imager, which is held physically immobile and which 'virtually' tilts, pans, and zooms as previously described.

Referring again to FIG. 13 an array of eight megapixel cameras 270 view a scene, again providing a full 360 degrees of coverage. Each camera normally produces a SW-resolution image representative of its entire field of view, and each such camera compresses and transmits corresponding compressed visual data. A user at a networked viewing station is thus able to view any scene within the full 360 degree field of view of the array. Each of the cameras 272a-272h executes motion-detection algorithm, deriving presence, location, and direction of motion within its own field of view. Motion data thus generated may then be used to control the instantaneous location of a magnified sub-window within the viewed image, as previously described. The motion data generated by a camera may control the location and magnification of the logical sub-window directly. Alternatively, said motion data may be forwarded to a networked server, which may process the motion data and forward sub-window command data to the appropriate camera.

Techniques of Registering Two Cameras

Manual adjustments can be made by superimposing video from both cameras, looking at a point light source, then adjusting the pan/tilt up and down, right and left until everything registers. When the operator sees that they register, a key is pushed that stores that set of X-Y adjustment factors in a table.

Previous discussions described methods of using two or more cameras to provide physical or virtual tilt, pan, and zoom operation. Some of these methods used one fixed camera and one movable camera. Another method described two physically movable cameras, one providing a wide-area view while the other provides a variable-magnification view. Still other methods used one or more immobile megapixel imagers to provide 'virtual' tilt, pan, and zoom operation. Other methods described the use of an array of two or more megapixel imagers to provide a very wide angle of view, with the capability to tilt, pan, and zoom within the overall view.

With any such method, it will be seen that accurate registration of the various cameras is necessary to accomplish these functions. Again referring to FIG. 13, it can be readily seen that if two of the cameras have overlapping fields of view, then the tilt or pan operation at the image boundary will become a problem. Redundant visual information at the boundary will be visually annoying. Moreover, algorithms for automated tracking of moving objects may be compromised if adjacent image boundaries contain identical motion information. If, on the other hand, the cameras have gaps between their fields of view, then some parts of the scene will be un-viewable. Motion detection and tracking will again be compromised.

It is therefore necessary to provide some means of insuring accurate registration of the two cameras. The following discussion describes a variety of manual and semi-automatic means to register the two cameras. When using one fixed camera and one physically movable camera, such registration may be accomplished at the networked viewing station. The image captured by the fixed camera may be displayed on the user's view screen. Simultaneously, the image from the movable camera is displayed on the view screen. The movable camera's magnification is set to equal the magnification of the fixed camera. An operator then controls the tilt and pan position of the movable camera, until the two images are identical. At that point, the user presses a key or screen icon, which commands the tilt/pan control algorithm, wherever located, to consider the current tilt/pan coordinates to be the 'reference' location.

In an alternative embodiment, the two images may be superimposed on the networked viewing screen. The operator again adjusts the tilt/pan location of the movable camera to achieve proper registration, and the tilt/pan coordinates of the movable camera are saved as the 'reference' position for the tilt/pan control algorithm.

When using two physically movable tilt/pan cameras, the method is similar. It is first necessary to move the movable wide-area camera to some arbitrary position, and to define that tilt/pan coordinate as the wide-area camera's reference position. The remaining part of the method is the same as before; the operator then moves the tilt/pan narrow-area camera as necessary to establish identical images (note that the narrow-area camera must be temporarily set to the same magnification). The narrow-area camera's tilt/pan position is thereupon defined as its reference position.

In some cases, it may not be possible to set the narrow-area camera's magnification to equal that of the wide area camera. In such cases, an alternative method is to identify some feature in the exact center of the wide-area camera's image, and to tilt/pan the movable camera to center on that spot. That tilt/pan position is again defined as the reference position for the tilt/pan control algorithm, wherever located.

The advantage of the above-disclosed invention is that is that it is no longer necessary to make fine adjustments of the physical camera mounts. It is often difficult to make fine adjustments to camera mounts, since they tend to be bulky, possibly inaccessible, and lack mechanical vernier adjustments. In the foregoing disclosure, the methods described allow such fine adjustments to be made logically at a networked viewing station, rather than made physically at the actual camera location.

Semi-Automatic calibration can occur where a point light source is moved around and the software then does a series of Pan/Tilts to find points, then set adjustment factors in the table. Fully automatic calibration can occur by setting the zoom to a fixed field of view to the fixed camera, then drive the Pan/Tilt around a pattering doing image correlations between the Pan/Tilt and various portions of the fixed camera field of view. When the algorithm of the present invention sees a high correlation coefficient, a table entry is made for that location.

This registration method may be automated, to some degree, by providing a computer-identifiable feature within the field-of-view of the two cameras. For example, a point source of light may be used if the viewed scene is sufficiently dark. Alternatively, a point source of light may be blinked at a known rate, so as to render the light source identifiable by the computer. Another method is to make the point source a pre-defined color, to allow the computer and associated control algorithm to identify the point source. Yet another approach to establishing a computer-identifiable feature within the image is to use a visually distinct and identifiable shape within the camera's field-of-view. A variety of well known target-recognition algorithms are available for this purpose.

In any case, once the control algorithm locates the target feature within the field of view of the wide area camera, the algorithm then commands a tilt/pan search of the movable camera. When the algorithm locates the target feature within the field of view of the movable camera, the algorithm then tilts and pans the movable camera as necessary to place the target feature at the same location in the two images.

If the narrow-area camera is set to the same magnification as the wide-area camera during this algorithm, then it is merely necessary for the algorithm to tilt and pan the movable camera until the target feature is at the same X,Y location in the two images. If the narrow-area camera is not capable of achieving the same magnification as the wide-area camera, then the tilt/pan control algorithm will have to 'scale' the position of the target feature in the narrow-area image according to the ration of the two different magnifications. For example, if the narrow-area camera has twice the magnification as the wide-area camera, and the target feature (in the wide-area image) is displaced to the left by one-eighth of the screen width, then the target feature in the narrow-area image must be displaced one-fourth of a screen width to the left.

In either case, the pan/tilt position thus derived is then defined, to the tilt/pan control algorithm, to be the tilt/pan reference position. As previously described, this same approach also works if the wide-area camera is also movable.

Finally, the registration algorithm may be fully automated. In this method, the magnification of the movable camera is set to equal the magnification of the fixed, wide-area camera. The tilt/pan control algorithm then commands a systematic tilt/pan scan of the entire scene, calculating the degree of correlation between the two images. Again, a variety of pattern correlation algorithms are available for this purpose. When the algorithm finds the tilt/pan position that provides the highest image correlation, this location is defined to be the reference position for the tilt/pan control algorithm.

Enhanced Display Techniques

A wide field of view camera can be used as a floor plan. For example, a HDTV monitor could be mounted horizontally (preferred) or vertically. That monitor can display either a map of a room, such as a casino, or (preferred) an video image such as an overhead "floor plan cameras" that basically point straight down. Then by touching or clicking on the map or the wide field overhead video display, a video pane or video on another monitor can be focused on that part of the facility. Other functionality is possible including drilling down from wide to narrow views, flipping between a map and the video view, and scrolling the floor plan map or the video view via a track ball, mouse or other controls.

Prior disclosures have described the use of a map, displayed on a networked viewing station, as a means for an operator to select one or more cameras for viewing. The map, or maps, contain visually distinct icons representing the location of cameras within the facility. In some applications, the maps may be supplemented with a wide-angle overhead image of the area under surveillance. This technique works well with large, open areas such as casino floors, trade show floors, cafeterias, supermarkets, and the like.

Figure 14:
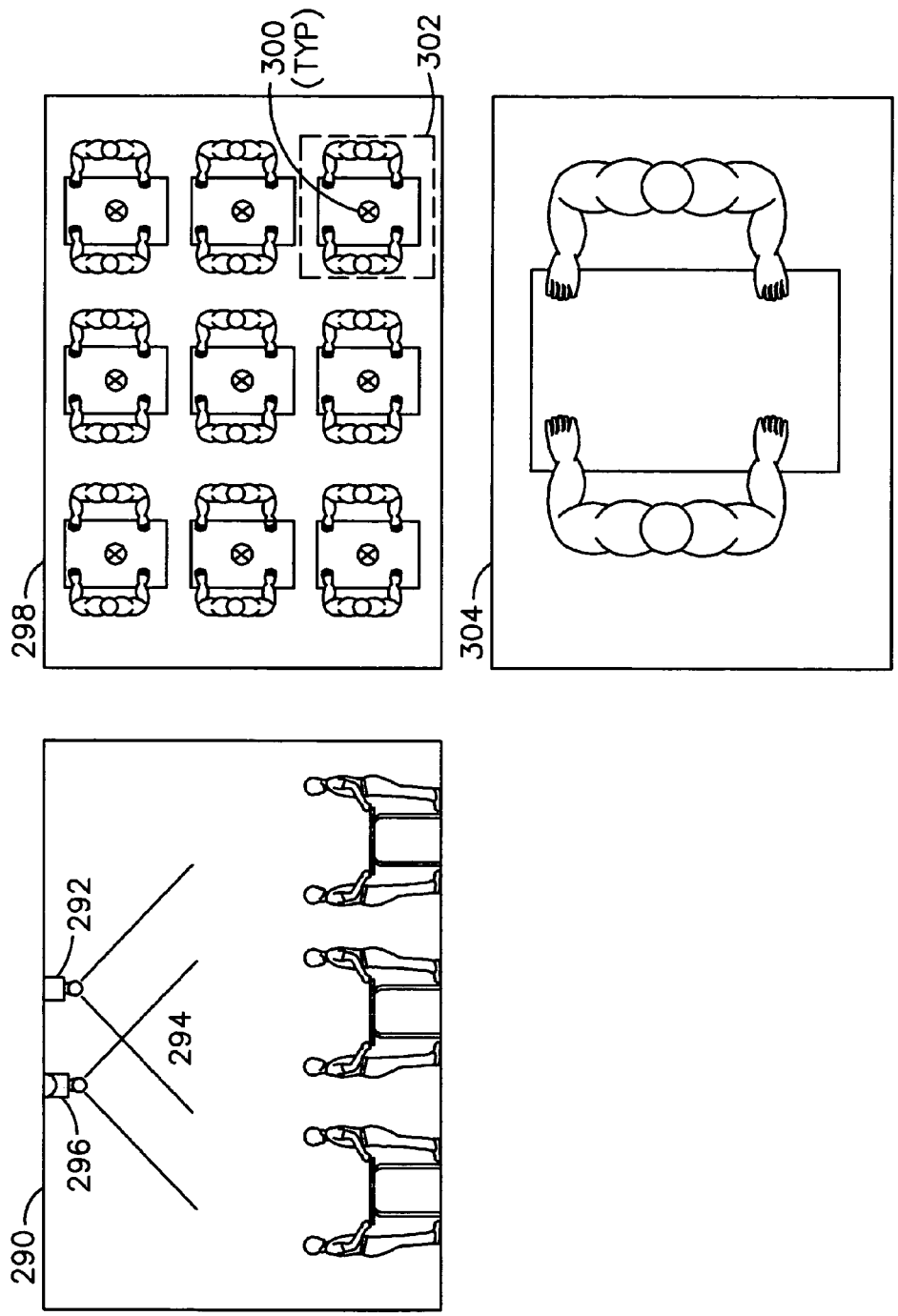
FIG. 14 depicts a wide-angle overhead image of an area under surveillance in accordance with a preferred embodiment of the present invention.

Referring now to FIG. 14, a cafeteria 290 contains a single overhead wide-area camera 292, covering field-of-view 294. The field of view is sufficient to cover the entire cafeteria. As a result, an operator at a networked viewing station enjoys a 'birds-eye' overhead view of the cafeteria. In addition to the fixed, wide-area camera 292, the room is equipped with a second, co-located camera 296 which is mounted on a controllable tilt/pan mount. This camera is equipped with a higher-magnification lens, resulting in a magnified view of the selected area. Alternatively, this camera is equipped with a variable zoom lens, allowing automatic or manual control of the degree of magnification.

A map, displayed on the networked monitoring station, depicts the floor plan of the room. A user at the networked viewing station may select any particular point on the map. When a point is selected, the wide-area image 298 is replaced with a narrow-area image 304, which covers the pre-defined area of the room represented by the icon. Alternatively, both the map of the room, and the video display of the selected area, may both be configured to occupy a full-screen of the display device. Using a mouse or equivalent pointing device, the user may switch between a view of the map, and a view of the selected video image.

Following the methods described earlier, the overhead image 298 may be marked with visually distinct icons or datums 300. Selecting any particular icon or datum causes image 298 to be replaced with a magnified image of the area surrounding the selected icon. Or, again following previously-disclosed methods, the wide-area image 298 may display a target box 302, overlaid on the video image. The target box 302 defines an area on the wide-area image 298, which will be magnified upon selection. The target box 302 may be positioned by scrolling with the mouse or other pointing device, and may also be shrunk or expanded using the pointing device. Once the target box has been suitably positioned and sized, the wide-area image 298 is replaced with the selected narrow-area image 300.

If the networked viewing station is equipped with two display monitors, or if the viewing station is capable of displaying more than one image, then both images 298 and 304 may be seen simultaneously. As the user moves the target box 302, the magnified image 304 moves accordingly.

In other embodiments, two HDTV wide monitors, one horizontal and one vertical can be utilized. The horizontal monitor would display the map/floor plan or video, or superimposed map/floor plan and video, while the vertical monitor would have individual camera views of selected cameras.

In a preferred embodiment, the networked monitoring station would be equipped with at least two monitors. One monitor, disposed horizontally, preferably displays a map of the room under surveillance, while the other monitor is mounted vertically, and is used to display one or more selected video images.

The foregoing described the use of one fixed, wide-area camera in conjunction with one movable tilt/pan camera to view the floor plan area. While useful, this approach tends to suffer from the fact that wide-angle lenses tend to produce geometrically-distorted images. An improvement on the foregoing method involves the use of several fixed overhead cameras. The cameras are distributed around the area to be viewed. Each camera is equipped with a lens which provides a smaller field-of-view than before, reducing the geometric distortions of the lens. The field-of-view of the various lenses is selected to provide overlapping fields-of-view of the area. As before, a movable tilt/pan camera is associated with each of the fixed cameras. Techniques previously described allow the user at the networked viewing station to maintain an overall view of the area, while simultaneously providing the ability to obtain a magnified view of any selected area.

Figure 15:
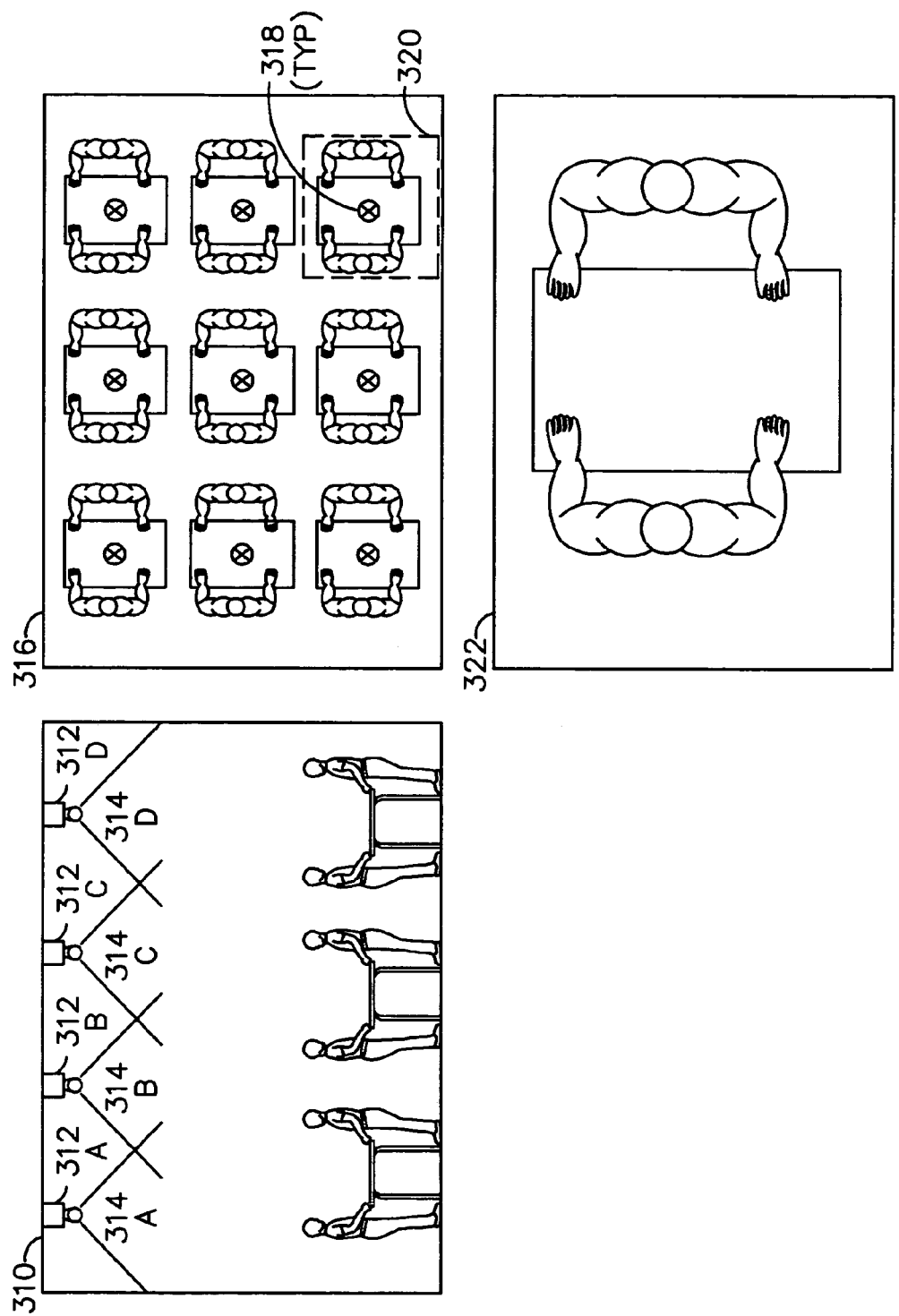
FIG. 15 depicts an array of wide-area cameras in accordance with a preferred embodiment of the present invention.

Referring now to FIG. 15, a room 310 contains an array of wide-area cameras 312a-312d. Each camera has a wide field-of-view, 314a-314d respectively. Note that these fields-of-view are narrower than in the preceding example, since each camera need cover a smaller area. Notice that the respective fields-of-view necessarily overlap, since the various cameras are not co-located. Objects located between two adjacent cameras may therefore be outside of the two camera's fields-of-view, if they are located above the height 'H' shown. However, meaningful coverage of the area may be obtained if the height above the floor, at which the fields of view intersect, is sufficiently high.

The various images may be used to form a single overall image of the area. A variety of image-processing software is currently available, to permit the 'stitching' together of such images. Note that such 'stitching' is imperfect, since the amount of image overlap varies with height above the floor. However, through the use of these multiple cameras, a user at the networked viewing station may enjoy improved visual quality of the wide-area view, as compared with the use of a single wide-area camera.

This overall area image 316, on the networked viewing station, allows a user to view the entire room in one view. The visual quality of this image is improved upon that of FIG. 14, both in terms of scene resolution and due to the absence of wide-angle lens distortion. As before, a user may select a magnified view of any desired area, again by either selecting a spot on screen 316, selecting a specific icon 318, or by manipulating a movable and sizable target box 320. A particular tilt/pan camera is thereupon directed to view the selected area, and the magnified view 322 either replaces or supplements the overall, wide area view or the map.

The foregoing description covered the use of conventional cameras to cover the floor plan area of interest, in conjunction with a movable tilt/pan camera to provide magnified views of a selected area. Following the method described earlier in this disclosure, this pair of cameras may preferably be replaced with a single megapixel imager. As before, the greater resolution of the megapixel imager enhances the utility of the system.

Referring again to FIG. 15, the overhead camera pair described previously are replaced with a single megapixel imager, providing a wide field of view. As before, the user may select a magnified view of some area, either by selecting the corresponding icon on the map, or by selecting the corresponding icon or datum on the wide-area image 316, or by dragging and sizing a target box 320. However selected, a magnified image is thereupon displayed. The magnified image may replace the previous map view, or wide-area view, or may be displayed at the same time depending on the capabilities of the display device.

Alarms Superimposed on the Floor Plan

Previous patent disclosures have described a means of visually displaying the status of various system alarms on the networked viewing station's map. A variety of alarms were described, including door entry, glass breakage, motion, gunshot detection, fire, and the like. This alarm display feature may be extended to include the new wide-area image display as previously described. Alarms detected from a variety of sensors may be displayed and highlighted not only on the graphical map, but may be superimposed and highlighted on the wide-area video image of the area.

Figure 16:
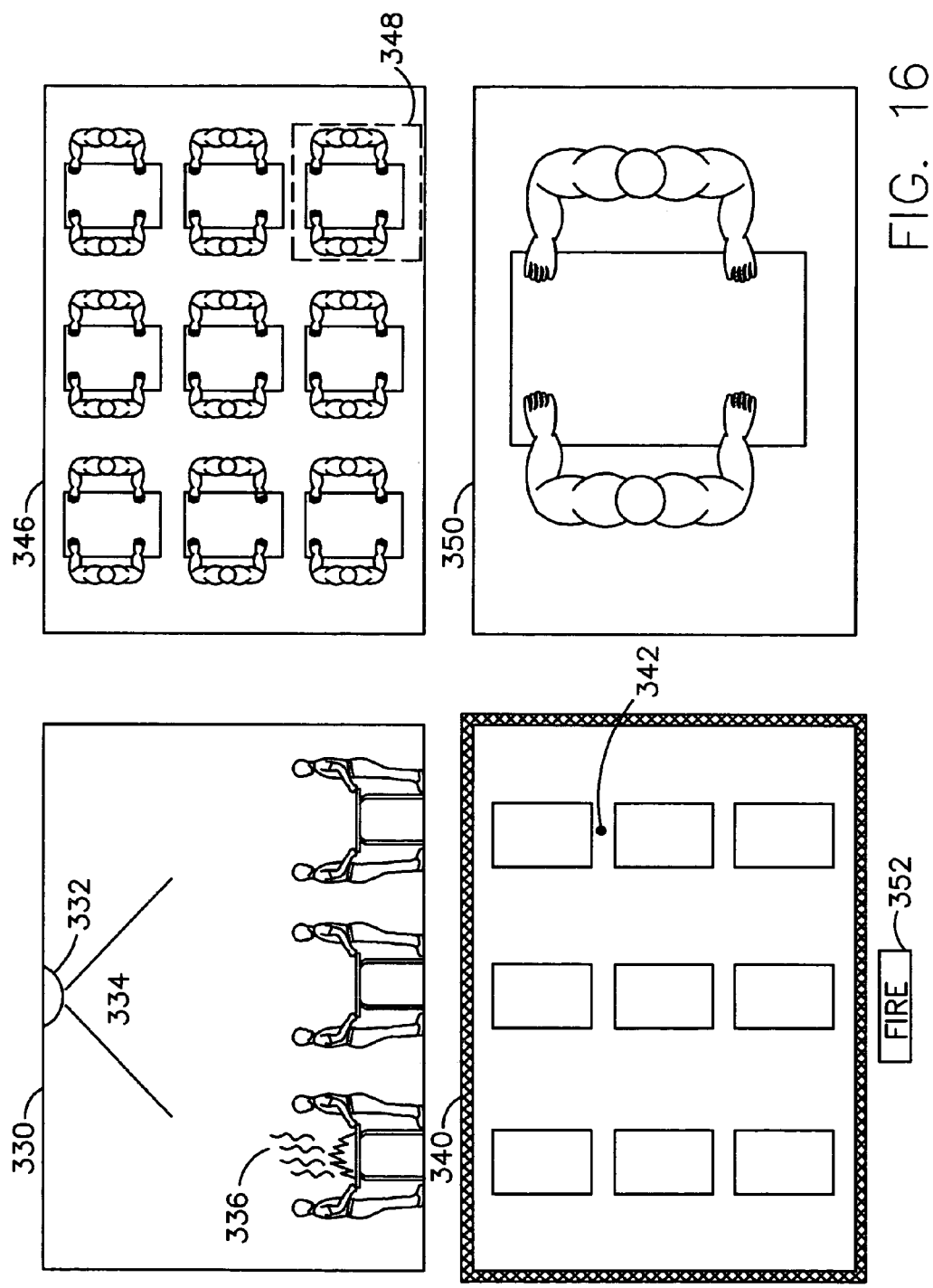
FIG. 16 depicts a wide-area camera with a field of view sufficiently wide to cover an entire area of interest in accordance with a preferred embodiment of the present invention.

Referring now to FIG. 16, a scene 330 is viewed by a wide-area camera 332, with a field of view sufficiently wide to cover the entire area of interest. A fire 336 breaks out, for example, at a cafeteria table as shown. The fire is detected by a smoke detector within the cafeteria. Typically, such a smoke detector cannot pinpoint the exact location of the fire within the room.

The networked viewing station responds by highlighting the map of the cafeteria 330 with a visually distinct border 340 to alert security personnel to the event. As described in a number of the cross-referenced patent applications, the border 340 may be made to blink to gain an operator's attention, and may be color-coded to indicate the type of event. In addition, a caption 352 may be displayed describing the nature of the event.

In the current invention, the alarm also triggers a wide-area view 346 indicating the area in which the alarm occurred, allowing security personnel to view the event. Also as previously described, the user may invoke a narrow-area view of the event, either by selecting a point on the map, selecting a point on the wide-area view 346, or by manipulating a target-box 348 on the wide-area view.

"Floor Plan Cameras" Pointed Down, with Other Cameras (Regular, Tilt/Pan/Zoom, or Megapixel) at More Oblique Angles for Identification Purposes The foregoing have described a means of using one or more overhead cameras to provide a wide-angle view of some area, and furthermore providing a means of obtaining a narrow-angle view of selected parts of the same area. While useful, one disadvantage arises from the fact that all such views of the room are overhead views. This may hinder identification of specific people, since their faces are not visible.

This deficiency may be overcome by supplementing the overhead cameras with one or more cameras mounted along the walls of the room, or otherwise mounted at lower heights above the floor. These supplemental cameras may be fixed, movable tilt/pan/zoom cameras, or may be high-resolution megapixel imagers capable of 'virtual' tilt/pan/zoom operation. These supplemental cameras provide an operator to select an oblique view of some location or event of interest, thus allowing identification of personnel.

Recording of the "Floor Plan Cameras" and Playback of the "Floor Plan Cameras" can Show Historical Movement of People and Vehicles Previous disclosures have described the use of networked servers to capture and archive video or still images from the various cameras. These disclosures have also described recording of system alarms and other events associated with the video, on a networked server. In the present invention, the server also records the wide-angle video captured by the overhead cameras or cameras.

In the previous disclosures, a means was described whereby the recorded alarm data and video were both time-stamped. This allowed synchronized playback of various alarms, sensors, and cameras when attempting to re-construct an event. This capability is further enhanced with the addition of not only the associated wide-area overhead camera, but with any associated 'zoomed' cameras, or supplemental oblique-view cameras as well. Selecting a particular area can then bring up time synchronized historical views of zoomed data from "floor plan cameras," other cameras and the like.

Placing of Icon Overlays on the Floor Plan Camera

Previous mention was made of the presence of icons or visual datums, superimposed on the wide-angle image of the area. This may be accomplished in a variety of novel ways.

For example, the map of the area may be displayed on the networked viewing station, and simultaneously the wide-angle overhead view may be invoked. By using a mouse or equivalent pointing device, an icon displayed on the map may be selected and replicated on the wide-angle overhead view by dragging the icon to the desired location on the image. Other equivalent methods can be used, for example, a spot on the wide-angle image may be selected, then an icon may be selected from a menu. The menu may contain a listing of alarm icon types (e.g., "FIRE", "MEDICAL", and the like), or may contain a list of pre-defined icons already present on the map image (e.g., "WEST ENTRY DOOR", "CAFETERIA SMOKE SENSOR", and the like.

The placing of icon overlays on the floor plan camera image is facilitated by looking at the video, then locating the icons on top of the feature, such as alarm sensors, alarm control panels, and the like. A floor plan drawing can also be superimposed with the floor plan cameras. Adjustments can be made by stretching the floor plan drawing or the video or stitched video to make them correlate. The operator may then manipulate the floor plan map by stretching, shrinking, or dragging various parts of the map so as to align with equivalent features in the wide-angle view. Alternatively, the software used to 'stitch' together the multiple images from the multiple overhead cameras may be manipulated so as to 'warp' the respective images into correlation with the floor plan map.

IP Telephone Integration

Prior disclosures have described the use of commonplace data networks for dissemination of digitized, compressed video from the various cameras, as depicted in FIG. 1. These prior disclosures discussed at length the use of IP networks as a favored networking medium. IP networks are attractive for their ubiquity, cost, and world-wide extent. Indeed, the use of IP networks as a medium for commonplace telephony is slowly emerging. The use of IP networks for telephony is already commonplace within local areas or facilities, and may eventually replace the existing circuit-switched telephony network for wide-area, or long-distance usage.

IP telephones are ideally suited for use as networked viewing stations, as have been described in prior disclosures. These IP telephones inherently operate on IP networks, and increasingly equipped sophisticated processors and with features which were not possible in traditional telephones. Indeed, some IP telephones are equipped with display screens which are capable of rendering low- to mid-resolution video images.

Previously-disclosed techniques for displaying area maps, and subsequently displaying selected cameras or areas are directly applicable to said IP telephones. In addition, previously-disclosed techniques for controlling movable tilt/pan/zoom cameras are directly applicable to IP telephones as well. For example, a tilt/pan camera viewed on an IP telephone screen may be manipulated by pressing available control buttons on the IP telephone, e.g., buttons 2 & 8 for up/down, buttons 4/6 for left/right, etc. Alternatively, the displayed video image may be overlaid with a superimposed set of crosshairs, which the user may move to control the tilt/pan camera's position. In any case, control messages produced in response to the user's input are transmitted to the camera via the intervening IP network.

Resolution of Control Over High Latency or High Error Rate Circuits

Internet circuits often have high latency, or occasional bursts of traffic that cause interruptions in data delivery. Radio circuits also have these characteristics, but in addition often have dropouts or errors caused by radio propagation problems or radio interference. In all cases, operation of a tilt pan device over such circuits is problematic. If the pan/tilt/zoom is high performance, often the camera will move quickly and the operator overshoot because they will be viewing the video delayed from real-time at the camera.

Often camera Pan/Tilt/Zoom functions are implemented with "Start Move" and "Stop Move" commands. If the network suffers a delay or drop-out between the Start-Move or Stop-Move commands, the camera will continue to move until the Stop-Move is received. The camera may move for a random and/or excessive amount of time, and the desired stop positioning will be missed. Indeed, if the camera commands are sent as UDP messages, there is no guarantee that the messages will reach the camera at all.

One method of control has been described in patent application 20020097322, titled MULTIPLE VIDEO DISPLAY CONFIGURATIONS AND REMOTE CONTROL OF MULTIPLE VIDEO SIGNALS TRANSMITTED TO A MONITORING STATION OVER A NETWORK. In this application a datum is established on a map view, then the camera is instructed to move to that position with camera-end control. Only one data message is involved, and the camera itself calculates the stop position. Thus, the camera cannot 'overshoot' the desired position.

Alternative control methods are possible. In one example, the user presses a "Jog" button that commands the camera to move a specific angular amount left, right, up, down or combination thereof. Once the command is delivered from the control station to the camera end, the operation is performed at the camera end, and the operation is not subject to network message delivery vagaries. In some cases, the tilt/pan camera be equipped with a simple motor mechanism with no actual positional feedback. In such a case, the camera may be commanded to 'jog' for a specific time interval rather than a specific angular amount.

Another alternative control example utilizes circuitry or target-recognition software as previously described. Such software in a smart camera or in a DVR at the camera end of the link may be used to find features of interest such as hard lines, "blobs" in motion that might correlate to cars, people or animals, or the like. Using such target-recognition software, the remote viewer can initiate an "Auto-Find" function. This can initiate a pan function, or a more complex pattern of tilt/pan/zoom to scan a wide area of view. When a potentially matching object of interest is found, the Pan/Tilt can stop and allow the operator to view the image. A "resume" button can resume the search.

Yet another alternative control technique uses camera presets to look at specific pre-identified areas of a wide area of view. For example, some dome cameras have up to 40 preset locations whereby values for Pan/Tilt/Zoom may be stored. Then, by means of one command from a specialized console that provides RS-323 or RS-422 serial communications, the dome can be commanded to position the camera to that preset location. The preset normally coming from a dedicated controller can be extended over the IP network. Because only one "open loop" command is utilized, network delays and dropout do not create problems.

Archival Storage of Large Area Surveillance

Some Pan/Tilt mechanisms provide for auto panning functions at a variable rate and at adjustable left stop and right stop positions. This can allow the camera to cycle left to right, scanning a field of view. If this visual data is recorded continuously, then archival surveillance of that entire wide field of view can be accomplished.

This is problematic, however, when applied to IP or DVT systems. Compressed full motion digital recording is not ideal because it is limited in resolution and/or generates a large amount of data, requiring excessive storage space. Also, moving the camera as described precludes the use of video motion detection, which could otherwise be used to 'gate' the storage of the visual data.

In one alternative method, the camera produces a sequence of still images, timed and synchronized with the cameras pan movements. The image capture is synchronized so as to produce a sequence of still images with little or no overlap. This can be done in a variety of ways. For example, the images may be captured at regular time intervals, starting when the camera begins a pan. Alternatively, a variety of positional feedback mechanisms may be used, such as a quadrature shaft encoder or a potentiometer and A/D converter that reads the panning position directly. If the pan mechanism is driven by a stepper motor, then the image capture may be synchronized to specific positions of the pan by counting the motor's drive pulses.

However accomplished, the use of still images as opposed to compressed motion video offers improvements in image resolution and in storage requirements. One disadvantage is the requirement that the camera's shutter speed may need to be reduced, to prevent image blur during rapid pan movements.

Note that this method may be extended to the use of several 'pan' sweeps of an area, each at a different camera tilt angle. The periodic and synchronized image capture process remains the same. This approach allows the camera to use a higher degree of magnification, providing better image quality.

In another alternative method, the pan/tilt and (optional zoom) camera makes discrete steps through the entire field of view. Synchronously with each step, a high resolution still image is captured and archived. This is faster than a sweep because the pan/tilt mechanism can operate at full speed. It is also superior to the sweeping pan because it is fully programmable in three dimensions (counting the zoom). In other words, a scan is not limited to simple pan or tilt movements—the camera may be stepped through a more complex repertoire of pre-defined steps covering scenes of interest. This also allows dead areas to be skipped. Note that this method allows overlapping views of different magnifications to be captured and stored. For example, you can have a camera sweep a parking lot taking multiple shots at a medium angle zoom. When the camera gets close to the entrance to the parking lot, it can zoom in tighter on the parking lot attendant booth and capture a high-magnification image of the booth. The novel approach here is to index the Pan/Tilt/Zoom between each still image.

Automatic Large Area Alarm Detection

The above-described invention, which captures a sequence of still images, lends itself to detecting motion within a large area, while preserving good detection sensitivity. In this technique, images captured during a camera's pass are compared with corresponding images captured during subsequent passes. This allows one camera to detect motion and to capture imagery over a much greater area, yet with much lower cost and with good resolution and detection sensitivity. If motion detection occurs on one image, an alarm can be generated and all images out of the sequence that contain motion would be indicated as areas of concern. Note also that the system may be instructed to cease the pre-programmed scan cycle when motion is detected, and to tilt, pan, and zoom to the area containing motion.

Power Over IP

Previous disclosures discussed a means of providing the camera with operating power via the network cabling. Since that time, the IEEE has adopted the IEEE 802.3af standard, which is a similar means for providing operating power to networked devices via commonplace 10/100 Ethernet unshielded-twisted-pair (UTP) cabling. The standard provides up to approximately 13 Watts of DC power to networked devices, often eliminating the need to use external wall-mounted DC power adapters. Typically, this DC power is delivered at a supply voltage of 48 Volts DC, similar to that used in the analog telephony network.

Networked cameras as described herein and in prior disclosures often require substantially less than the 13 Watts available. Also, it is not unusual for such a networked camera to be used in conjunction with some external or peripheral equipment. For example, the camera may be used with a motorized tilt/pan camera mount as previously discussed. Or, the camera may be used in conjunction with additional cameras, which may be multiplexed or otherwise selected. If the camera is used to provide audio capture, then external microphone amplifiers or mixers may be employed.

In any case, equipment external to the camera requires a source of operative power. Since the networked camera itself typically consumes substantially less than the 13 Watts available, some of the excess available power may be used to power this external equipment. In particular, the motorized tilt/pan camera mounts described previously may in some cases be powered directly by the camera.

Most current motorized tilt/pan camera mounts are designed to operate from power supplies which provide 24 Volts AC at 60 Hz. Some smaller units are available which operate from 6-12 Volt DC supplies, some even capable of battery operation. Power consumption for these camera mounts ranges from approximately 2 watts for small, light-weight units up to several dozen watts for heavy-duty designs. It is therefore possible, in some cases, to provide operative power for these units from the excess power delivered to the camera via the network cabling.

In cases where the excess available power is insufficient to operate the motorized tilt/pan camera mount, it may be possible to provide operative power to the motorized tilt/pan camera mount via a separate network connection. In this method, the camera is provided with a dedicated network connection, which provides both network connectivity and operative power for the camera. A second network connection is provided for the motorized tilt/pan camera mount. This second network connection may be used solely to provide the required operative power. Alternatively, this second network connection may be used to pass tilt/pan control messages to the tilt/pan camera mount as well. In this case, a small device is interposed between the network cable termination and the motorized tilt/pan camera mount. This device contains the necessary power adapter circuitry, a 10/100 Ethernet interface, and a small controller which receives tilt/pan control messages from the network and in turn controls the tilt/pan motors. Such control is generally a simple contact closure interface, which directly switches power to the various motors. More elaborate motorized tilt/pan camera mounts may utilize other control interfaces, such as RS-422, RS-232, and the like.

This approach can provide power and control for tilt/pan mounts requiring up to 13 Watts. Note that the system requires a power converter. As previously stated, the 13 Watts of DC power is delivered to the powered device at a voltage of 48 Volts DC. Typically, the networked camera requires far more modest operative voltages—typically the usual 3.3 and 5 Volts DC as is common in digital equipment. The analog camera modules, located within the networked digital camera, typically require 12 Volts DC. It is therefore necessary to employ a power converter to reduce the incoming 48 Volts DC to the required logic voltages, and to regulate the output power appropriately. In cases wherein the external device requires a source of 24 Volts AC, the power converter is supplemented with a switch-mode power inverter, producing a PWM-simulated 24 Volt 60 Hz waveform suitable for the external device.

Automatic Pan/Tilt/Zoom Based on Triggers and IP Setup

Current Pan/Tilt/Zoom cameras have capability of accepting wired trigger inputs and causing the camera to tilt, pan, and zoom to a pre-determined area. Pre-defined camera positions are then manually programmed into the dome cameras via a hard-wired control link to a specialized tilt/pan/zoom controller. This is a nice feature, but is extremely limiting.

This trigger setup process may be improved through the use of a commonplace data network. In the invention, a commonplace computer, located on the digital video network, views the camera's video and provides rudimentary controls to tilt, pan, and zoom the camera. During setup, an operator moves the camera to a desired position, then associates that position with a specific trigger event known to the system, such as a door contact, alarm keypad, smoke detector, motion detector, and the like. This logical association between a sensor and a particular camera preset position is stored in a networked server.

As such, the present invention makes use of IP to monitor video and store the position tables. Any computer with IP access and user authority can then set up the tables. A standard PC would be used to "point" the camera Pan/Tilt/Zoom to the location desired to be associated with at trigger point such as a door contact, alarm keypad, temperature/pressure/vibration sensor, motion detector or any other localized sensor that needs to be monitored.

During operation, trigger output from any of the aforementioned sensors is conveyed to a networked server. The server, upon receipt of the trigger message, looks up the corresponding camera and camera preset position from a stored table. The server thereupon sends a message to the appropriate camera or cameras, commanding them to move to the appropriate preset position.

A network appliance such as a smart camera, contact interface or the like would be used to input trigger event information to the network. Trigger events from specific sensors will then be sent to the server, correlated to the cameras or cameras that are associated with that sensor, then camera controls can be evoked. As such, use of a server to store the locations provides a fail-safe. If the power fails in a camera, if it fails and is replaced, if it is moved or exchanged with another camera, the use of tables at the server makes the positioning camera independent. The tables can be either stored at the server and indexed when needed, or can be stored at the server and moved to the camera for local storage when the camera comes on-line.

Note that the sensor output messages could be sent directly to the associated camera or cameras. Note also that, on an IP network or equivalent, said messages could be broadcast or multicast throughout the network, thus reaching the camera directly. This approach might be beneficial in some applications, since the server need not process each such message directly. However, use of the networked server to store the trigger/camera preset table improves system reliability. If a camera loses power, or fails and is replaced, or is moved, the (new) camera need not be re-loaded with the trigger/preset tables. So, in the preferred embodiment, all sensor output messages are sent to the networked server, which correspondingly sends pre-set commands to the appropriate camera or cameras. In an alternative embodiment, the tables are loaded from the server into the camera during the camera's power-up process.

Single-Server Surveillance Network

Referring again to FIG. 1, the surveillance system uses one or more cameras attached to a suitable network, and supports one or more simultaneous clients who may view the various camera's video. A server, located on the network, is central to the operation of the system. The server is responsible for performing a variety of functions. First, the server provides, to the client viewing stations, the software code, necessary to view the cameras. In an inter-networked environment, such code is typically HTML, JAVASCRIPT, or JAVA. Second, the server may, optionally, store motion- or still-frame video captured from the various cameras. Finally, the server maintains database tables which describe each of the various cameras, and the status of all alarm devices o the network.

Figure 17:
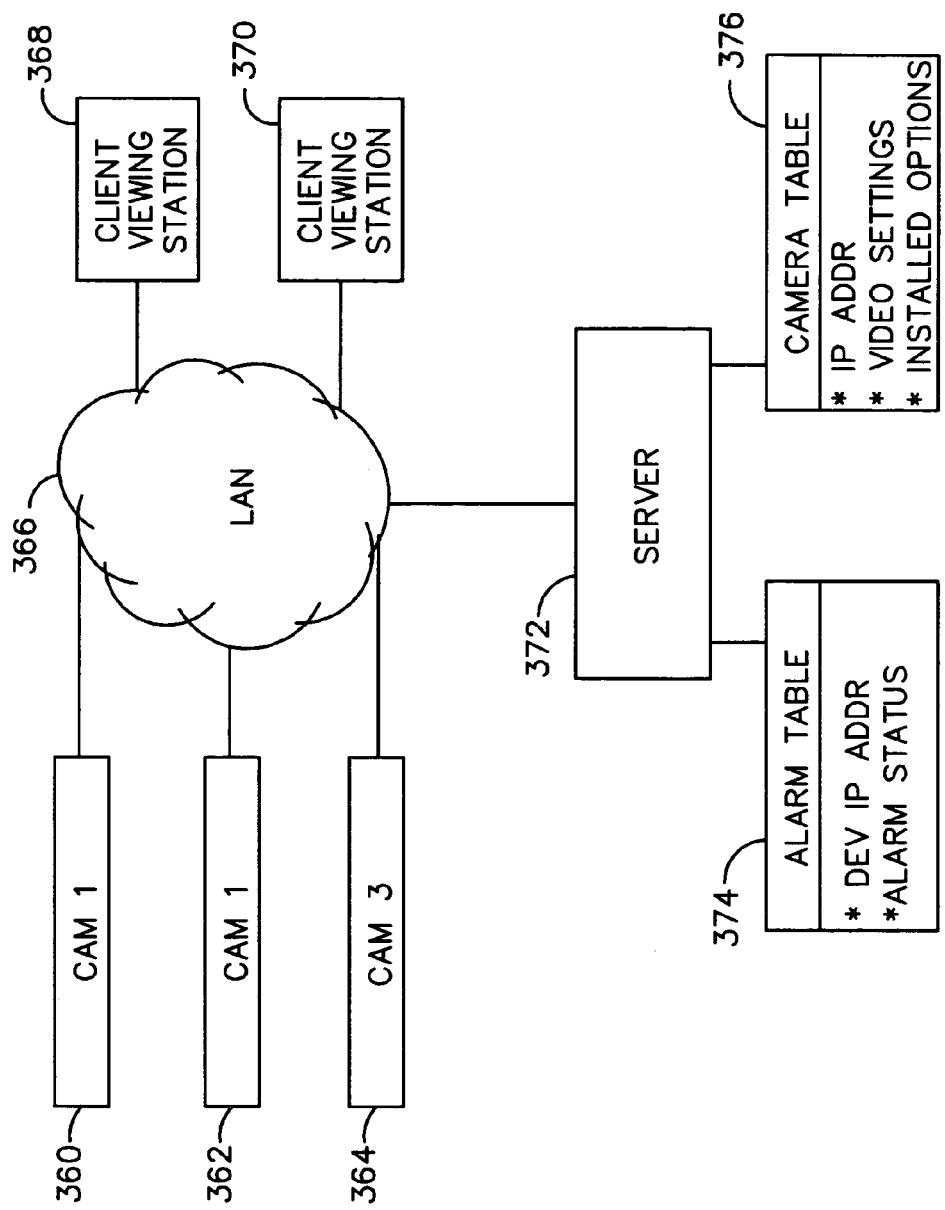
FIG. 17 depicts a server that maintains database tables which describe each of the various cameras and the status of all alarm devices to the network in accordance with a preferred embodiment of the present invention.

This is depicted in greater detail in FIG. 17. The various cameras 360-364 are attached to a LAN 366. The server 372 provides the necessary software code, to client viewing stations 368 and 370, to allow the clients to select and view the desired cameras. Said software code, loaded by the server 372 into the clients 368 and 370, allow the clients to exercise some degree of control over the selected cameras.

The server 372 also identifies cameras for inquiring clients. For example, rather than requiring each client station 368 and 370 to know each camera's network address, the server 372 may be used to provide said address to inquiring clients. For example, a client wishing to view the camera 360 need not know the camera's 360 IP address, since the server 372 is able to provide that information. This address resolution may be accomplished via a conventional DNS lookup in the server, or may involve having the client-side software perform the address lookup through a DHCP table located within the server 372. For example, a user at a client viewing station may control the video behavior of a camera, such as by adjusting brightness, contrast, and the like. The user may also control what degree of video compression is performed.

A user at a client station may also control some of the network parameters of a selected camera. For example, a user may wish to assign a static IP address to a camera, or may wish to allow the camera to have an IP address assigned automatically (DHCP). The client may also wish to assign a 'friendly' name to a camera. Finally, a user at a client station may also interact with various alarms on a given camera, so as to enable, disable, or adjust an alarm. For example, cameras are often configured to be 'alarmed' when motion is detected in the camera's field of view. The user may wish to control the sensitivity or location of said motion detection.

In any case, each camera may be customized as described above. In the system of FIG. 17, said camera configuration data is stored in the server 372. While it might be possible to store said information in the various cameras 360-364, storage of said camera data within the server 372 offers a number of advantages. For example, said camera configuration data, if stored in a database in the server, may be easily recovered after a power outage. In addition, storage of said camera data in the server 372 offers a means to resolve disputes between users. The server may resolve such control disputes through a variety of 'fairness' algorithms, which might not be possible in the sparse computing environment of the cameras themselves.

Server-centric storage of the camera database tables, as illustrated in FIG. 17, is therefore advantageous. However, such a system also has certain disadvantages. For example, note that a client viewing the station 368 or the station 370 is only allowed access to one of the cameras 360-364, which are 'owned' by the server 372. Cameras which dwell on a different LAN or on a different server may not be accessible by a client station. This is a substantial limitation. Users might, for example, have similar surveillance networks at a variety of locations, but be unable to view any cameras other than those located on their own LAN segment.

Figure 18:
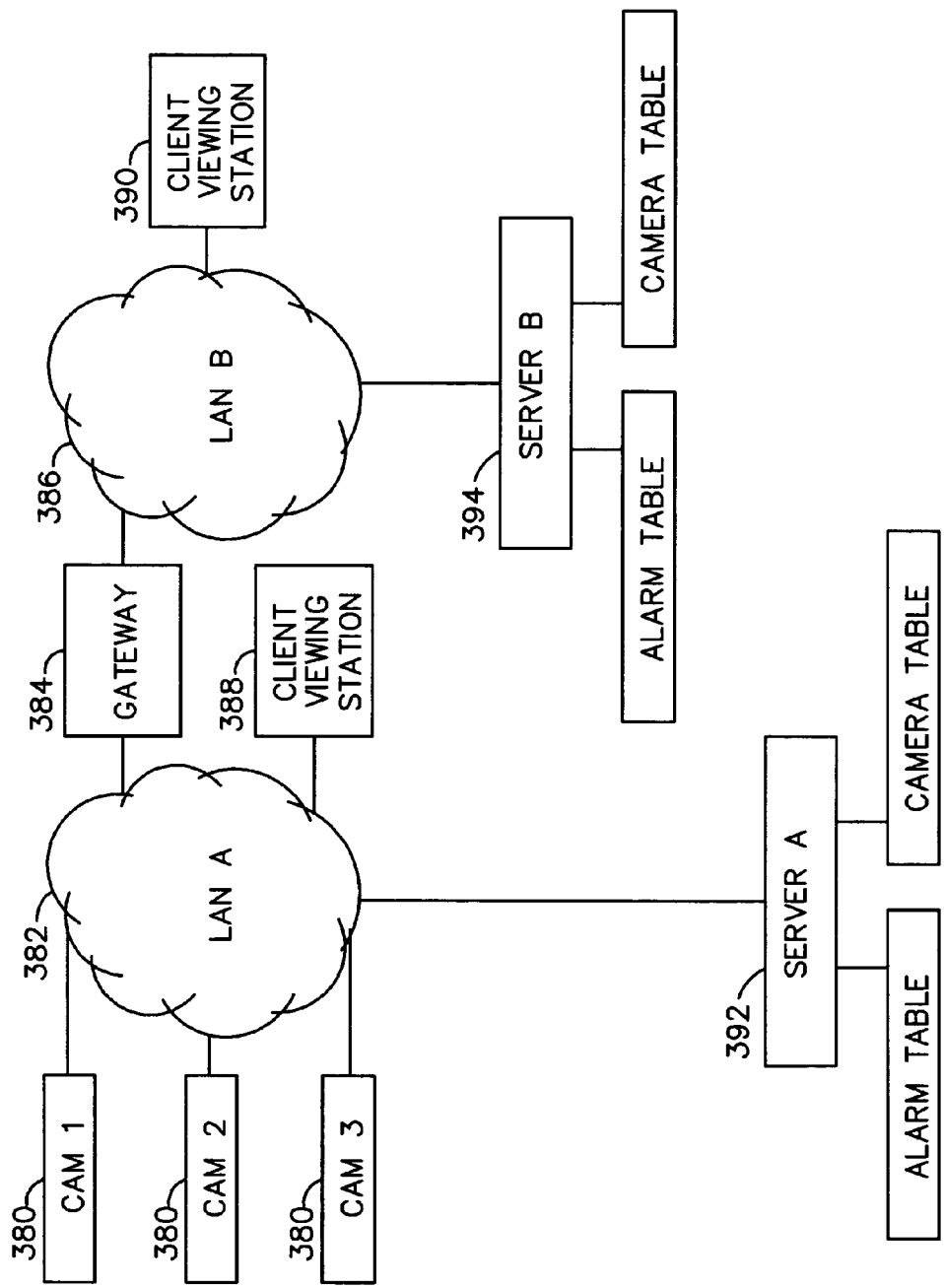
FIG. 18 depicts a dedicated control communications path between two servers in accordance with a preferred embodiment of the present invention.

In particular, note the behavior of the network of FIG. 18. As shown, a variety of cameras 380 dwell on a network, such as LAN A 382, and are nominally 'owned' by a server 392 also on LAN A. Meanwhile, one or more client viewing stations 390 are on a separate LAN B 386, which is served by a server 394. Even though the two LAN's may be interconnected via a gateway 384, it is not possible, in the previous system, for the client 390 to view the cameras 380. This limitation exists for the following reason. First, the client 390 has no way to determine one or more of the camera's IP address, since that IP address is known only to the camera's server 392. The client has loaded its software code from the server 394, which is on a different network and therefore has no knowledge of camera IP addresses on the other network.

Multi-Server Surveillance Network

The deficiency described above, in reference to FIG. 18, is overcome by providing a dedicated control communications path between the two servers. This path typically takes the form of a dedicated network 'socket' connection between the two servers, via the network gateway 106. When the servers are initially installed, the servers are informed of the network addresses of other servers, and are instructed to open and maintain a permanently-open 'socket' connection between the two servers.

Using this permanently-open socket connection, the two servers are able to exchange the necessary database tables, including the camera-state-descriptive tables, alarm status tables, camera IP address tables, and the like. Each server, such as server 105, maintains a set of database tables descriptive of the various cameras which it 'owns'. Each server also maintains a separate table of 'foreign' cameras, owned by a remote server. So, for example, the server 394 contains a database table set for any cameras which might be native to server 394, and likewise maintains a database table set of cameras which are native to the server 392.

This allows a user at the client viewing station 390 to have access to a remote camera. For example, when a user at client viewing station 390 wishes to view one or more of the cameras 380, the necessary network address lookup-table (or at least a copy of it) is located in server 394, which is directly accessible to the client 390. Furthermore, all camera control and status functions, such as brightness, compression parameters, alarm status, etc, are available to the client 390 via the 'duplicate' set of camera tables now located in the server 394.

Multi-Server Video Protocol Conversion

An additional limitation may be encountered when control messages, or indeed captured video, is routed via the inter-network gateway 384 in FIG. 18. This gateway may consist of any of a variety of different communications channels, which may vary widely in capacity, latency, error rate, and so on. Indeed, some types of communications channels may be completely, or partially, unable to support transmission of a multicast video stream.

Figure 19:
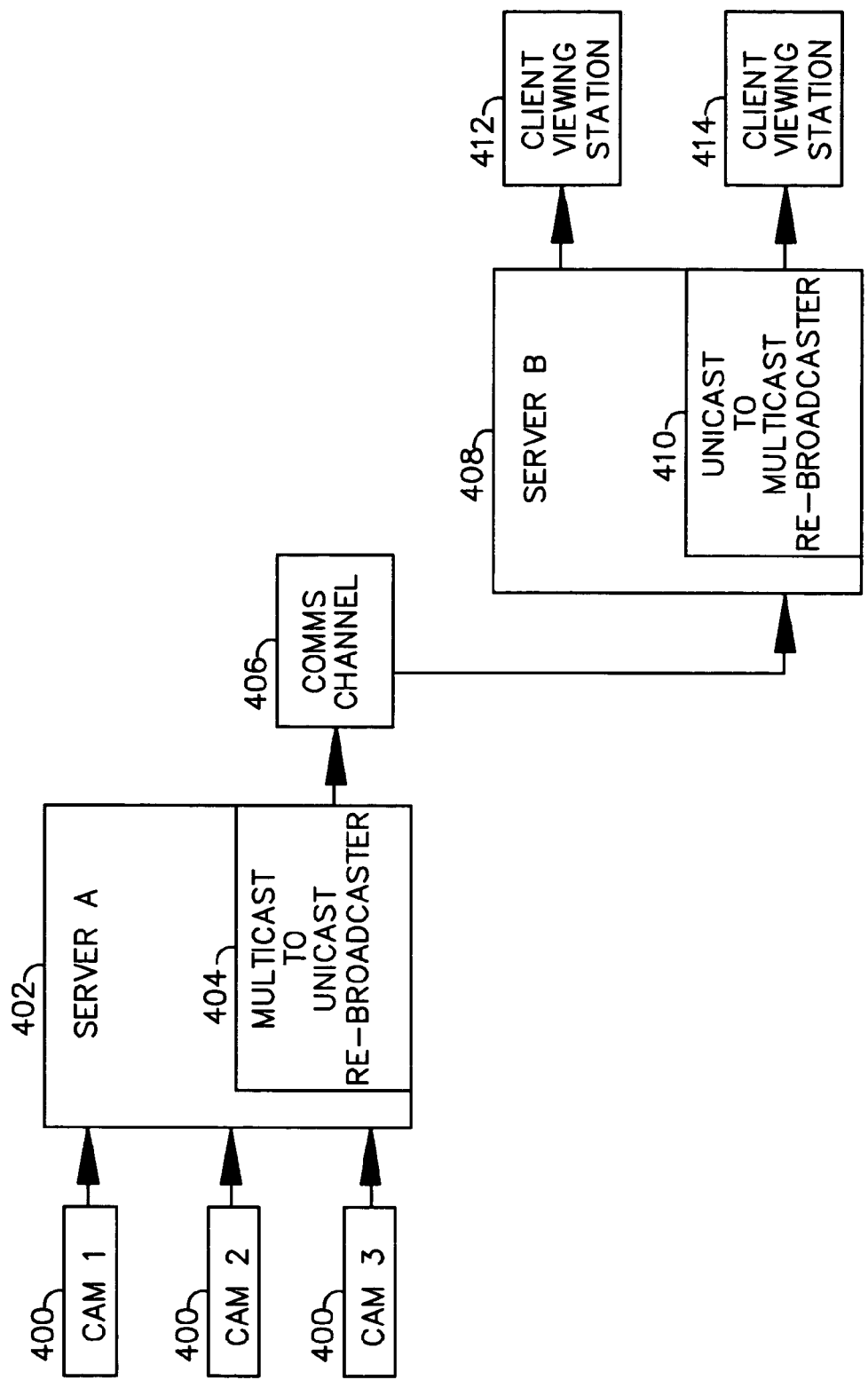
FIG. 19 depicts a video feed that is converted into a less demanding protocol in accordance with a preferred embodiment of the present invention.

Referring to FIG. 19 (in which the respective LAN's are omitted for clarity), multicast video traffic originates at one or more cameras 400, and is sent through the local network using a multicast protocol. Client stations, if any, which may be located on the first local area network may receive said multicast video streams directly. A remote client, for example at a client station 412, may be unable to receive said multicast video transmission. This may be due to a variety of reasons. For example, a wide-area-network router may be configured so as to block any outbound multicast traffic. Or, the intervening communications channel 406 may be highly error-prone, such that any attempted error-recovery algorithms may be useless or even detrimental to throughput.

To overcome this deficiency, a video feed requested by the client 412 is converted into a less demanding protocol by a re-broadcaster 404 prior to transmission through the communications channel 406. Typically, the multicast traffic is converted to a unicast UDP protocol prior to transmission. Upon passage through the network, the unicast UDP video stream is converted back into a multicast stream by the re-broadcaster 404, for delivery to the client stations.

Since the communications channel may have limited capacity, it is necessary for the two servers 402 and 408 to cooperate in conserving bandwidth. Since the unicast UDP protocol is inherently 'connectionless', there is no readily-available way for either server to know when a stream is no longer needed, and therefore there is no way to determine when to stop sending the video stream across the bandwidth-limited the communications channel 406.

To solve this problem, the server 408 requires periodic receipt of a 'keep-alive' message from the client station 412, whenever the client is actively viewing a requested video stream. If client 412 ceases to view a particular stream, such as if the user has changed to a different camera, then client 412 stops sending the keep-alive messages to server 408. The server 408 is thus continually aware of which video streams are currently being viewed. In particular, the server 408 thereby keeps track of which remote video streams are currently in demand.

The server 402, in turn, periodically sends an enquiry message to server 408, to determine which of the video streams are in demand. The server 408 responds to these inquiry messages with a listing of which video streams are currently being viewed. This message exchange takes place over the dedicated socket connection between the two servers 402 and 408. When the server 402 determines that a particular video stream is no longer needed by the server 408, then server 402 disables re-transmission of that stream via the re-broadcaster 404. Unnecessary video streams are thereby prevented from being forwarded across the communications channel, and the communications bandwidth is thereby conserved.

Although an exemplary embodiment of the system and method of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the cameras or camera systems can be performed by one or more of the modules or components described herein or in a distributed architecture. For example, all or part of a camera system, or the functionality associated with the system may be included within or co-located with the operator console or the server. Further, the functionality described herein may be performed at various times and in relation to various events, internal or external to the modules or components. Also, the information sent between various modules can be sent between the modules via at least one of a data network, the Internet, a voice network, an Internet Protocol network, a wireless source, a wired source and/or via plurality of protocols. Still further, more components than depicted or described can be utilized by the present invention. For example, a plurality of operator console's can be used and, although two network servers are utilized in FIG. 6, more than two network servers can be used as intermediaries.

What is claimed is:

1. A camera system, comprising:
   a camera that produces a video signal;
   a video compressor that compresses the video signal, the video compressor providing a compressed video signal, the compressed video signal having a compression ratio;
   a system control processor that passes the compressed video signal;
   a network interface that receives the compressed video signal; and
   wherein the video compressor comprises configurable parameters that affect a bandwidth of the compressed video signal, the bandwidth being subject to a dynamic bandwidth limitation, the bandwidth being affected by at least meeting the dynamic bandwidth limitation without reduction of the compression ratio.

2. The camera system of claim 1, wherein the configurable parameters are control registers.

3. The camera system of claim 2, wherein the control registers comprise a video format register that includes data which commands the video compressor to compress the video signal at various resolutions.

4. The camera system of claim 3, wherein resolutions include at least one of:
   a FULL resolution comprising about 704× about 480 pixels;
   a SIF resolution comprising about 352× about 288 pixels; and
   a QSIF resolution comprising about 176× about 144 pixels.

5. The camera system of claim 2, wherein the control registers comprise a bitrate policy that can be set to command a variable bandwidth output or a constant bandwidth output.

6. The camera system of claim 2, wherein the control registers comprise a frame pattern that determines a number of incoming analog video frames that will be compressed.

7. The camera system of claim 6, wherein the bandwidth is reduced if the frame pattern indicates that fewer than every frame in the video signal should be compressed.

8. The camera system of claim 2, wherein the control registers comprise a quality register that may be set to select a quality level from 0x01 to 0x1F.

9. The camera system of claim 8, wherein the quality register controls a degree of compression by selecting an amount of a high-frequency content of the compressed signal that actually gets transmitted.

10. The camera system of claim 9, wherein the degree of compression affects a compressed image resolution versus an amount of data transmitted.

11. The camera system of claim 2, wherein the control registers comprise a steam status register that may be set to ON to indicate the parameters should be used when the video signal is transmitted, and may be set to OFF to indicate the parameters should not be used when the video signal is transmitted.

12. A method for compressing a video signal, comprising:
sending video compression parameters from an operator console to a camera system, wherein the operator console is adapted to control the camera system;
receiving the parameters by a system control processor of the camera system;
configuring at least one video compression device of the camera system in relation to the parameters;
compressing an available video signal by operation of the system control processor with the at least one video compression device, with the at least one video compression device being configured in relation to the parameters, to produce compressed video, the compressed video having a compression ratio; and
providing to a communications channel the compressed video, the communications channel having a communications channel capacity, the communications channel capacity being subject to a dynamic channel communications capacity limitation, the compressed video being provided to the communications channel without exceeding the dynamic channel communications capacity limitation, the compressed video being provided to the communications channel without reduction of the compression ratio.

13. A network, comprising:
a camera system, comprising:
a camera that produces a video;
a video compressor that compresses the video, the video compressor providing compressed video, the compressed video having a compression ratio;
a system control processor that passes the compressed video;
a network interface that receives the compressed video, the network interface being configured to provide to the network the compressed video, the network having a dynamic bandwidth limitation, the system compressor being configured to provide via the network interface to the network the compressed video at a bandwidth, the compressed video bandwidth at least meeting the dynamic bandwidth limitation without reduction of the compression ratio;
a server; and
an operator console that controls the camera system, wherein the console uses the server as an intermediary when requesting the compressed video signal.

14. The network of claim 13 comprising a low-bandwidth communications channel coupled to the camera system and to the operator console.

15. The network of claim 14, wherein the server has a-priori knowledge of a capacity of the low-bandwidth communications channel.

16. The network of claim 15, wherein the server configures compression configuration registers within the video compressor so as to produce a video stream which does not exceed the capacity of the low-bandwidth communications channel.

17. The network of claim 13 comprising a second server, wherein the server and the second server are used as intermediaries when requesting the compressed video signal from the camera system.

18. A method for compressing a video stream, comprising:
receiving high-bitrate video streams at an operator console from a camera via a channel that does not have sufficient capacity to transmit the high-bitrate streams;
automatically switching the camera to an alternate stream type and providing the camera with video compression parameters such that the video streams produced by the camera without reducing compression ratio of the video streams will not exceed a capacity of a communications channel used to transfer the video streams; and
automatically switching the camera back to an original high-bitrate stream after the alternate stream type is received.

19. A computer readable medium comprising computer program instructions for:
receiving a video stream request at a first server;
routing the video stream request to a second server that has a-priori knowledge of a capacity of a low-bandwidth communications channel; and
automatically switching a camera that produces a video stream to an alternate stream type and providing the camera with video compression parameters such that the video stream produced based on the request will not exceed the capacity of the communications channel while maintaining at least a minimum compression ratio of the video stream.

20. A system, comprising:
a camera system;
a surveillance network that has sufficient bandwidth to support a full 30 frame-per-second compressed video stream, the compressed video stream having a compression ratio;
a server that receives the compressed video stream; and
an operator console that places a request to the server for a compressed video stream from the camera system, wherein the server has knowledge of a capacity of the system, and based on that knowledge, begins forwarding selected frames of the video stream to the operator console without reducing compression ratio of the compressed video stream.

21. The system of claim 20, wherein if the channel has moderate capacity, the server may discard alternate video frames and forwarding to the operator console a video stream with about half of the original data.

22. The system of claim 21, wherein the server decimates the video stream by discarding every Nth frame to create a lower bitrate stream which will not exceed the capacity.

* * * * *